(12) United States Patent
Hubrecht et al.

(10) Patent No.: US 6,809,738 B2
(45) Date of Patent: Oct. 26, 2004

(54) PERFORMING MEMORY MANAGEMENT OPERATIONS TO PROVIDE DISPLAYS OF COMPLEX VIRTUAL ENVIRONMENTS

(75) Inventors: Alain Yves Nestor Hubrecht, Wezembeek-Oppem (BE); Tom Nuydens, Vosselaar (BE)

(73) Assignee: VRcontext s.a., Brussels (BE)

(*) Notice: Subject to any disclaimer, the term of this patent is extended or adjusted under 35 U.S.C. 154(b) by 389 days.

(21) Appl. No.: 10/023,996

(22) Filed: Dec. 21, 2001

(65) Prior Publication Data

US 2003/0117405 A1 Jun. 26, 2003

(51) Int. Cl.$^7$ .............................................. G06F 12/02
(52) U.S. Cl. ....................... 345/543; 345/423; 345/536
(58) Field of Search ................................ 345/418–420, 345/423, 581, 582, 501, 536–538, 541–544, 545, 552; 711/170–173, 154, 147

(56) References Cited

U.S. PATENT DOCUMENTS

| | | | |
|---|---|---|---|
| 3,889,107 A | | 6/1975 | Sutherland |
| 5,261,029 A | * | 11/1993 | Abi-Ezzi et al. ............ 345/423 |
| 5,490,239 A | | 2/1996 | Myers |
| 5,550,960 A | * | 8/1996 | Shirman et al. ............ 345/423 |
| 5,659,715 A | * | 8/1997 | Wu et al. .................... 345/543 |
| 5,684,943 A | | 11/1997 | Abraham et al. |
| 6,313,838 B1 | * | 11/2001 | Deering ...................... 345/420 |
| 2003/0011595 A1 | * | 1/2003 | Goel et al. .................. 345/423 |

OTHER PUBLICATIONS

"Development and Support Guide"; MicroStation; Version 5, 9/93, pages of the "Table of Contents" only.*
IEEE Computer Graphics & Applications, "The scaling behavior of viewing transformations" by Abi–Ezzi et al, pp. 48–54, 5/9.*
Proceedings of the 1996 ACM/IEEE Conference on Supercomputing, "Scalable Parallel Algorithms For Interactive Visualization of Curved Surfaces" by Kumar et al, pp. 1–18, 1996.*
Proceedings of Visualization 1998 IEEE, "A Unified Approach for Simplifying Polygonal and Spline Models" by Gopi et al, p. 271–278 and 543, Oct. 18, 1998—Oct. 23, 1998.*
"La realite virtuelle dans le monde de l'industric"; CAD/CAM magazine; Alain Hubrecht.*
"Realite Virtuelle"; Tractebel Energy.*
Utiliser Microstation Pour de Gros Projets d'architecture; Microstation.*
CAD/CAM International 1998 Editorial.*
"Development and Support Guide"; Microstation; Version 5, 9/93.*

(List continued on next page.)

Primary Examiner—Kee M. Tung
(74) Attorney, Agent, or Firm—Beyer Weaver & Thomas LLP

(57) ABSTRACT

Systems and methods are disclosed for providing interactive displays of complex virtual environments. Systems and methods consistent with embodiments of the invention may be implemented to generate virtual reality (VR) file(s) from a 3D model of the complex environment. The VR file(s) may include octree and collision detection information that is used to simulate and render frames of the complex environment. During simulation, moving objects may be evaluated to detect for collisions with other objects. Further, during rendering, objects or elements may be dynamically tessellated during run-time operations to actively control their appearance when displayed to a user. Memory management operations for facilitating the display of complex virtual environments are also disclosed, consistent with embodiments of the invention.

50 Claims, 41 Drawing Sheets

OTHER PUBLICATIONS

Tom Nuydens; *Delphi3D* "General articles".
Tom Nuydens; *Delphi3D* "Occlusion culling".
*Tom Nuydens; Delphi3D* "Octress".
Tom Nuydens; *Delphi3D* "Collision Detection".
Tom Nuydens; *Delphi3D* "Triangle Strip Generation".
W.J. Evert van de Graff; "Virtual Reality".
W.J. Evert van de Gaaff; "Application of Virtual Reality".
*SmartPlant Review;* "The Problem–solving 3D Visualization Tool".
A. Hubrect; E. Mahy; A. Massonnet; "Renewable and Fuel Cell Generation Techniques"; *Power–gen Europe* 1997.
A. Hubrecht; *Marvel Offshore Seminar;* "Using Virtual Reality for Safety and Maintenance Training on Offshore Platforms and Plants".
A. Wilson; E. Larsen; D. Manocha and M.C. Lin; *IMMPACT;* "a system for Interactive Proximity Queries on Massive Models"; Dept. of Computer Science, University of North Carolina.
T. Hundson; D. Manocha; J. Choen; M. Lin; D. Hoff and H. Zhang; "Accelerated Occlusion Culling Using Shadow Frusta"; Dept. of Computer Science University of North Carolina.
"A Framework for the Real–Time Walkthrough of Massive Models". D. Aliaga; J. Cohen; A. Wilson; H. Zhang; C. Erikson; K. Hoff; T. Hudson; WQ. Stuerzlinger; E. Baker; R. Bastos; M. Whitton; F. Brooks; D. Manocha; Computer Science Department; University of North Carolina.
"Landmarking for Navigation of Large Models". Roger Hubbold and Martin Keates; Advanced Interfaces Group, Department of Computer Science; University of Manchester.
"Real–Time Simulation of a Stretcher Evacuation in a Large–Scale Virtual Environment" Roger Hubbold and Martin Keates; *The Eurographics Assoc. and Blackwell Publishers* 2000 Published by Blackwell Publishers.

"Visibility Preprocessing with Occuluder Fusion for Urban Walkthroughs"; Peter Wonka, Michael Wimmer, Dieter Schmalsteig; Vienna University of Technology.
"Process Plant"; *Maverik*; Adrian West, Jan 99.
"Navigation in Process Plant"; *Maverik*; Adrian West Mar. 10, 1999.
"Exploiting Application Knowledge" *Maverik.*
"A micro–kernel for large–scale virtual environments"; *GNU/Maverik*; Roger Hubbold; Jon Cook; Martin Keates; Simon Gibson; Toby Howard; Alan Murta; Adrian West; Steve Pettifer; Advanced Interfaces Group, Department of Computer Science.
"Seeing is Believing, Realism Brings Understanding"; *Review Reality.*
"4D Navigator"; *IBM/Dassault Systemes.*
"OpenGL Optimizer"; *OpenGL* 1997.
"Adaptive Media's Envision3D: Enterprise–wide 3D CAD Access and Collaboration Using Web Technology"; *Engineering Automation Report'* Aug. 1998.
"Parson Engineering & Chemicals"; *Vuent* 1999.
"Automation Tool for CAD Conversion"; Envion–*i* 3D; *Vuent.*
"Revolutionizing the Communication of Design by Saving Time, Effort and Money"; *Navis Works 3D–Mail.*
"The problem–solving 3D visualization tool"; *Integraph SmartPlant Viewer.*
"The Deva Project" *An Overview of the Deva Project.*
"Computer Graphics, Principles and Practice"; James D. Foley; Andries van Dam; Steven K. Feiner; John F. Hughes; Publisher Addison–Wesley; 1987.
"OpenGL SuperBible, The complete Guide to OpenGL Programming for Windows NT and Windows 95"; Publisher: Mitchell Waite 1996.

* cited by examiner

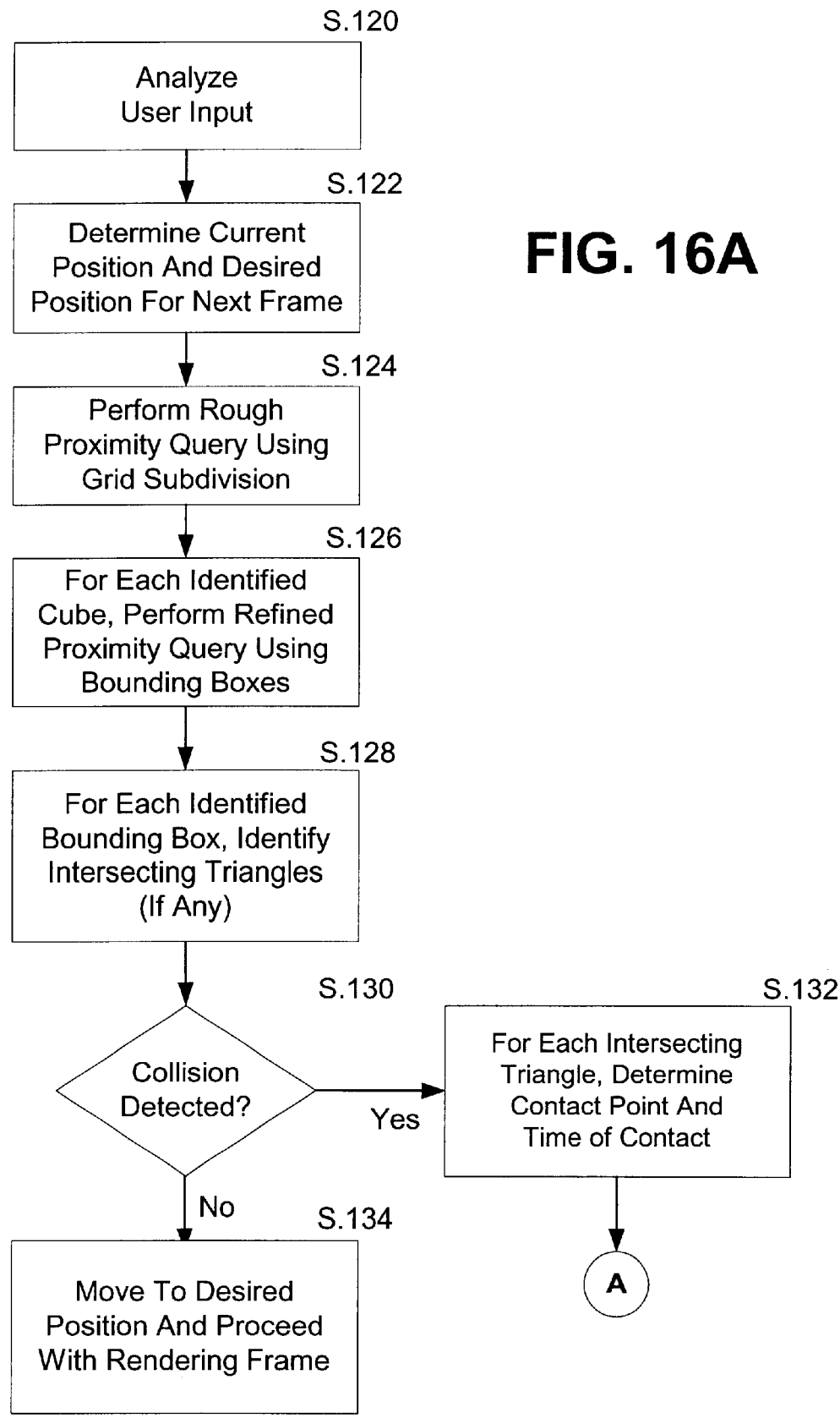

PERFORMING MEMORY MANAGEMENT OPERATIONS TO PROVIDE DISPLAYS OF COMPLEX VIRTUAL ENVIRONMENTS

A compact disc is submitted with this application that contains an appendix of computer program listings; the contents of the compact disc are hereby incorporated by reference. The disc was created on Apr. 16, 2004 and includes a file entitled "Appendix.txt" having a size of 18 KB bytes. A duplicate disc is also submitted.

BACKGROUND OF THE INVENTION

I. Field of the Invention

The present invention generally relates to the fields of computer graphics and virtual reality. More particularly, the present invention relates to systems and methods for performing memory management operations to provide graphical displays of complex virtual environments, including complex virtual environments based on massive models.

II. Background Information

As a result of the advances in computer graphics and computer-aided design (CAD), a wide variety of objects and environments can be modeled and rendered with technical detail and precision. For example, 2D and 3D modeling techniques permit engineering models of mechanical parts and other physical objects to be computer generated for various purposes, such as research and development. In addition, complex environments involving offshore platforms, industrial plants, building complexes and other facilities can be modeled using conventional, computer-aided modeling methods. 3D models of such environments are often used in the architecture, engineering and construction (AEC) sectors and for plant design.

Elements or objects in a complex environment may be represented in a 3D model through polygons. Polygons (such as triangles and quadrilaterals) are closed figures made by joining line segments, wherein each line segment intersects exactly two other line segments. In a 3D model, polygons may be combined to represent the surface(s) of boxes, stairs, windows, walls, floors, pipes, beams and other objects in the modeled environment. Data defining the attributes of each object, including lighting and texture, may also be included in a 3D model.

To render 3D models, conventional graphics systems may be employed. Such graphics systems may be provided with graphics cards that are capable of processing 3D model data to generate and display the modeled environment. While triangle elements can be directly handled and rendered by most graphics cards, other polygon elements in a 3D model (such as four or five-sided polygons) require additional processing before they can be rendered. Such processing may include the triangulation of complex polygon elements into triangles so that it can be directly handled by the graphics hardware and rendered on a display terminal.

With the developments in computer-aided graphics and 3D modeling, there has been an increasing demand for interactive displays and simulation to provide virtual reality. The term virtual reality refers to the use of computer-based simulation of real or imaginary environments that permit a user to perform operations within the simulated environment. In the area of 3D game technology, virtual reality software has been created to provide real-time animation within simulated environments for users. To achieve higher levels of realism, many 3D software games permit users to navigate and/or perform operations (such as lifting, walking, running, jumping, climbing, etc.) in a manner that resembles the real world. For this purpose, the effects of gravity and/or other real-world phenomena (such as collisions) may be simulated in virtual reality applications for 3D game users.

Presently, the ability to provide interactive displays and real-time simulation for complex environments presents many challenges. For example, complex environments can be based on 3D models that are comprised of data representing hundreds of thousands of polygons. Although the throughput of graphics systems has improved over the years, rendering complex environments at interactive frame rates (such as 5 frames/second or higher) is impossible with current applications due to the volume of data that must be processed. For instance, attempts to render complex environments represented by approximately 700,000 or more polygons with current systems will typically cause the screen to freeze or lock when a user tries to navigate through the rendered model.

To overcome such obstacles, some applications eliminate real-world phenomena (such as the effect of gravity and/or collisions) to provide simple navigation features in a complex virtual environment. In such applications, however, the user is often left in a confused state since the user is permitted to navigate through walls, floors and other objects represented in the modeled environment. Further, in some cases, the viewpoint of the user may be positioned within walls or between floors, making it difficult for the user to orientate himself/herself with respect to the rendered frame.

Other applications attempt to provide real-time simulation by reducing the level of detail in the rendered frame and/or eliminating the range of interactive options available to a user. In such applications, however, curved surfaces may appear jagged as opposed to smooth. Further, the user may be limited to basic movements (such as forward, left, right, etc.) that are not practical for most applications. Therefore, while such approaches may improve the frame rate, they fail to provide an acceptable level of visualization and simulation to the user. As a result, past attempts do not provide an effective virtual reality solution for complex environments.

SUMMARY OF THE INVENTION

In accordance with embodiments of the present invention, virtual reality (VR) systems are provided for generating displays of a complex virtual environment based on VR file(s). In such VR systems, a method may be provided for performing memory management operations, wherein the method comprises: allocating video memory in graphics hardware of the VR system and allocating accelerated graphics port (AGP) memory as part of system memory of the VR system; pre-loading, prior to simulating and rendering frames of the complex environment, all non-dynamic tessellation elements defined in the VR file(s) into memory, wherein pre-loading includes pre-loading non-dynamic tessellation elements into at least one of the video memory and the AGP memory; determining, after pre-loading all non-dynamic tessellation elements, whether memory space is available in at least one of the video memory and the AGP memory; and if memory space is determined to be available, pre-loading dynamic tessellation elements defined in the VR file(s) into the available memory space of the video memory or the AGP memory.

According to other embodiments of the invention, methods may be provided for performing memory management operations in a virtual reality (VR) system, wherein the VR system being adapted to provide displays of a complex virtual environment based on VR file(s). Such methods may comprise: buffering, in memory of the VR system, vertex data for rendered dynamic tessellation elements; determining, for a dynamic tessellation element to be rendered, whether the dynamic tessellation element was rendered in a previous frame at a tessellation level that is the same as a tessellation level for the element in a frame to be rendered; and when it is determined that the dynamic tessellation element was rendered in a previous frame at the same tessellation level, using the buffered vertex data for the previous rendering of the dynamic tessellation element to facilitate the display of the frame to be rendered.

Consistent with still other embodiments of the invention, a computer program product may be provided for generating interactive displays of a complex virtual environment. The computer program product may include a computer readable medium embodying a computer program, wherein the computer program comprises instructions that are executable by a system to perform a method for performing memory management operations. Consistent with embodiments of the invention, such methods may comprise: allocating video memory in graphics hardware of the VR system and allocating accelerated graphics port (AGP) memory as part of system memory of the VR system; estimating, for a dynamic tessellation element to be rendered, memory space requirements for storing rendering data for the dynamic tessellation element, the rendering data comprising vertex data defining one or more triangles representing the dynamic tessellation element; determining whether there is sufficient memory space available in at least one of the video memory and the AGP memory for storing the rendering data based on the estimated memory space requirements; and using the available memory space in at least one of the video memory and the AGP memory for dynamically tesselating the element when it is determined that there is sufficient memory space for the rendering data.

In accordance with yet additional embodiments of the invention, systems may be provided for performing memory management operations. Such systems may comprise: means for buffering, in memory of a virtual reality (VR) system, vertex data for rendered dynamic tessellation elements; means for determining, for a dynamic tessellation element to be rendered, whether the dynamic tessellation element was rendered in a previous frame at a tessellation level that is the same as a tessellation level for the element in a frame to be rendered; and means for using the buffered vertex data for the previous rendering of the dynamic tessellation element to facilitate the display of the frame to be rendered when it is determined that the dynamic tessellation element was rendered in a previous frame at the same tessellation level.

It is to be understood that both the foregoing general description and the following detailed description are exemplary and explanatory only, and should not be deemed restrictive of the full scope of the embodiments of the invention.

BRIEF DESCRIPTION OF THE DRAWINGS

The accompanying drawings, which are incorporated herein and constitute a part of this specification, illustrate various features and aspects of embodiments of the invention. In the drawings:

FIGS. 16A and 16B are exemplary flow diagrams for performing collision detection, consistent with embodiments of the invention;

BRIEF DESCRIPTION OF THE APPENDICES

Figure 1:
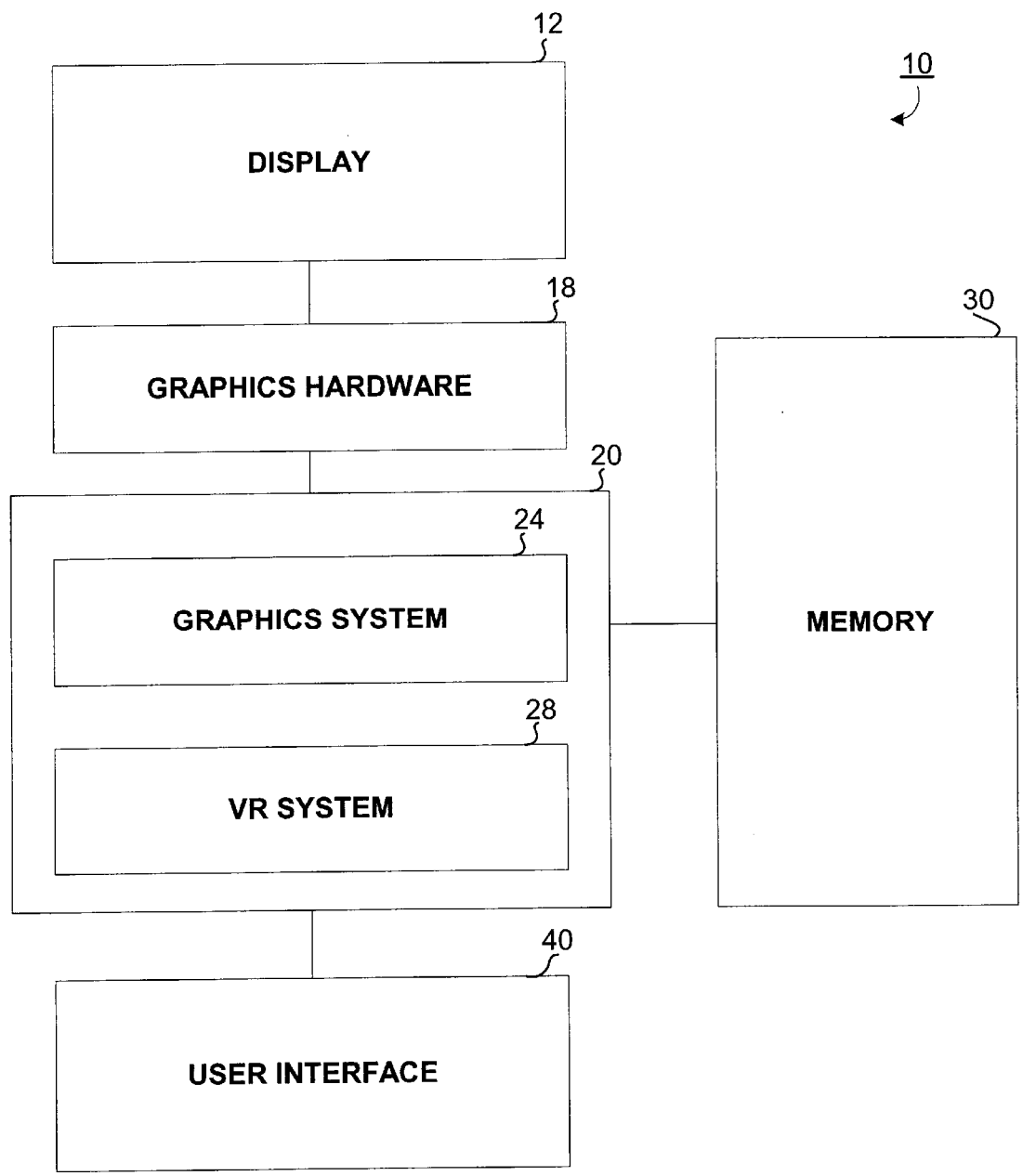
FIG. 1 illustrates an exemplary system environment for providing interactive displays of complex virtual environments, consistent with embodiments of the invention.

In order to facilitate the detailed description of the embodiments of the present invention, reference is made to the noted appendices by way of non-limiting examples of features of the invention, wherein:

Appendix A includes exemplary programming code for performing a sweep test for intersection between two bounding spheres;

Appendix B includes exemplary programming code for performing a sweep test for intersection between a bounding sphere and a triangle element;

Appendix C includes exemplary programming code for dynamically tessellating a cone element type;

Appendix D includes exemplary programming code for dynamically tessellating a torus element type; and Appendix E includes exemplary programming code for dynamically tessellating a surface-of-revolution element type.

DETAILED DESCRIPTION

Systems and methods consistent with embodiments of the present invention provide interactive graphical displays of complex virtual environments. Such systems and methods may be implemented, according to embodiments of the invention, to render complex virtual environments representing, for example, building complexes, industrial plants, offshore platforms, and other facilities or environments. The rendering of such complex environments may be performed at interactive frame rates to provide real-time simulation to the user. Further, real-world phenomena, including the effect of gravity and collisions with objects, may be simulated to provide a higher degree of realism for users.

The complex virtual environments may be based on 3D models. Such models may be defined by a large set of polygons, such as hundreds of thousands of polygons. Further, in the case of massive models, the complex environment may incorporate approximately one million or more polygons. Massive or large-scale models may be used to model various complex environments, including those related to the AEC sector, where many objects of different sizes and type are represented in the environment.

Embodiments of the invention may be implemented to facilitate various virtual reality applications for complex models. For examples, consistent with embodiments of the invention, interactive displays of complex virtual environments may be used for design and research, project review, public relations, familiarization training, maintenance planning and training, security review and training, and a wide array of other applications requiring real-time visualization and/or simulation of complex environments. Such applications may be employed in various areas, including areas in which walk-through and/or other full immersion capabilities are required for effective training or use.

As further disclosed herein, interactive displays of complex environments may be generated using one or more virtual reality (VR) file(s). Consistent with embodiments of the invention, VR file(s) may be created from a 3D model and used in place of the 3D model during run-time operations for performing simulation and rendering operations. Such VR file(s) may be constructed with an octree and a list of occluder candidates to permit visibility and culling operations to be performed more efficiently. Moreover, VR file(s) may include a collision detection hierarchy to facilitate collision detection operations during run-time operations.

To display frames of a complex virtual environment, systems and methods consistent with embodiments of the invention collect and analyze input from a user to determine the user's desired movements or operations. Using the VR file(s), predictive collision detection operations may be performed during a simulation phase to determine if the desired movements or operations will cause collision(s) with objects or elements represented in the complex environment. In response to the detection of a collision, an adjusted position or movement may be computed before rendering the frame to the user. Further, during a rendering phase, culling operations may be performed based on the camera or viewer position for the frame, and visible elements may be dynamically tessellated according to data from the VR file(s).

Consistent with embodiments of the invention, FIG. 1 illustrates an exemplary diagram of a system environment 10 for providing interactive displays of complex virtual environments. As shown in FIG. 1, system 10 includes a display 12, graphics hardware 18, a computing platform 20, a user interface 40 and a storage device or memory 30. As illustrated in FIG. 1, computing platform 20 may include a number of components for processing data and rendering complex virtual environments, such as a graphics system 24 and a virtual reality (VR) system 28. Exemplary embodiments of VR system 28 and graphics system 24 are provided below with reference to, for example, FIGS. 3 and 4.

In system environment 10, display 12 is adapted to graphically display rendered frames of a modeled environment according to operations performed by computing platform 20 and graphics hardware 18. By way of example, display 12 may be implemented with a color display terminal or device with predetermined quality and resolution. For instance, display 12 may be implemented with a color display screen having 16 or 32 bits color depth. Further, consistent with embodiments of the invention, display 12 may be provided as a separate display component connected to computing platform 20 (as represented in FIG. 1) or can be provided as a display device that is integrated with computing platform 20 (such as a display screen of a laptop computer).

Computing platform 20 of system environment 10 may be configured to process data and render complex virtual environments. For this purpose, computing platform 20 may be implemented with a workstation, a server, a personal desktop computer, a laptop or any other computing-based platform. By way of non-limiting examples, platform 20 may be implemented with a personal desktop computer or laptop with an Intel Pentium III, 350 MHz or higher-class central processing unit (CPU), such as 500 MHz or higher CPU. Other types of CPUs may also be used, such as the AMD Athlon XP Processor manufactured by Advanced Micro Devices, Inc. Computing platform 20 may also be configured with Microsoft Windows 98SE, ME, NT4, SP6, 2000 or XP.

In accordance with an embodiment of the invention, computing platform 20 may be implemented to provide accelerated graphics port (AGP) capabilities for facilitating higher 3D graphics throughput. In such a case, computing platform 20 may be implemented with an AGP chipset and motherboard equipped with an AGP bus slot. Further, an operating system such as the OSR 2.1 version of Windows 98 or Windows NT 4.0 may be used.

Consistent with embodiments of the invention, computing platform 20 may be adapted to perform a number of operations, including the pre-processing of a 3D model file to generate VR file(s) used for rendering a complex virtual environment. Further, during run-time operations, computing platform 20 may be adapted to receive input from user interface 40 and/or other devices, analyze data from the VR file(s) stored in memory 30, and generate instructions to display frames of the complex environment with display 12. Optionally, computing platform 20 may also provide instructions to user interface 40 to control one or more haptic devices that provide feedback to the user. For example, haptic devices such as gloves, helmet devices with automated tracking, force feedback joysticks, and/or other types of skeleton or human interface devices may be provided with user interface 40.

As stated above, computing platform 20 may include graphics system 24 and VR system 28. Collectively, components 24 and 28 may facilitate the processing of data and rendering of complex virtual environments. For instance, VR system 28 may be adapted to perform various simulation operations, including collision detection operations based on user input and data from the VR file(s). As a result of such operations, VR system 28 may provide output indicating, for example, the camera or viewer position for each frame to be rendered.

Rendering operations may be performed by graphics system 24 based on the results of the simulation operations performed by VR system 28. The rendering operations performed by graphics system 24 may include visibility and culling operations, as well as dynamic tessellation operations for specific types of elements defined in the VR file(s). The results of these rendering operations may include a list of vertex arrays for the elements determined to be visible, as well as vertex arrays for any dynamically tessellated elements. Based on these results, commands (such as Open GL commands) may be issued by system 24 to graphics hardware 18 to cause the display of the rendered frame on display 12.

Consistent with embodiments of the invention, graphics hardware 18, graphics system 24 and VR system 28 can be implemented through any suitable combination of hardware, firmware and/or software. By way of non-limiting example, graphics system 24 may be implemented as a software-based application using C++ and include an OpenGL software interface. Further, graphics hardware 18 may be implemented with commercially available graphics hardware, such as graphics cards that include transformation and lighting functions and suitable graphics memory (such as 32 Mb or more of graphics memory). Examples of commercially available graphics cards include GeForce II or III graphics cards available from Nvidia of Santa Clara, Calif. For GeForce graphics cards, the latest available drivers may also be installed (such as those available for downloading at Nvidia's website <http://www.nvidia.com>). By way of further example, VR system 28 may be implemented as a software-based application and programmed using C++ and/or graphics development languages or libraries, such as Microstation Development Language (MDL) available from Bentley Systems, Inc. of Exton, Pa.

Memory 30 may be implemented with a database or storage device that provides sufficient memory capacity for all of the operations performed with system 10. By way of example, memory 30 may be implemented with approximately 256 Mb or greater memory capacity depending on, for example, the complexity of the 3D model and/or data handled by system 10. As with display 12, memory 30 can be provided as a separate storage device connected to computing platform 20 (as illustrated in FIG. 1) or can be an integrated storage device that is provided as part of computing platform 20 (such as the internal memory or hard disk of a computer or laptop).

Consistent with embodiments of the invention, memory 30 may store data accessed by computing platform 20. For example, memory 30 may store data for complex virtual environments represented by 3D model files. Such files may be developed using commercially available software, such as Microstation (available from Bentley Systems, Inc.), AutoCAD (available from Autodesk, Inc.) or PDMS (available from Cadcentre Ltd.). Further, the 3D model files may be stored in conventional or proprietary file formats, such as .dgn, .dwg, etc.

Referring again to FIG. 1, memory 30 may also store VR file(s) that are used by computing platform 20 to process and render complex environments. In accordance with embodiments of the invention, VR file(s) may be generated from 3D model files. Further, as described below, VR file(s) may include optimized data representing the entire complex environment, as well as other data for facilitating the interactive display of the environment. Accordingly, consistent with embodiments of the invention, VR file(s) may be used in place of any 3D model files during run-time operations to render the complex environment. Exemplary embodiments of VR file(s) are provided below with reference to, for example, FIG. 5. In addition, pre-processing operations and exemplary flow diagrams for generating VR file(s), consistent with embodiments of the invention, are provided below with reference to, for example, FIGS. 6 and 9.

User interface 40 collects and receives input from a user and provides all user input to computing platform 20. User input may indicate instructions from the user concerning movements (forward, back, left, right, etc.) or operations (select, lift, rotate, etc.) to be virtually performed in the complex environment. Such input may permit a user to control walk-though operations in the complex virtual environment, as well as perform operations on elements (such as boxes, chairs, etc.) represented in environment. Additionally, user input may include instructions to control the operations of system 10, such as the loading of files, the execution of components and applications, etc.

By way of non-limiting examples, user interface 40 can be implemented with any number of input devices, such as a keyboard, a mouse device, a joystick and/or a track ball. The input devices may be provided as a separate device or as an integrated device with computing platform 20. User interface 40 may also include haptic devices to provide feedback to the user during simulation and rendering. As noted above, such haptic devices include gloves, helmet devices with automated tracking, force feedback joysticks, speakers and/or other types of skeleton or human interface devices.

To provide interactive displays of a complex environment, VR file(s) are first prepared (if not previously generated and stored by the user). As stated above, VR file(s) may be created from 3D model for the complex environment. By loading the 3D model from memory 30, computing platform 20 may generate the VR file(s) used for during simulation and rendering operations. For this purpose, VR system 28 may be implemented with a converter component (see, for example, FIG. 3) to perform pre-processing operations that convert or generate VR file(s) from a 3D model file. In contrast to conventional 3D model files, VR file(s) consistent with embodiments of the present invention, may be optimized to facilitate real-time, interactive display of the complex environment. For example, the VR file(s) may be constructed with an octree and/or a list of occluder candidates to permit visibility and culling operations to be performed more efficiently during run-time operations. Further, the VR file(s) may include a collision detection hierarchy to facilitate collision detection operations during run-time operations (see, for example, FIG. 5).

Once the VR file(s) are prepared, simulation and rendering operations may be performed by computing platform 20 to display successive frames of the complex virtual environment to the user. During simulation, input from the user may be collected and analyzed by VR system 28 to determine desired movements or operations for the next frame to be rendered. Based on the collision detection hierarchy of the VR file(s), VR system 28 may perform collision detection operations to determine if the desired movements or operations cause any collision(s) with objects or elements represented in the complex environment (see, for example, FIGS. 16A and 16B). In response to the detection of a collision, an adjusted position or movement may be computed by VR system 28 and provided as output for the next frame. If no collisions are detected, the desired position or operation of the user may be provided as output by VR system 28 to permit rendering operations to be performed.

Based on the output of VR system 28, rendering operations are performed by graphics system 24. For instance, during a rendering phase, visibility and culling operations may be performed by graphics system 24 to determine what cells or elements are visible for the next frame. As further described below, an octree and/or occluder candidates defined in the VR file(s) may be used by graphics system 24 to perform visibility and occlusion culling operations. In addition, curved or rounded elements that are visible in the frame may be dynamically tessellated by graphics system 24 to provide optimum rendering (see, for example, FIG. 23). In response to such operations, OpenGL commands may be issued by graphics system 24 to graphics hardware 18 to cause the next frame to be displayed to the user with display 12.

Figure 7:
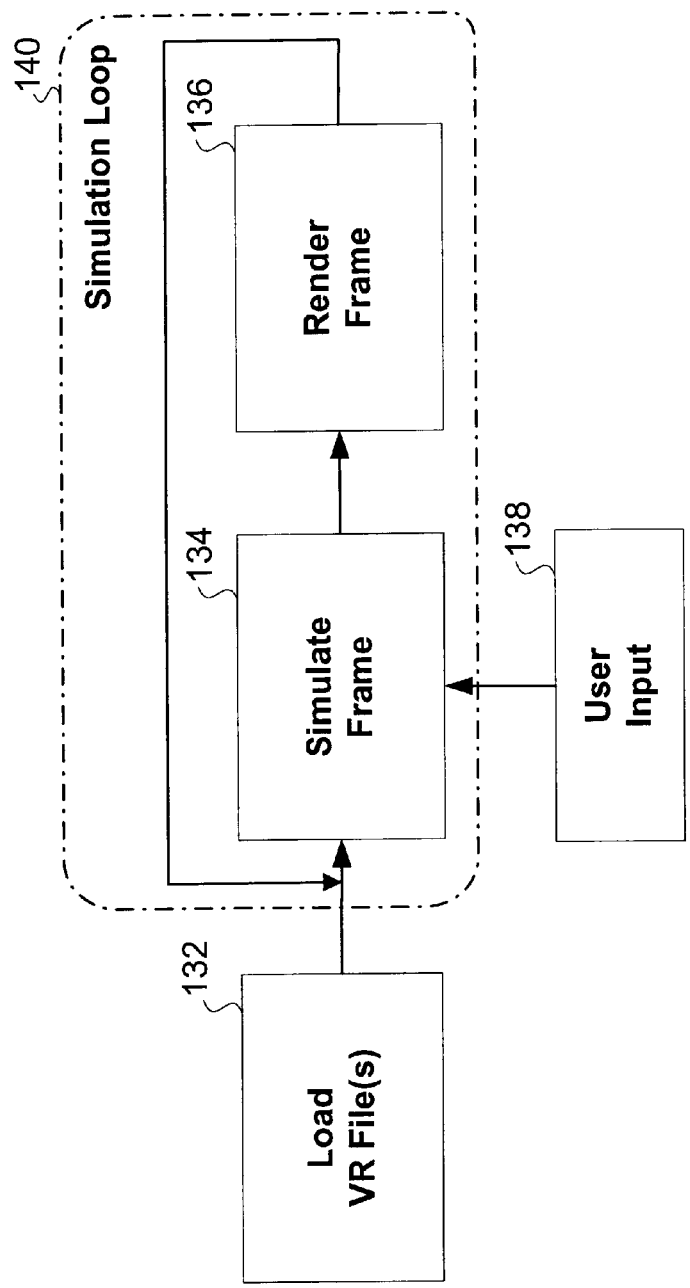
FIG. 7 is an exemplary run-time pipeline, consistent with embodiments of the invention.

Successive frames of the complex virtual environment can be generated with system environment 10 of FIG. 1 by providing simulation and rendering operations as part of a simulation loop (see, for example, FIG. 7). Further, as indicated above, interactive displays may be provided to a user for various complex virtual environments, including those based on large-scale or massive models that contain hundreds of thousands of polygons or even one million or more polygons. Embodiments consistent with the invention, therefore, may be implemented to provide interactive displays of building complexes, off-shore platforms, industrial plants, city dwellings, and other facilities and environments that are highly detailed or contain many different types of elements.

By way of non-limiting examples, FIGS. 25–28 illustrate exemplary complex environments that may be interactively rendered by system environment 10 of FIG. 1. For instance, FIGS. 25A and 25B illustrate exemplary rendered frames of the Reichstag building complex (designed by the architectural firm of Foster and Partners of London, England) that includes many exterior as well as interior details and elements. In contrast, FIGS. 26A and 26B are exemplary rendered frames of an offshore platform (representative of a platform designed by Shell) that contains numerous structural details including curved features and rounded piping. Complex environments of industrial plants, such as the exemplary electrical energy plant of FIGS. 27A and 27B, may also be interactively displayed to a user with system 10 while providing various simulation capabilities (such as interactive walk-through operations with collision detection). Such features may also be provided for modeled environments of complex dwelling environments or landscapes. For instance, FIGS. 28A and 28B are exemplary rendered frames of a city landscape that can be interactively displayed to a user with system environment 10.

Figure 2:
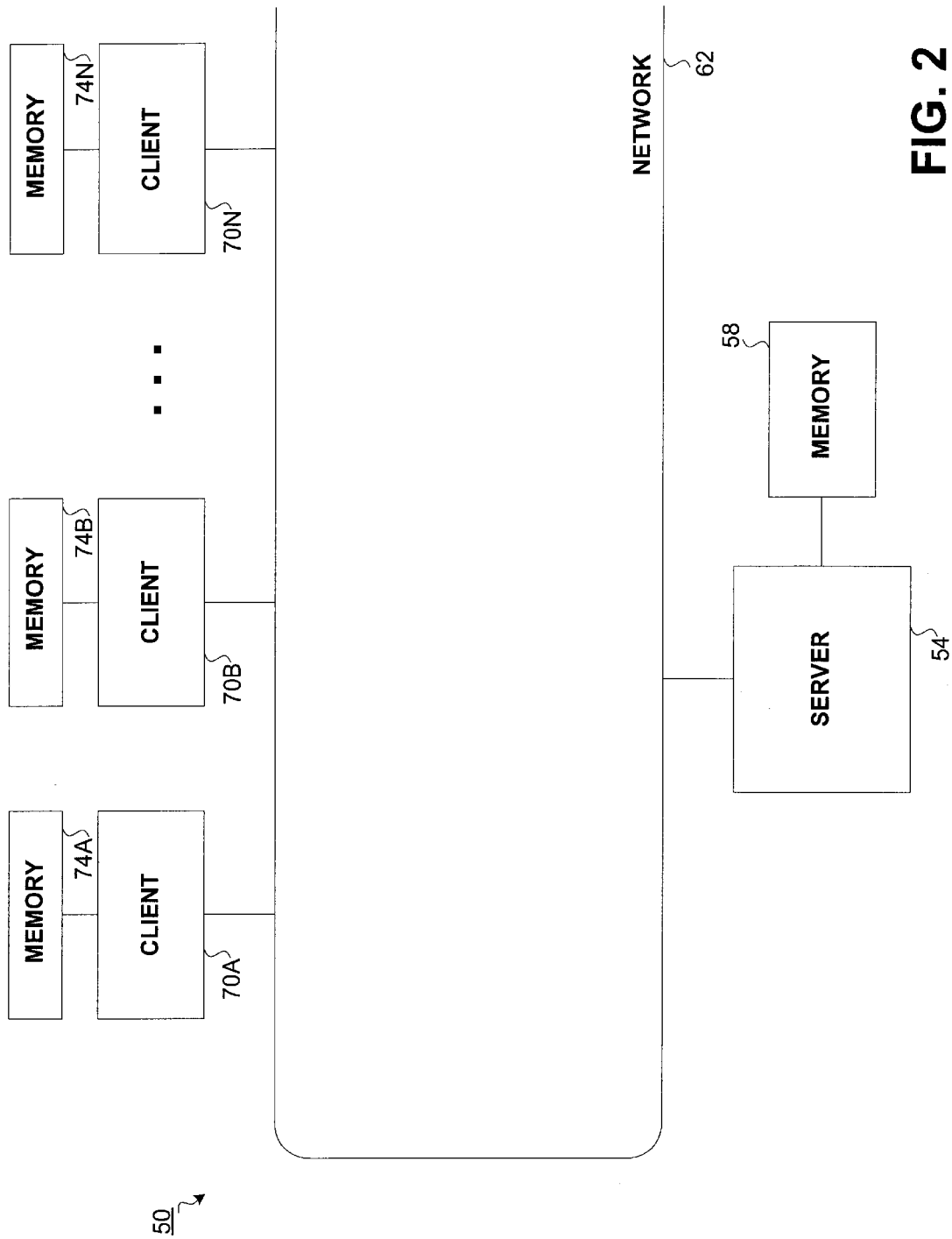
FIG. 2 is an exemplary network environment for providing interactive displays of complex virtual environments, consistent with embodiments of the invention.

Consistent with embodiments of the invention, interactive displays of complex virtual environments may be provided to one or more users through a network environment. For instance, FIG. 2 illustrates an exemplary network environment 50 for providing interactive displays to a set of users located at client stations 70A–70N. Client stations 70A–70N may function in accordance with a peer-to-peer relationship or according to a client-server relationship with a server 54. Such arrangements may be used for various applications, including training sessions where one user acts as an instructor to train or instruct one or more other users. Network environments such as that illustrated in FIG. 2 may also be used for VR applications, where role-playing or involvement by two or more users is required.

As illustrated in FIG. 2, client stations 70A–70N and server 54 are connected to a network 62. While FIG. 2 illustrates multiple client stations 70A–70N, it will be appreciated that system 50 may be implemented for any number of users. Depending on the location and/or relationship between the users, network 62 may be implemented with a local area network, a wide area network, a virtual private network or any other type of private and/or secure communications network. Network 62 may also be implemented using public communications networks, such as the Internet. To facilitate communication over network 62, a network protocol (such as TCP/IP) may be used by and between client stations 70A–70N and/or server 54.

In the network environment 50 of FIG. 2, simulation and rendering operations may be performed entirely at each of the client stations 70A–70N. In such a case, desired movements or operations by a user at one client station may be communicated via network 62 to users at other client stations in accordance with a peer-to-peer relationship. Based on the communication of such information, each client station 70A–70N may perform simulation and rendering operations similar to that performed by computing platform 20 in FIG. 1. In order to perform these operations, identical VR file(s) may be stored in a memory 74A–74N associated with each of the client stations 70A–70N.

In a peer-to-peer relationship, such as that described above, server 54 may be omitted from network environment 50. However, to provide interactive displays in accordance with a client-server relationship, server 54 may be provided to function with client stations 70A–70N through network 62. For example, simulation operations may be performed centrally at server 54 based on user input from each of the client stations. Using data from VR file(s) stored in memory 58, server 54 may simulate the desired movements or operations by one or more users in the complex environment and provide output through network 62 to indicate the camera or viewer position for each of the client stations 70A–70N. Based on the output of server 54, each of the client stations may then perform rendering operations and graphically display each frame. In such a client-server arrangement, server 54 may also perform synchronization and user management functions for client stations 70A–70N. For instance, server 54 may a coordinate and synchronize the transfer of data between the client stations. Further, server 54 may inform users when other users are connected or disconnected from the network.

As indicated above, VR file(s) may be stored in memory 58 associated with server 54, as well as in memory 74A–74N associated with each of the client stations 70A–70N. As with the embodiment of FIG. 1, the VR file(s) may include optimized data representing a complex environment, as well as other data to facilitate simulation and rendering of the complex environment on an interactive basis with each user. In the embodiment of FIG. 2, the VR file(s) may be generated from 3D model files by pre-processing operations performed by, for example, server 54. Further, memory 58 and memory devices 74A–74N may be implemented in a similar fashion to memory 30 of FIG. 1, and may also store data (such as 3D model files) in addition to the VR file(s).

For client-server arrangements, server 54 may be implemented in a similar manner as VR system 28 of FIG. 1. Thus, server 54 may be implemented with a workstation, a server, a personal desktop computer, a laptop or any other computing-based platform. Further, as with VR system 28, server 54 may include software-based components for performing simulation operations (see simulation component 25 of FIG. 3). Also, server 54 may include communication hardware for network 62 and other hardware or software-based components for performing synchronization and user management functions.

As indicated above, client stations 70A–70N may be configured to receive simulation results from server 54 over network 62. To handle such information, client stations 70A–70N may be implemented with a laptop, a workstation, a personal desktop computer or computing-based platform installed with communication hardware. Client stations 70A–70N may also be implemented with components (similar to graphics hardware 18, graphics system 24 and display 12 of FIG. 1) for performing rendering operations and displaying each rendered frame. Further, to receive user input and/or provide feedback, client stations 70A–70N may also include a user interface, such as user interface 40 of FIG. 1.

In peer-to-peer arrangements, each of the client stations 70A–70N may be additionally configured with components or systems for performing simulation operations (such as VR system 28 of FIG. 1). During simulation, client stations 70A–70N may also be adapted to track and synchronize movements with other client stations to detect and resolve collisions based on user input.

When operating in accordance with a client-server relationship, server 54 may periodically poll network 62 and detect user input from one or more of the client stations 70A–70N. User input from each client station is used by server 54 to perform simulation operations for each frame based on the VR file(s) stored in memory 58. If user input is received by more than one client station 70A–70N over a predetermined polling period, then server 54 may: analyze all of the user input; perform simulation operations (such as collision detection); and update the viewer or camera position of each user for the next frame to be rendered. Server 54 may be adapted to provide simulation such that one or more users are represented within a complex virtual environment by an avatar and/or users can observe other users represented within the environment. With such simulation capabilities, various applications can be provided for multiple users with system 50, such as training exercises where one user acts as an instructor for other users.

After simulating each frame, the output of server 54 is provided to client stations 70A–70N via network 62. Based on the output of server 54 and the data in the VR file(s), each client station may perform rendering operations for the frame to be rendered. Such rendering operations may include visibility and occlusion culling operations, as well as dynamic tessellation of curved or rounded elements that are determined to be visible in the frame. During the rendering phase, each client station may also extrapolate and determine the best fit for displaying the rendered frame to the user at the client station. To display the rendered frame, a set of commands (such as OpenGL commands) may be issued to the graphics hardware at each client station. Further, if feedback is simulated for users, then each client station may provide feedback (where applicable) to a user through the haptic devices located at the client station.

Figure 3:
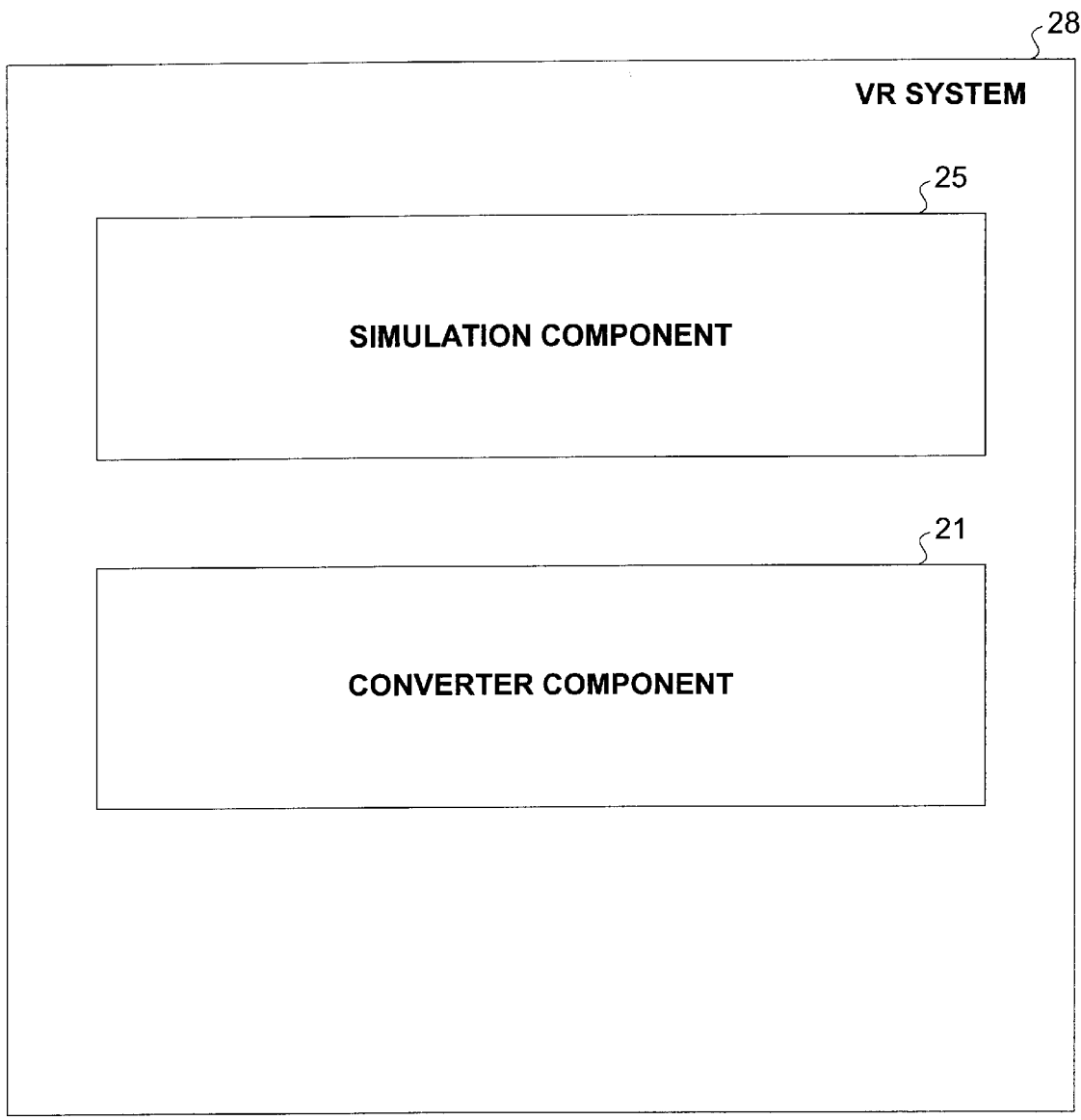
FIG. 3 is an exemplary virtual reality (VR) system, consistent with embodiments of the invention.

FIG. 3 illustrates exemplary VR system 28, consistent with embodiments of the present invention. VR system 28 may be implemented as part of computing platform 20 (see FIG. 1) or server 54 (see FIG. 2) to perform various operations. As illustrated in FIG. 3, VR system 28 includes a simulation component 25 and a converter component 21. These components may be implemented as software-based applications or components that are developed using a programming language and/or a graphics development language or libraries.

Converter component 21 may be configured to perform pre-processing operations including the conversion of 3D model files into VR file(s). Converter component 21 may be implemented using, for example, C++ and Microstation development language for generating VR file(s). An exemplary embodiment of VR file(s) is provided in FIG. 5 and exemplary embodiments of the pre-processing and conversion operations performed by converter component 21 to generate VR file(s) are described below with reference to, for example, FIGS. 6 and 9.

In the embodiment of FIG. 3, simulation component 25 is configured to perform run-time operations including the processing of user input and simulation to permit the rendering of frames of a complex virtual environment. Simulation component 25 may be implemented using a programming language such as C++ or other comparable programming languages. An exemplary embodiment of simulation component 25 is explained below with reference to FIG. 4 and exemplary embodiments of the run-time and simulation operations performed by simulation component 25 are further described below with reference to, for example, FIGS. 7 and 8.

Figure 4:
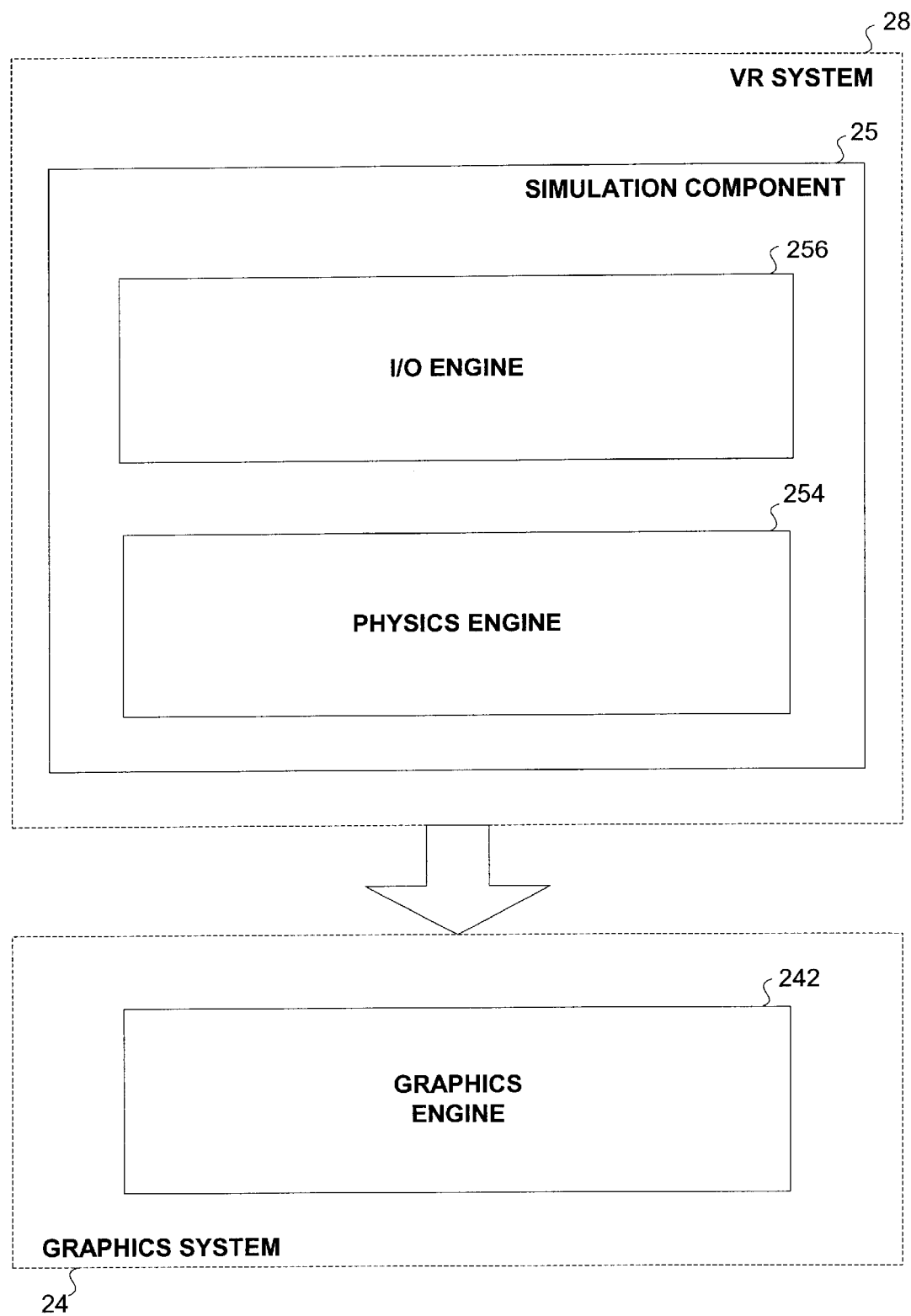
FIG. 4 is an exemplary VR system and graphics system, consistent with embodiments of the invention.

FIG. 4 illustrates an exemplary embodiment of VR system 28 and graphics system 24, consistent with embodiments of the invention. As illustrated in FIG. 4, simulation component 25 of VR system 28 may be implemented with a number of software-based engines or sub-components. For example, simulation component 25 may include a physics engine 254 and an I/O engine 256. During run-time operations, user input is received and pre-processed by I/O engine 256. I/O engine 256 may perform any necessary processing operations on the user input (such as the translation of signals received from user interface or input devices) and provide the user input to physics engine 254. If feedback is provided to the user, I/O engine 256 may also output feedback instructions generated by simulation component 25 to haptic device(s) controlled or worn by the user. This may cause various sensations (such as pressure, resistance, vibration, sound, etc.) to be provided to the user in order to simulate activity or occurrences in the complex virtual environment.

Based on user input, physics engine 254 determines a user's desired movements or operations for each frame to be rendered. As part of this determination, physics engine 254 may consider the direction and velocity of a moving object or avatar based on the user input. The effect of gravity may also be analyzed to calculate the desired position for the next frame. Further, using the VR file(s), physics engine 254 may detect if any collisions exist with objects in the simulated environment due to the desired movement or operations of the user. If a collision is detected, physics engine 254 may resolve any such collisions to determine the user's final adjusted position or viewer position for the next frame. To perform such operations, physics engine 254 may be adapted to perform collision detection operations, such as those further described below with reference to, for example, FIGS. 8 and 16A–16B.

The viewer or camera position determined by physics engine 254 is provided to graphics system 24. As illustrated in FIG. 4, graphics system 24 may include a graphics engine 242. Graphics engine 242 may be a software-based engine or component that performs various rendering operations for each frame to be rendered to a user. For example, based on the viewer position and data contained in the VR file(s), graphics engine 242 may determine which objects are visible and which objects are occluded or hidden from view for each frame. In addition, for specific visible elements or objects defined in the VR file(s) (such as rounded or curved objects), graphics engine 242 may perform dynamic tessellation operations to control the level of detail by which such elements are displayed to the user. To perform such rendering operations, graphics engine 242 may be implemented with occlusion culling and dynamic tessellation functions, such as those further described below with reference to, for example, FIGS. 8, 19 and 23.

The results of the rendering operations performed by graphics engine 242 may include a list of vertex arrays for the elements determined to be visible, as well as vertex arrays for each dynamically tessellated element. Based on these results, commands (such as Open GL commands) may be generated by graphics engine 242 to the graphics hardware 18 (not illustrated in FIG. 4) to cause the display of each rendered frame to the user.

Figure 5:
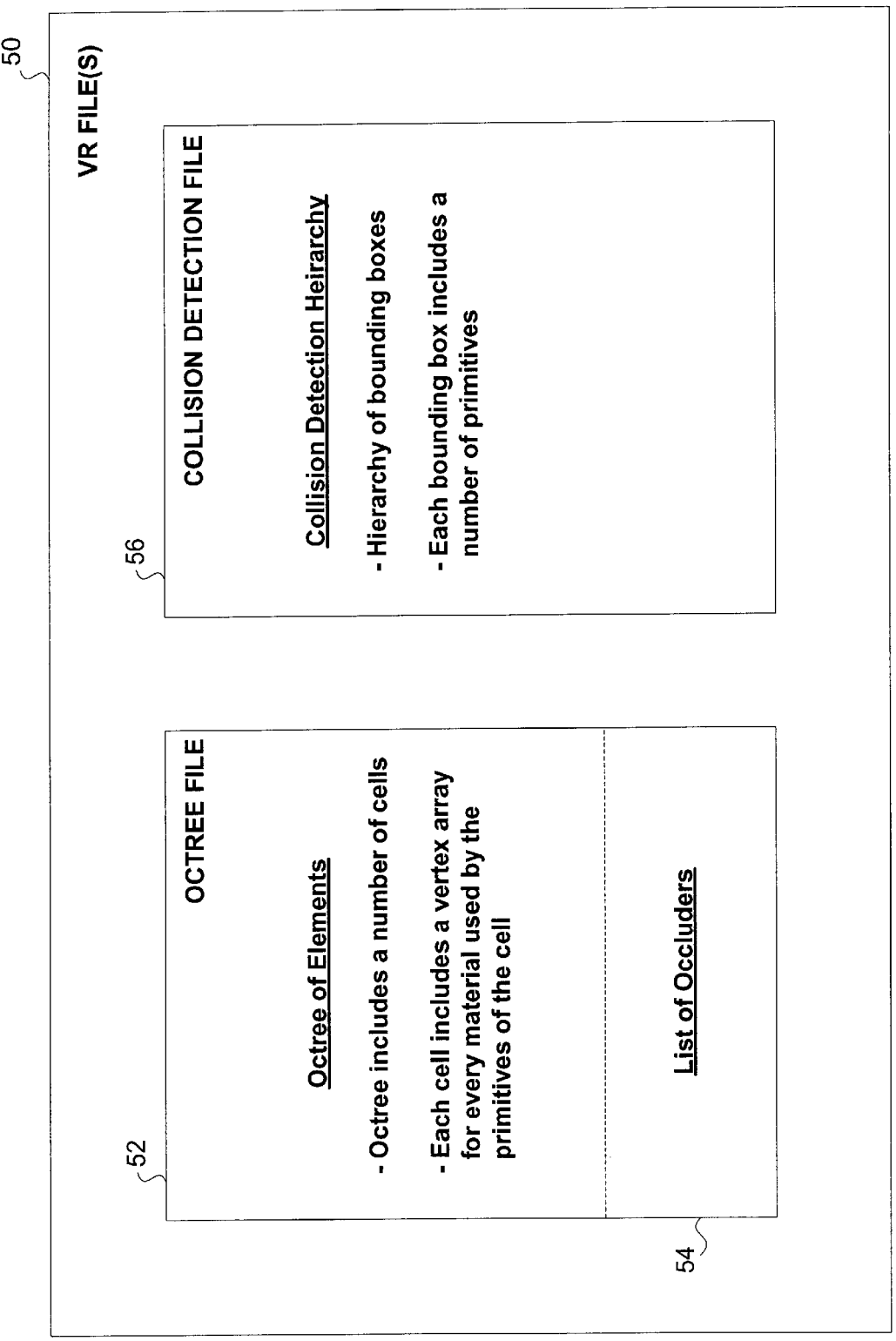
FIG. 5 illustrates the contents of exemplary VR file(s), consistent with embodiments of the invention.

FIG. 5 illustrates exemplary VR file(s) 50, consistent with embodiments of the invention. Generally, VR file(s) contain data and information relating to a complex environment for run-time operations. In contrast to conventional 3D model files, the VR file(s) may be optimized for facilitating real-time rendering and interactive displays of a complex environment for users. Thus, as illustrated in FIG. 5, VR file(s) 50 may include an octree file 52 to facilitate, for example, visibility determinations. Further, a collision detection file 56 may be generated to optimize the VR file(s) for collision detection operations. In accordance with embodiments of the invention, files 52 and 56 may be stored as separate VR files or they may be stored as part of a single VR file. For ease of reference, whether stored separately or jointly, these files are herein referred to as "VR file(s)."

Octree file 52 and collision detection file 56 may be generated from data representing a complex environment. For example, octree file 52 and collision detection file 56 may be generated by VR system 28 based on data from conventional 3D model files, such as Microstation or AutoCAD files. Such models of complex environments typically include data for describing primitives (such as points, lines, polygons, polyhedra and/or free-form surfaces) that define the shape of components of an object. A model for a complex environment may also include data for describing object attributes, such as line style, color, or surface texture, and connectivity relationships and positioning that define how the components fit together. In a 3D model, curved surfaces can be approximated with polygons and solid objects can be represented by polyhedra, each of which represents a set of polygons connected at a common edge and enclosing a volume.

When rendering a complex environment, objects and surfaces that are hidden or occluded by other objects or surfaces closer to the viewpoint may be eliminated. For complex environments, the complexity of visibility determination can be simplified by spatially partitioning or dividing the environment into cells or cubes. For example, according to an embodiment of the invention, octrees can be used to subdivide a complex environment represented by a 3D model. Octrees provide a hierarchical approach to spatially-partitioning, whereby an environment is divided into eight equally sized, three-dimensional cells (e.g., cubes) and each cell is further divided into eight cells until a cell is empty or contains fewer than a predetermined number of elements or primitives (such as polygons or triangles). Consistent with embodiments of the invention, each level of the octree may be represented by nodes that are hierarchically related to one another in accordance with each level of division.

During pre-processing, an octree may be constructed for a complex environment represented by a 3D model. As illustrated in FIG. 5, data representing the octree can be stored as part of octree file 52. Octree file 52 includes data representing the octree of elements. The octree can be defined by any number of cells, whereby each cell includes a vertex array for every material used by the elements or primitives of the cell. Octree file 52 may also include one or more occluder candidates 54. Occluder candidates may be generated during pre-processing of a 3D model based on elements or primitives that have characteristics that classify them as global candidates for consideration when perform occlusion culling (such as a large surface area). According to embodiments of the invention, occluder candidates 54 may be stored together as a separate list in octree file 52. Alternatively, each occluder candidate may be merged with the octree and stored relative to nodes of the octree for cells occupied by the occluder candidate.

When performing simulation operations, collisions with objects may be detected and simulated to replicate real-world phenomena. The task of collision detection can be complex, especially for environments based on massive models. To improve such performance, spatial partitioning of the environment may also be performed during pre-processing to provide a collision detection hierarchy. In particular, a collision detection file 56 may be generated from a 3D model by creating grid subdivisions. As further described below, the modeled environment may be divided into a grid of equally sized cubes. After allocating elements or primitives (such as triangles) to the cubes, a bounding box tree (such as an axis-aligned bounding box (AABB) tree) may be created for each cube. Each bounding box can be created by dividing a cube into two equally sized cells or cubes and then further dividing the cubes until a cube is empty or contains fewer than a predetermined number of elements or primitives. As with octrees, each level of the bounding box may be represented by nodes that are hierarchically related to one another in accordance with each level of division. This hierarchy of bounding boxes may be stored to provide the collision detection hierarchy of collision detection file 56.

Figure 6:
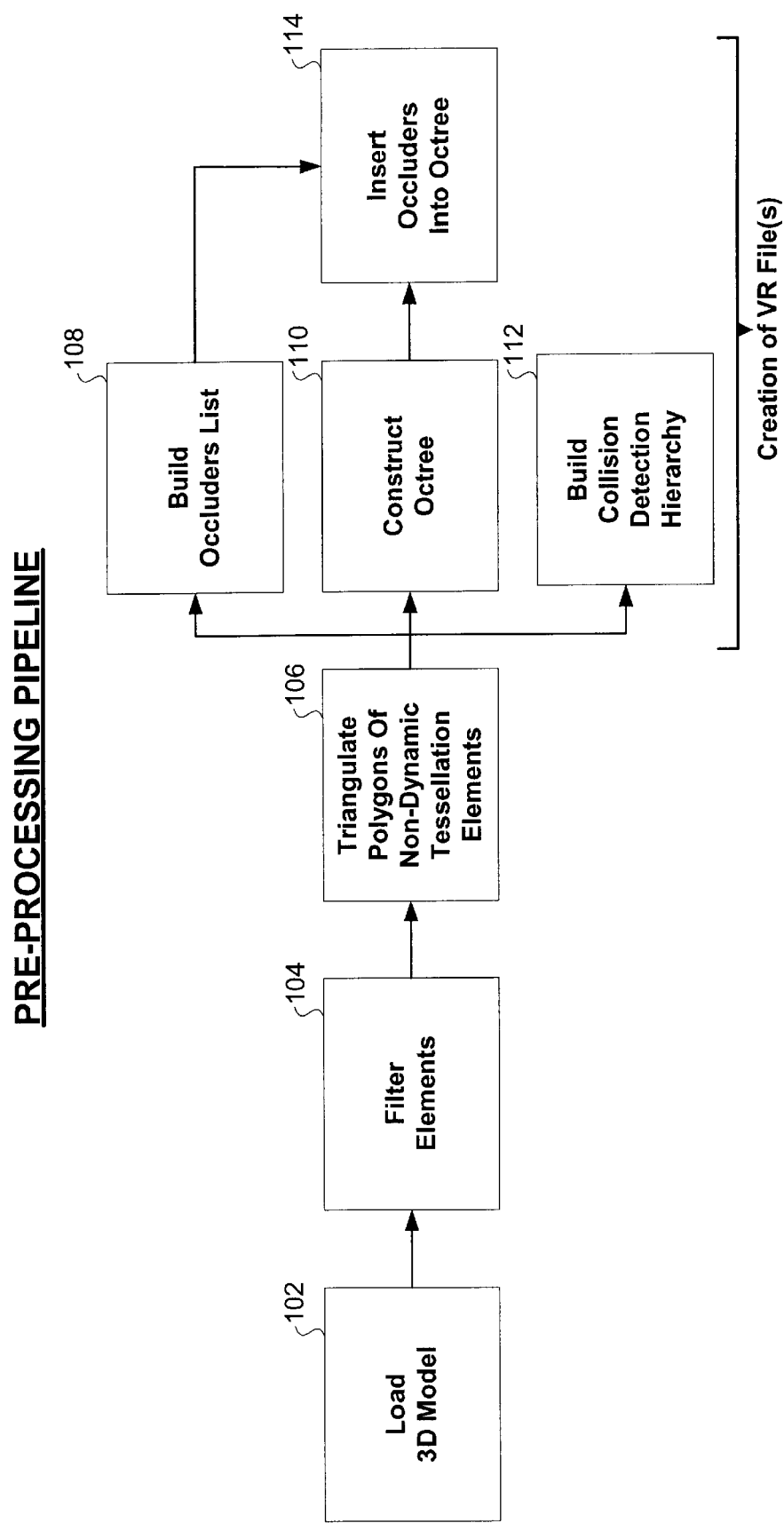
FIG. 6 is an exemplary pre-processing pipeline, consistent with embodiments of the invention.

In accordance with an embodiment of the invention, FIG. 6 illustrates an exemplary pre-processing pipeline. The exemplary pre-processing pipeline of FIG. 6 may be implemented to generate VR file(s) based on a 3D model of the complex virtual environment. Such operations may be performed by VR system 28 of system environment 10 (FIG. 1) or server 54 of network environment 50 (FIG. 2). For purposes of illustration, however, reference will be made to the embodiment of FIG. 1 to describe the operations and features of FIG. 6.

As illustrated in FIG. 6, the pre-processing pipeline begins with the loading of a 3D model file (operation 102). For example, VR system 28 may load and/or access a 3D model file from memory 30. The 3D model comprises data for defining all objects in the modeled complex environment, including object attributes (such as color, surface texture, etc.). Since most conventional 3D model files are not optimized for real-time simulations or rendering, the data from the 3D model is analyzed during pre-processing to generate VR file(s), consistent with embodiments of the invention.

After loading the 3D model file, the elements or primitives (such as polygons or triangles) of the complex environment are analyzed and filtered (operation 104). In particular, VR system 28 may analyze the 3D model data to identify and filter elements that can be dynamically tessellated during run-time operations. In accordance with an embodiment of the invention, elements that have curved or rounded features may be filtered from other elements in the 3D model and identified as dynamic tessellation elements. For instance, elements including an arc, an ellipse, a curve and/or a b-spline can be filtered from other elements. Such dynamic tessellation elements can be identified based on the name, structure and/or format of the data. For example, 3D models developed with Microstation may designate element types by specific name or header. In addition, the structure or format of the data can be analyzed to confirm the identity of a particular element type. For instance, based on the type of files used (Microstation, AutoCAD, etc.), element types in a 3D model may be identified in accordance with their predetermined data structure or format.

The name, structure and/or format of elements defined in 3D model files may vary according to the software version or edition with which it was developed. To overcome such drawbacks, routines may be developed to identify element types regardless of the version or edition with which the 3D model was created. For instance, a software-based component may be created using Microstation Development Language (MDL) to analyze data sets defining elements in a 3D model regardless of the version of Microstation, 3D model file.

When filtering elements (operation 104), VR system 28 may reformat and store any identified dynamic tessellation elements according to element type. As further described below with reference to FIGS. 10A–10C, specific element types can be stored in predetermined data formats that permit the VR file(s) to be processed and handled easier during run-time operations. For all remaining elements that are not filtered (i.e., all non-dynamic tessellation elements), triangulation operations may performed for polygons having more than three line segments (operation 106). In particular, each non-dynamic tessellation element is analyzed and stored either as a single triangle or set of triangles. Thus, if an element is represented as a single triangle in the 3D model, the element will be stored as a single triangle in the VR file(s). However, if the element is represented by a polygon or a set of polygons having more than three line segments, then each polygon may be triangulated and stored as a group or set of triangles. While storing all non-dynamic tessellation elements as triangles may increase the overall volume of data related to these elements, this allows the system to take advantage of state-of-the-art graphics hardware (such as graphics cards) that can directly handle and process triangle elements.

After triangulating polygons (operation 106), the final operations of the pre-processing pipeline are performed in order to create the VR file(s). As illustrated in FIG. 6, such operations may include: building a list of occluder candidates (operation 108); constructing an octree (operation 110); and building a collision detecting hierarchy (operation 112). These operations may be performed in parallel or in any sequence by VR system 28. Further, the results of the octree may be stored as part of an octree file (such as octree file 52) and the results of the collision detection hierarchy may be stored as part of a collision detection file (such as collision detection file 56). As described with reference to FIG. 5, the list of occluders can be stored as a separate list in the VR file(s). Alternatively, the list of occluders can be merged into the related nodes of the octree. In such a case, any identified occluder candidates can be inserted and merged into the octree (operation 114) after the octree is constructed.

Consistent with embodiments of the invention, FIG. 7 illustrates an exemplary run-time pipeline for providing interactive displays of complex virtual environments. The run-time pipeline of FIG. 7 includes simulation and rendering operations that can be performed with VR file(s) that have been generated for a complex environment. The operations of FIG. 7 can be performed by computing platform 20 of system environment 10 (FIG. 1) or server 54 and/or client stations 70A–70N of network environment 50 (FIG. 2). For purposes of illustration, however, reference again will be made to the embodiment of FIG. 1 to facilitate the description of FIG. 7.

Run-time operations are initiated by loading VR file(s) (operation 132). As discussed above, VR file(s) may be stored in memory 30. To select particular VR file(s), a dialog box may be displayed to the user so that the appropriate VR file(s) can be identified or selected. When loading the VR file(s), various system configurations may be performed. For example, based on input from a user, simulation features (such as collision detection or gravity effects) may be activated or deactivated by computing platform 20. Also, other system configurations (such as memory management operations) may be initiated by computing system 20. Exemplary embodiments for performing memory management operations are described below with reference, for example, to FIGS. 24A, 24B and 24C.

Consistent with embodiments of the invention, once the VR file(s) are loaded (operation 132), a simulation loop is performed (operation 140) based on user input (138). The simulation loop for a complex virtual environment may be reiterated to render successive frames of the environment until the run-time pipeline is terminated (based on, for example, an escape or exit command entered by the user).

As further illustrated in FIG. 7, the simulation loop includes frame simulation (operation 134) and frame rendering (operation 136). During simulation of each frame, user input is analyzed to determine desired movements or operations of a moving object or avatar representing the user in the complex virtual environment. By performing operations such as collision detection, VR system 28 can determine the position of the moving object or avatar and the viewer position for the next frame to be rendered. Information determined during simulation is then used to perform rendering operations. During the rendering phase, occlusion culling and dynamic tessellation operations can be performed, in accordance with embodiments of the invention. The results of the rendering operations can be used by graphics system 24 to cause the rendered frame to be displayed to the user. During the simulation loop, various system configuration operations may be performed, such as memory management operations.

Figure 8:
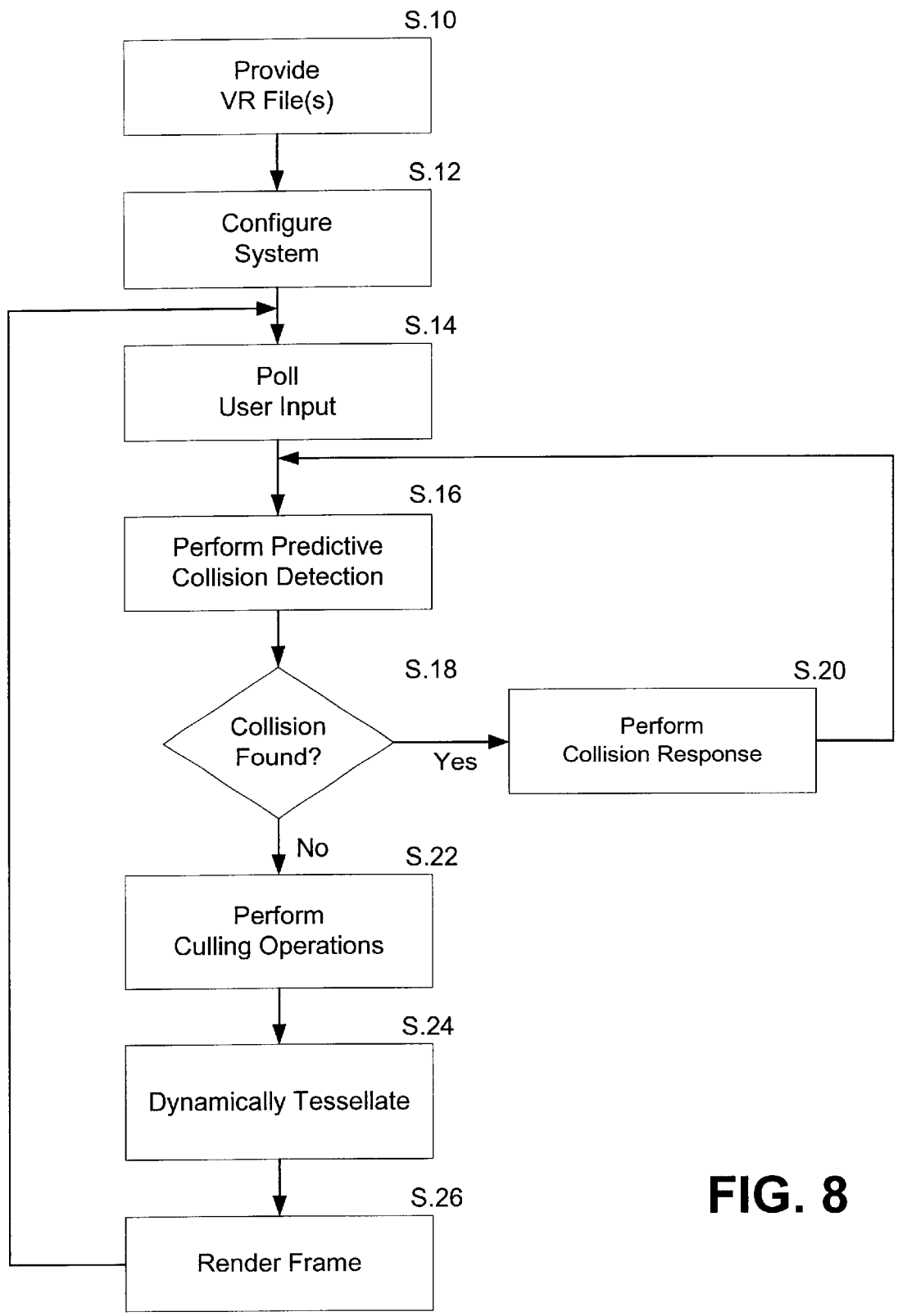
FIG. 8 is an exemplary flow diagram for providing interactive displays of complex virtual environments, consistent with embodiments of the invention.

FIG. 8 is an exemplary flow diagram for providing interactive displays of complex virtual environments, consistent with embodiments of the invention. For purposes of illustration, the exemplary flow diagram of FIG. 8 will be described with reference to the system environment 10 of FIG. 1. The exemplary flow diagram of FIG. 8, however, may be implemented with other environments, including the network environment 50 of FIG. 2.

As illustrated in FIG. 8, in order to provide interactive displays of complex virtual environments, the VR file(s) are provided (step S.10). As described above, VR file(s) may be generated from a 3D model of the complex environment. The 3D model may be generated from a 2D drawing by using 3D modeling software or a 3D reconstructor program based on a laser scanning of the environment. The 3D model may also be created independently by a designer or programmer using 3D modeling software. In cases where the 3D model is based on a 2D drawing or file, 3D features may be selectively defined depending on the complex environment. For instance, if the 2D drawing represents the floor plan of building complex or residence, a 3D model may be created by projecting one or more elements in the drawing (such as walls and/or walkways) to permit better visualization of the floor plan. The elements to be projected in 3D may be uniquely identified in a 2D file (such as by color or texture) to assist in the designer or programmer in creating the 3D model. Once the 3D model is generated, the VR file(s) may be created. To generate the VR file(s), pre-processing operations may be performed by VR system 28. An exemplary pre-processing pipeline for generating VR file(s) is disclosed herein with reference to FIG. 6. Further, an exemplary flow diagram for generating VR file(s) from a 3D model is described below with reference to FIG. 9.

Referring back to FIG. 8, after the VR file(s) are generated, the VR file(s) are loaded or accessed from memory 30. During or after the loading of the VR file(s), any necessary system configurations can be performed (step S.12). As indicated above, various system configuration options may be set by the user. For instance, simulation features (such as collision detection or gravity effects) may be activated or deactivated by a user. Also, specific system configurations (such as memory management operations) may be initiated by computing system 20. An initial viewer position may also be set according to a predetermined default setting for the first frame to be displayed to the user.

Simulation and rendering is then performed to display successive frames of the complex virtual environment based on input from the user. In particular, system 10 can poll for user input over a predetermined time period for each frame (step S.14). For instance, through user interface 40, VR system 28 may detect desired movements or operations entered by the user during the polling period. Using a keyboard, a trackball or a joystick, the user may enter desired movements (forward, back, left, right, etc.) and/or operations (lift, rotate, select, etc.). Based on input detected from the user, VR system 28 then performs simulation operations in order to render the next frame.

For example, predictive collision detection may be performed based on the detected user input (step S.16). Consistent with embodiments of the invention, VR system 28 analyzes all moving objects or avatars to determine if any collisions occur with other objects when moving the object or avatar between its current position and desired position for the next frame. As disclosed herein, the collision detection file 56 of the VR file(s) may be used to detect collisions (see, for example, FIGS. 16A and 16B). If a collision is found (step S.18; Yes), then VR system 28 responds to the collision (step S.20). For example, VR system 28 may project the movement of the object or avatar and determine an adjusted position from the first point of contact. If another collision is detected between the first point of contact and the adjusted position, then another adjusted position is detected until no further collisions are detected (step S.18; No). The final adjusted position is then used in place of the desired destination for purposes of setting the viewer position for the next frame. If no collisions are detected, then the viewer position is set to the desired position. An exemplary flow diagram for performing predictive collision detection operations is described below with reference to FIGS. 16A–16B.

To render a frame, it is necessary to remove or cull all elements or primitives that are outside the view frustum or occluded by other elements or objects. For this purpose, graphics system 24 performs culling operations (including occlusion culling) based on the determined viewer or camera position for the next frame (step S.22). To perform culling operations, the octree file 52 of the VR file(s) can be used. Exemplary flow diagrams for performing culling operations are described below with reference to FIGS. 19 and 20.

In addition to performing culling operations, graphics system 24 may perform dynamic tessellation operations (step S.24). In particular, for dynamic tessellation elements that are in the view frustum and not occluded, graphics system 24 determines a tessellation level for rendering each object. As further described in connection with the exemplary embodiment of FIG. 22, the tessellation level can control the number of triangles used to approximate the object in the rendered frame. For instance, objects or elements may be rendered with increasing number of triangles for higher tessellation levels. Further, objects or elements that appear closer to the camera position or screen may be assigned higher tessellation levels to cause the object or element to be rendered with a greater number of triangles and, therefore, greater detail.

After performing culling operations and dynamic tessellation, the frame is rendered and displayed to the user (step S.26). As part of this process, the results of the rendering operations may be used by graphics system 24 to issue or generate commands (such as OpenGL commands) to graphics hardware 18. The results of the rendering operations may indicate what elements or objects are visible and need to rendered, as well as how to render dynamic tessellation elements that are within the view frustum. Each visible element or object may be represented by a vertex array of x, y, z coordinate points that define the vertices of the element. An index array may be generated that reads into the vertex array and controls the number of triangles used to render the element or object. Thus, a set of OpenGL commands may be generated based on a specific vertex array data for the elements determined to be visible, as well as vertex array data for each visible dynamically tessellated element. In response to the Open GL commands, graphics hardware 18 (such as a graphics card) may cause the display of the next frame on display 12. Thereafter, successive frames may be simulated and rendered (steps S.14–S.26) until run-time operations are terminated by the user.

Figure 9:
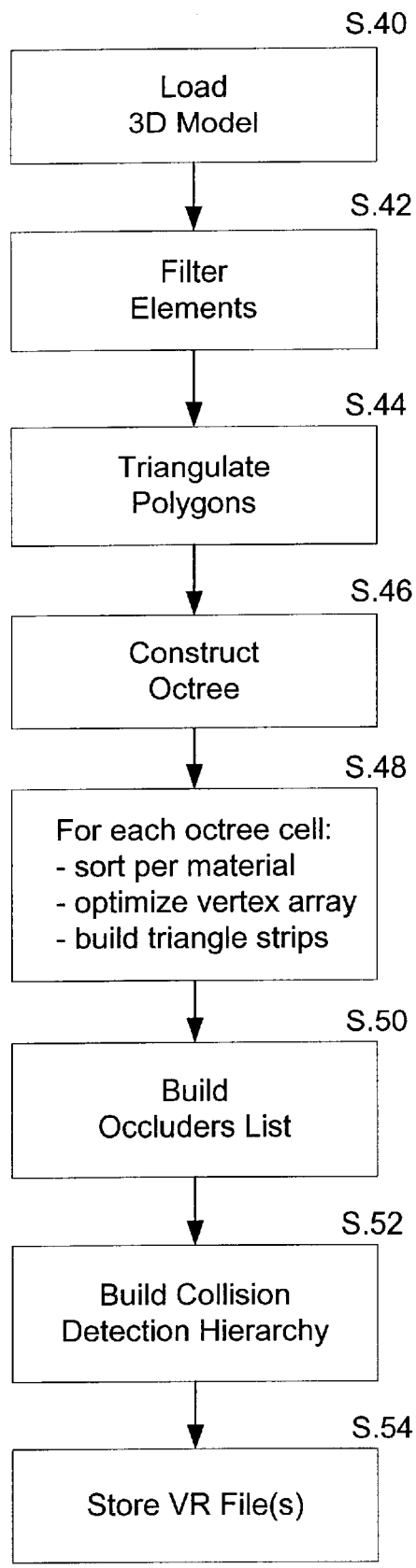
FIG. 9 is an exemplary flow diagram for providing VR file(s) based on a 3D model, consistent with embodiments of the invention.

FIG. 9 is an exemplary flow diagram for providing VR file(s), consistent with embodiments of the invention. As described above, VR file(s) can be generated from conventional 3D models that include data representing a complex environment. The VR file(s) can be generated during pre-processing in order to prepare and store the files before run-time operations are performed. Once created, the VR file(s) can be accessed from memory and used for simulation and rendering operations. The exemplary flow diagram of FIG. 9 may be implemented through various systems or environments, such as the system environment 10 of FIG. 1 or the network environment 50 of FIG. 2. However, for purposes of illustration, reference will be made to the embodiment of FIG. 1 to describe the flow diagram of FIG. 9.

As illustrated in FIG. 9, the exemplary process begins with the loading of a 3D model (step S.40). In accordance with embodiments of the invention, a 3D model file may be designated by the user (using, for example, a displayed dialog box) and accessed from memory (such as memory 30). The 3D model file may be a CAD or other type of 3D model file that represents a complex environment (such as a plant, a building facility, an off-shore platform, etc.). Further, the 3D model file may be generated using Microstation or other types of commercially available software.

To create the 3D model, modeling software may be used to generate the 3D model. The 3D model may also be generated from a 2D drawing or file, such as an engineering or architectural drawing. Thus, the 3D model may be based on a 2D file in which one or more elements have been projected into 3D. Alternatively, the 3D model may be created by laser scanning the environment and using a 3D reconstructor program. When creating the 3D model file, the file may be prepared with various features or functions to facilitate updates to the objects represented in the 3D model. For instance, a virtual reality (VR) library may be provided with a number of special VR functions in order to incorporate such functions into the 3D model file. The VR functions may permit the name, texture, lighting and/or rotational aspects of an object to be specified and, if needed, updated in the future. An initial, viewer or camera position for an avatar may also be defined in the modeled environment. In addition, functional links may be defined for an object to permit functions such as a database link to retrieve information for the object (such as material and/or cost information, etc.).

After accessing or loading the 3D model file, the elements or primitives of the model are filtered (step S.42). For example, VR system 28 may analyze the 3D model data to identify and filter dynamic tessellation elements from other elements that are static or non-tessellated during rendering. In accordance with embodiments of the invention, elements that have curved or rounded features may be filtered and distinguished from other elements in the 3D model. For instance, elements including an arc, an ellipse, a curve and/or a b-spline can be identified as dynamic tessellation elements and filtered from other elements identified as non-dynamic tessellation elements.

Consistent with embodiments of the invention, VR system 28 may identify one or more major types of dynamic tessellation elements, such as cone element types, torus element types, and/or surface-of-revolution element types.

Figure 10A:
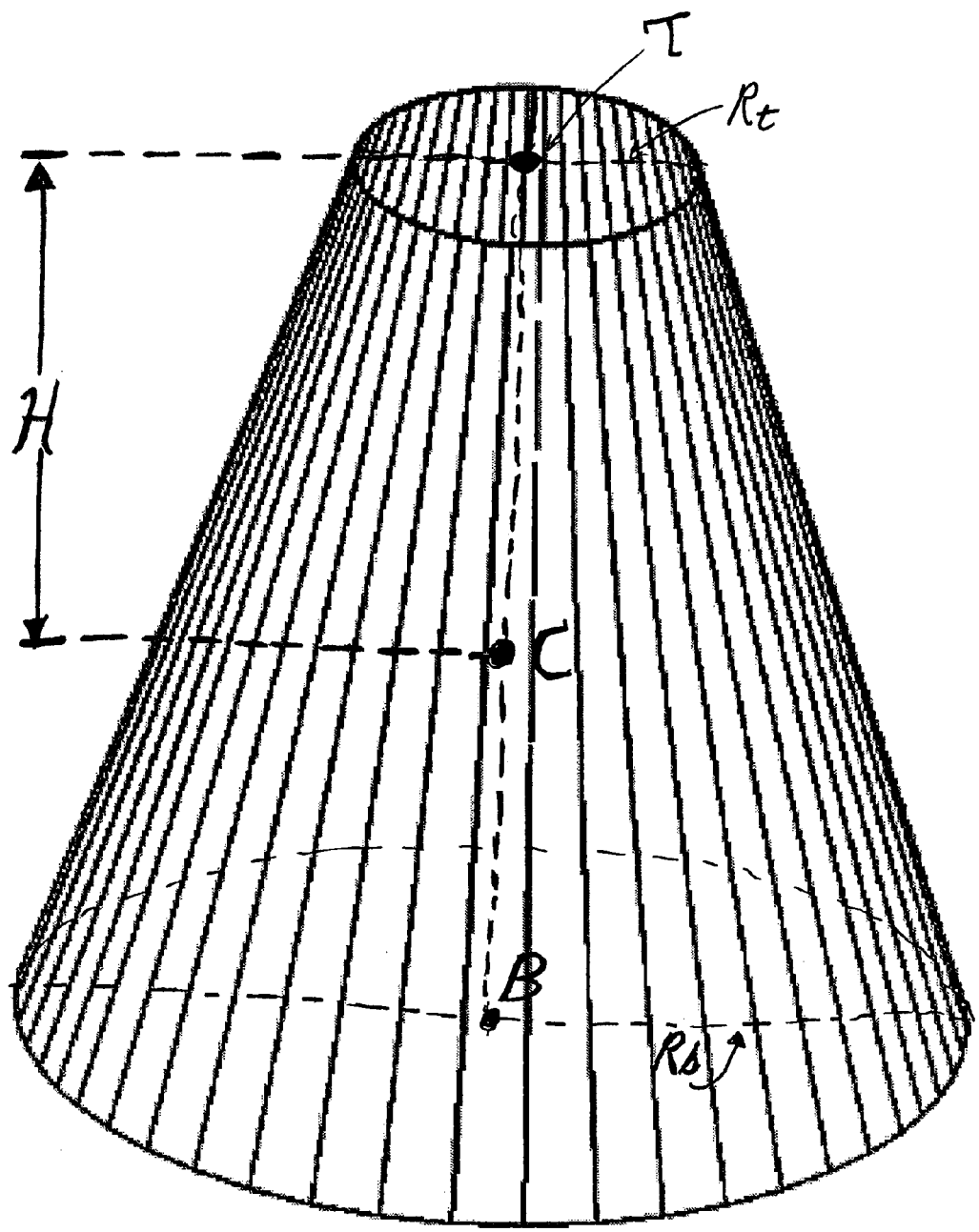
FIGS. 10A, 10B and 10C illustrate examples of a cone element type, a torus element type and a surface-of-revolution element type, respectively.

Generally, a cone element type is defined by two circles or ellipses and one or more lines (see, for example, FIG. 10A). If the dimensions of the two circles or ellipses are identical, the cone element type may represent a cylinder. A torus element type is generally defined by a center point, two ellipses or circles and one or more arcs. Torus element types can represent elbows or donuts (see, for example, FIG. 10B). Surface-of-revolution element types are defined by a number of parameters including a center point, an ellipse and an angle of rotation. Surface-of-revolution element types may represent different types of curved surfaces or objects (see, for example, FIG. 10C).

To identify dynamic tessellation elements, VR system 28 may analyze the name, structure and/or format of the data representing each element in the 3D model. For example, as indicated above, 3D model files developed with Microstation may designate certain element types by specific element names. In addition, the structure or format of the data can be analyzed to confirm the identity of a particular element type. For instance, a cone element type in a Microstation file is defined by a data structure comprising a header followed by two ellipses and four lines. Further, in a 3D model developed with Microstation, a torus element type developed is defined by a data structure comprising a header followed by two ellipses and a set of arcs (such as four arcs) and a surface-of-revolution element type is defined by a header and a data set indicating a surface-of-revolution. Once again, a software-based component may be created using a software-manufacturer-specific, development language (such as Microstation Development Language (MDL)) that permits data sets defining elements in the 3D model to be identified regardless of the version of 3D model file.

Figure 10B:
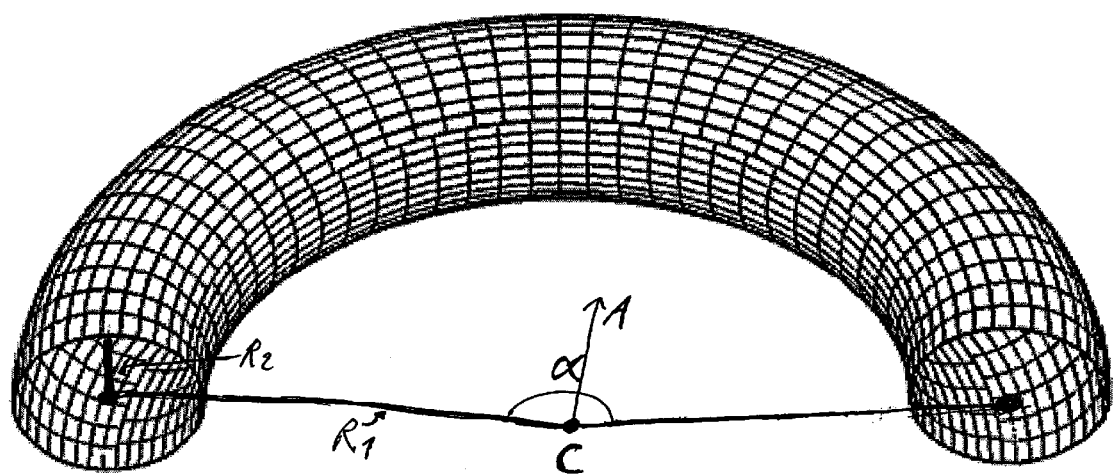

For each identified dynamic tessellation element, VR system 28 may store the element in an optimized data format in the VR file(s) to better facilitate run-time operations. For example, as illustrated in FIG. 10A, a cone represented by a cone element type may be stored as a data structure including: a center point of the top (T); a center point of the bottom (B); a center point (C) on the axis between T and B; a radius of the top ($R_t$); and a radius of the bottom ($R_b$). Further, as indicated in FIG. 10B, a torus represented by a torus element type may be defined by a data structure including: an axis of revolution (A); a center point on the axis of revolution (C); an angle of revolution ($\alpha$); an internal radius ($R_1$); and an outer radius ($R_2$). A surface-of-revolution, such as that depicted in FIG. 10C, may be represented by a surface-of-revolution element type stored as a data structure comprising: an axis of revolution ($A_s$); a center point of the revolution ($C_s$); an angle of the revolution ($\alpha_s$); a radius of the revolution ($R_s$); a center point of the ellipse ($C_A$); an angle of the ellipse ($\alpha_A$); a shorter radius of the ellipse ($R_{A1}$); and a longer radius of the ellipse ($R_{A2}$).

For the remaining elements that are not filtered (i.e., all non-dynamic tessellation elements), triangulation operations may be performed (step S.44). In particular, VR system 28 may analyze each non-dynamic tessellation element in the 3D model and store it either as a single triangle or set of triangles. Accordingly, if an element is represented as a single triangle in the 3D model, the element will be stored as a single triangle in the VR file(s). However, if the element is represented by a polygon with more than three sides or a set of polygons, then each polygon is triangulated and stored as a group or set of triangles. While storing all non-dynamic tessellation elements as triangles may increase the overall volume of data needed to define these elements, all elements should be represented by triangles for rendering purposes to take advantage of state-of-the-art graphics cards that can directly handle triangles without any additional processing (CPU) resources required for rendering.

Consistent with embodiments of the invention, various techniques may be employed for triangulating polygons. For example, VR system 28 may be implemented to generate sets of triangles by analyzing the vertices of a polygon. Alternatively, a conventional graphics utility, such as OpenGL utility library (GLU), may be provided to perform triangulation operations. In such a case, a specific utility may be called by VR system 28 by providing the vertices of the polygon to be triangulated, and in response the utility may perform triangulation operations and output a set of triangles for the polygon.

After filtering dynamic tessellation elements (step S.42) and triangulating polygons (step S.44), an octree is constructed (step S.46). As indicated above, an octree can be constructed by spatially partitioning or dividing the complex environment into cells or cubes. Octree as well as other types of partitioning techniques can be used to simplify the task of determining which objects and surfaces are visible versus those that are hidden or occluded when rendering the complex environment.

The octree may be constructed from the filtered dynamic tessellation elements (reformatted and stored in an optimized data format) and non-dynamic tessellation elements (including polygonal elements that have been triangulated). To construct an octree, a single cell is first defined that contains the entire modeled environment, including all dynamic and non-dynamic tessellation elements. This cell is then divided into eight cells by cutting or dividing along each of three axes (x, y, z). For a 3D environment, each cell of the octree represents a three-dimensional volume defined by two x, y, z points (i.e., a minimum point and a maximum point for the cell). Each divided cell is then further divided into eight cells, with such cell division continuing until a cell is empty or contains fewer than a predetermined number of elements or primitives (such as polygons or triangles). Consistent with embodiments of the invention, each level of the octree may be represented by nodes that are hierarchically related to one another in accordance with each level of division.

When dividing a cell (including the first bounding cell), VR system 28 may cut or divide the cell at the center point of the cell to thereby create eight, equally-sized cells. Alternatively, VR system 28 may determine the median location of all triangles within the cell and divide the cell at the median location. Such a technique may be used to provide a more balanced octree, especially for environments in which triangles are not evenly distributed in space. When using the median location of triangles to divide cells, the resulting cells may be unequal in size. However, this will not effect the usage of the octree, since all cells are simply defined by a set of coordinates that define the vertices of the cell.

When performing cell division to construct the octree, an analysis may be performed to determine the number of elements that are contained within each cell. Therefore, as indicated above, VR system 28 may analyze and count non-dynamic tessellation elements (i.e., triangles) for the purposes of determining whether to further divide a cell. By way of example, cell partitioning for the octree may continue until a cell contains fewer than approximately 10,000 triangles. Further, dynamic tessellation elements may be analyzed to determine whether to further divide a cell. By way of example, cell partitioning for an octree may continue if the cell contains more than 1,000 dynamic tessellation elements. As such, the number of non-dynamic tessellation elements and/or the number of dynamic tessellation elements may be considered when performing cell division. Moreover, when assembling and storing the final VR file(s), all elements (including dynamic and non-dynamic tessellation elements) may be assigned or associated with their corresponding cells or nodes of the octree.

When creating cells of the octree, elements in the environment may not be positioned completely within a cell. This situation may arise with respect to both non-dynamic tessellation elements and dynamic tessellation elements. Various solutions may be used to address this problem. For instance, if division of a cell causes certain elements to be distributed into two or more cells, then each such element may be maintained only in the previous cell (i.e., the cell that was divided). This approach may be used for handling dynamic tessellation elements that are split during cell division. For non-dynamic tessellation elements, cells may be adaptively stretched to control the assignment of elements to cells of the octree.

Figure 11:
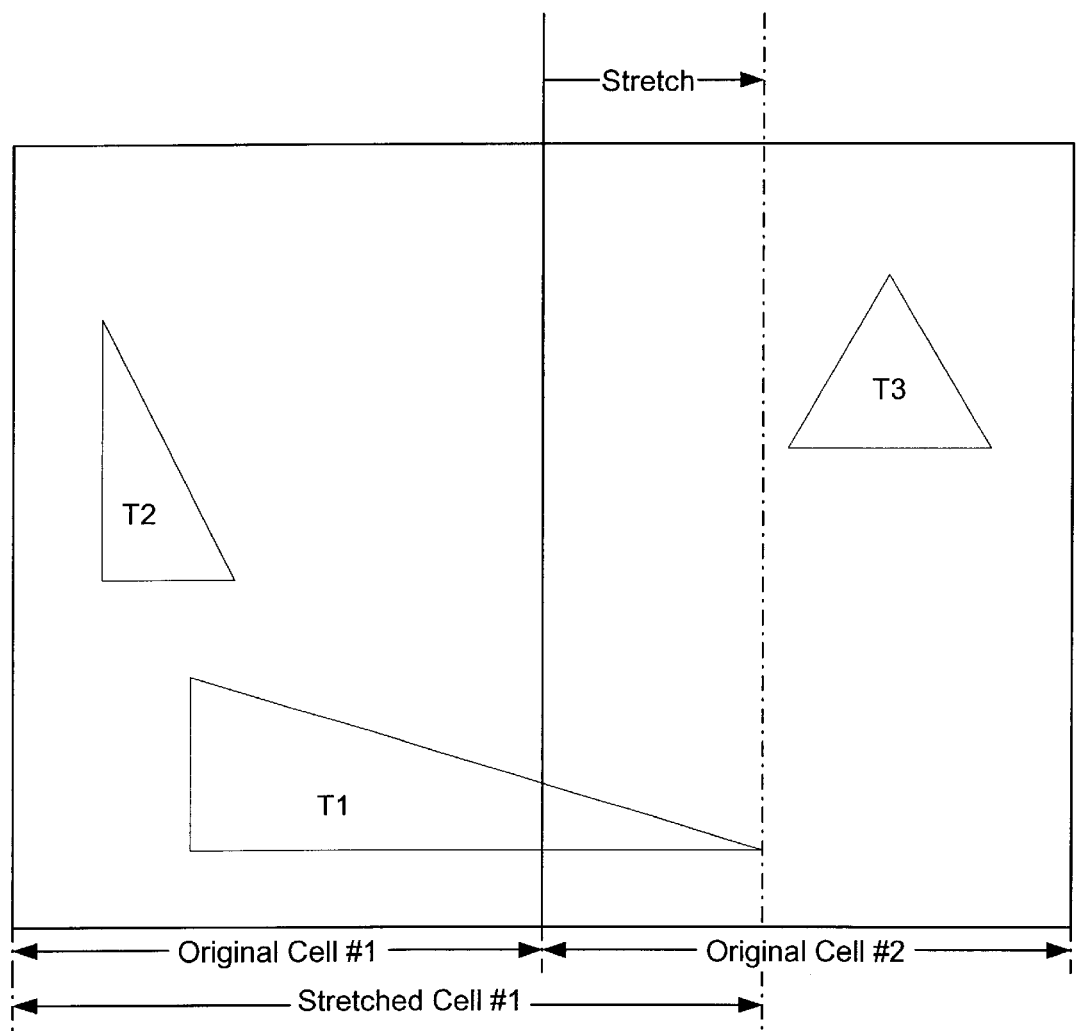
FIG. 11 illustrates an example of stretching an octree cell, consistent with embodiments of the invention.

FIG. 11 illustrates an example of stretching an octree cell to accommodate non-dynamic tessellation elements (i.e., triangles). For ease of illustration, the example of FIG. 11 is presented in 2D, but the concept of stretching is applicable to 3D cell partitioning. As illustrated in FIG. 11, a cell division may result in the creation of Original Cell #1 and Original Cell #2. Triangle T2 may be located within Original Cell #1, whereas triangle T1 may be located within Original Cell #1 and Original Cell #2. To address this problem, Original Cell #1 may be stretched along one direction to accommodate triangle T1 and define a new cell, Stretched Cell #1. While an overlap may exist between the stretched cell and other neighboring cells (such as between Stretched Cell #1 and Original Cell #2), elements are maintained or reassigned only to the cells that fully contain the element. For example, after performing stretching on the cells illustrated in FIG. 11, triangles T1 and T2 would be assigned to Stretched Cell #1 and triangle T3 would maintain its assignment to Original Cell #2.

When stretching the dimension(s) of a cell, the cell may be stretched only to the extent that it is necessary to fully contain the divided element (such as triangle T1). Thus, the vertices of divided or split elements may be used to determine the extent and the axis (x, y or z in 3D environments) along which the stretch should be performed. For example, as illustrated in FIG. 11, Stretched Cell #1 may be generated as a result of stretching the Original Cell #1 in the direction of and only to the extent of the outer vertex of triangle T1 that is not contained within Original Cell #1.

Further, consistent with embodiments of the invention, if more than one cell can be stretched, then the cell determined to have the majority of the volume or area of the divided element(s) may be stretched. As a result, VR system 28 would only perform stretching on the cell determined to require the least amount of stretching. Moreover, if more than one element is outside of a cell, then the cell may be stretched in one or more directions until all elements are within the stretched cell.

When stretching cells for a 3D environment, stretching can be performed along one or more axes (x, y and/or z). Further, since all triangle elements should be contained within a cell before it is divided, the vertices of the divided elements may be compared against the center point or median location where the cell division or cut occurred to determine the direction and amount of stretching required for divided cells. Such an analysis may be performed with respect to each divided element by comparing the x, y and z coordinates of the triangle to the center point or median location. This process may be repeated for divided cells requiring stretching based on more than one divided element or triangle.

Consistent with an embodiment of the invention, various techniques may be performed for allocating dynamic tessellation elements to the cells of the octree. For example, dynamic tessellation elements may be allocated only to cells within which they are fully contained. To determine if a cell fully contains a dynamic tessellation element, a bounding box may be generated about the dynamic tessellation element and the bounding box may be compared to the cells of the octree to determine the lowest level cell of the octree that fully contains the bounding box. The allocation of dynamic tessellation elements may occur during the process of creating the octree or as a separate process that is performed after all of the cells of the octree are constructed.

Referring again to FIG. 9, after identifying and constructing the cells of the octree (step S.46), each cell of the octree may be analyzed to perform a number of operations on the elements contained in the cell (step S.48). As illustrated in FIG. 9, such operations may include sorting elements by material, optimizing vertex arrays, and/or building triangle strips.

For example, the elements of each cell (including non-dynamic tessellation elements and dynamic tessellation elements) may be sorted according to their material type. The material type for each element, which may be extracted from the 3D model, may define various rendering properties for the element such as color, opacity, brightness and/or texture. For each cell, the material type for each element may be determined and then one or more linked lists may be created to list the elements according to material type. Sorting elements by material type in the final VR file(s) can provide faster rendering rates, since most conventional graphics cards can only process and render elements with one material that is active at a time. As a result, organizing elements by material type can reduce the amount of processing time required by the graphics hardware to switch between material types during run-time operations.

As illustrated in FIG. 9 (step S.48), the elements of each cell may also be processed to optimize vertex arrays. Such an operation may be performed to optimize the manner in which triangle elements are stored in the VR file(s). For example, triangle elements in a cell can be analyzed to determine shared vertices between triangles and, for triangles identified with shared vertices, the data defining such triangles may be reformatted to reduce the overall amount of data required to define the triangles. Triangle elements that do not share a common vertex with one or more other triangles can also be reformatted to define such triangles with vertex data to provide similar formatting with the triangles identified to have common vertices.

Figure 12A:
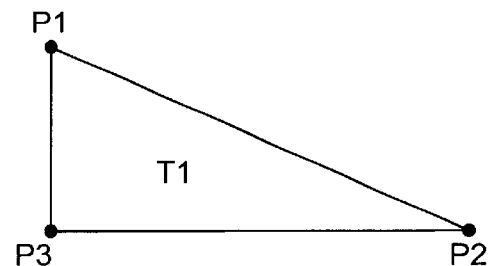
FIGS. 12A and 12B illustrate examples of triangles.
Figure 12B:
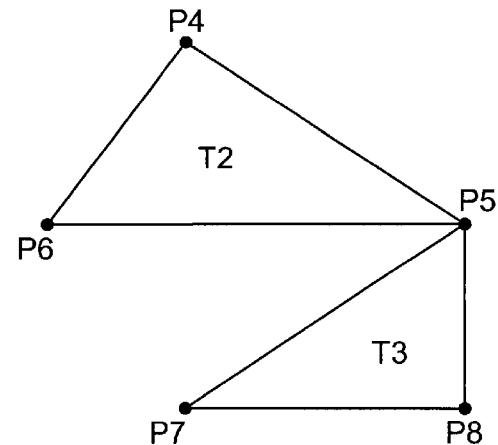

To illustrate the concept of providing optimized vertex array data, reference will now be made to FIGS. 12A and 12B to illustrate an embodiment consistent with the principles of the invention. Assume, for example, that a triangle (T1) is defined by a set of x, y, z points in the 3D model. As illustrated in FIG. 12A, three such points (P1, P2, P3) are required to define the triangle (T1). For 3D modeling, each of these points (P1, P2, P3) may be defined by different x, y, z coordinates. Thus, P1=(x1, y1, z1), P2=(x2, y2, z2), and P3=(x3, y3, z3) and T1 can be defined by a combined data set of x, y, z coordinates (x1, y1, z1; x2, y2, z2; x3, y3, z3) in the 3D model. In the example of FIG. 12A, triangle (T1) does not share a common vertex with any other triangle element in the cell. However, as illustrated in FIG. 12B, assume that two other triangles in the cell (T2 and T3) have one common vertex (P5). In the 3D model, these triangles (T2 and T3) may be represented by combined data sets (i.e., (P4, P5, P6) and (P5, P7, P8), respectively) where each point (P) in the combined data sets is uniquely defined by x, y, z coordinates. Thus, in the 3D model, T2 may be defined by a combined data set of x, y, z coordinates (x4, y4, z4; x5, y5, z5; x6, y6, z6) and T3 can be defined by another combined data set of x, y, z coordinates (x5, y5, z5; x7, y7, z2; x8, y8, z8). As can be seen by the above-noted example, repetitive data is stored in the 3D model for at least the coordinates defining the triangles (T2 and T3) that have a shared vertex.

To provide optimized vertex array data for the exemplary triangles of FIGS. 12A and 12B, VR system 28 may generate one or more vertex arrays ($A_v$) that define the x, y, z coordinates for the vertex points (P) of all triangle elements contained in the cell. Thus, for a cell containing the triangles (T1, T2, T3) illustrated in FIGS. 12A and 12B, a vertex array ($A_v$) may be generated as follows: $A_v$=(P1, P2, P3, P4, P5, P6, P7, P8), where each vertex point in the array is defined by a unique set of x, y, z coordinates. To define each triangle in the cell, VR system 28 may also generate an index array of triangles ($A_t$) as follows: $A_t$=(T1, T2, T3) where each triangle in the array is defined by a unique set of vertex points (e.g., T1=P1, P2, P3: T2=P4, P5, P6 and T3=P5, P7, P8) defined by the vertex array ($A_v$). Alternatively, the index array may be generated with pointers that identify positions in the vertex array. For example, assume that vertices P1–P8 are defined in positions 1–8, respectively, of a vertex array ($A_v$). Further, assume that an index array ($A_t$) is generated for the triangles T1, T2, T3 as follows: $A_t$=(1, 2, 3, 4, 5, 6, 7, 8). To determine the coordinates of each of the triangles, the pointers from every three positions of the index array may be used to read into the vertex array and extract the data. Thus, returning to the previous example, the pointers from the first three positions of the index array $A_t$ (i.e., 1, 2, 3) may be used to read the corresponding positions in the vertex array $A_v$ and extract the coordinates for the triangle T1 (i.e., x1, y1, z1; x2, y2, z2; and x3, y3, z3). The next three positions in the index array $A_t$ (i.e., 4, 5, 6)) could then be read to extract the vertex data from the vertex array $A_v$ for the triangle T2, and a similar process may be repeated to extract the vertex data for the triangle T3.

With such an approach, optimized vertex array data can be provided and stored with respect to the cells of the octree for the VR file(s). Optimizing vertex array data for triangle elements may reduce the overall amount of data needed to define the complex virtual environment, as well as improve graphics processing and cache performance since previously transformed vertices can be pulled from cache (rather than recalculated) during the rendering phase.

Figure 13:
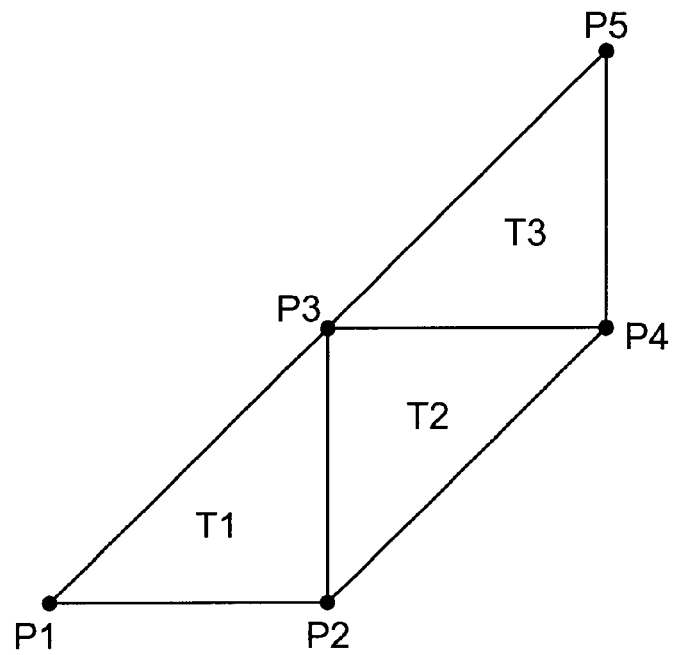
FIG. 13 illustrates an example of a triangle strip, consistent with embodiments of the invention.

Another operation that may be performed on the triangle elements of each cell (FIG. 9; step S.48) is the building of triangle strips. In particular, after optimizing the vertex data, an index array for a triangle strip ($A_{ts}$) may be built to replace triangle array data representing triangle elements that have common edges. FIG. 13, for example, illustrates a triangle strip comprising three triangles (T1, T2, T3). The triangles of a triangle strip may result from triangulated polygons (see FIG. 9, step S.44) or may be original triangle elements in the 3D model that have common edges. Consistent with embodiments of the invention, VR system 28 may define an index array for a triangle strip ($A_{ts}$) where the array defines triangles belonging to a triangle strip according to their vertex points. These vertex points may be further defined according to a stored vertex array ($A_v$). Therefore, for the exemplary triangle strip of FIG. 13, an index array for a triangle strip ($A_{ts}$) can be defined as follows: $A_{ts}$=(P1, P2, P3, P4, P5), where each vertex point (P) is further defined by a vertex array ($A_v$). Alternatively, the index array for the triangle strip may be generated with pointers that identify positions in the vertex array. For instance, with respect to the example of FIG. 13, assume that vertices P1–P5 are defined in positions 1–5, respectively, of a vertex array ($A_v$). Further, assume that an index array ($A_{ts}$) is generated for the triangle strip as follows: $A_t$=(1, 2, 3, 4, 5). To determine the coordinates of each of the triangles, (T1, T2, T3) in the triangle strip, a sliding window (that is three positions wide) may be used to read the pointers from the index array and extract the data from the vertex array. For example, returning to the example for FIG. 13, with the sliding window placed at the first position in the array, the pointers from the first three positions of the index array $A_{ts}$ (i.e., 1, 2, 3) may be used to read the corresponding positions in the vertex array $A_v$ and extract the coordinates for the triangle T1 (i.e., x1, y1, z1; x2, y2, z2; and x3, y3, z3). The sliding window may then be moved forward one position and the next three positions within the window could be read from the index array $A_{ts}$ (i.e., 2, 3, 4) to extract the vertex data from the vertex array $A_v$ for the triangle T2, and a similar process may be repeated to extract the vertex data for the triangle T3 of the triangle strip.

Various techniques may be employed to identify and define triangle strips. For example, VR system 28 may be implemented to analyze and identify triangles that have common edges and generate triangle strips for such triangle elements. Alternatively, a conventional graphics utility, such as NVtristrip-an Nvidia utility library, may be provided to perform triangle strip operations. In such a case, the utility may be called by VR system 28 by providing an index array for the triangles, and in response the utility may perform triangle strip operation and output an index array (such as $A_{ts}$) for the corresponding triangle strip.

By storing triangle strips in the VR file(s), less memory capacity is required. Further, triangle strips can be handled more efficiently by most state-of-the-art graphics hardware systems. For instance, graphics hardware 18 can be adapted to render triangle strips through a graphics library or application program interface (API), such as OpenGL (an API maintained by a consortium of companies) or Direct 3D (an API maintained by Microsoft Corporation). Accordingly, by providing triangle strip array data in the VR file(s) cache memory requirements for the graphics hardware can be reduced and the data for rendering the complex virtual environment can be provided in a more optimized format.

Referring again to FIG. 9, a list of occluder candidates can be built from the 3D model data (step S.50). Additionally, a collision detection hierarchy can be generated based on the 3D model (step S.52). Although FIG. 9 illustrates the octree as being constructed before the occluders list and collision detection hierarchy are built, steps S.46 and S.48 (related to the octree) can be performed in any order relative to steps S.50 (related to the occluders list) and S.52 (related to the collision detection hierarchy). For example, as indicated above, these steps may be performed simultaneously or in parallel by VR system 28. Therefore, the exemplary flow diagram of FIG. 9 should not be construed as limiting the order by which certain steps are performed and, additionally, modifications to the order and nature of the steps of FIG. 9 may be implemented, consistent with the principles of the invention.

When rendering frames based on the VR file(s), there are generally two types of visibility detection and culling that must be performed. One type is view frustum culling, which is performed to remove elements or objects in the complex virtual environment that are outside the field of view. Another type is occlusion culling, which is performed to identify and remove elements or objects that are blocked from view by other elements or objects that are closer to the viewer or camera position. Consistent with embodiments of the invention, both types of visibility detection and culling may be performed on a cell-by-cell basis using the octree defined in the VR file(s). Additionally, to improve the performance of occlusion culling and real-time interaction with the user, an occluders candidate list may be provided in the VR file(s). As further described below, occluder candidates can be analyzed during rendering to more quickly identify those elements or objects that are occluded for each frame.

Figure 14:
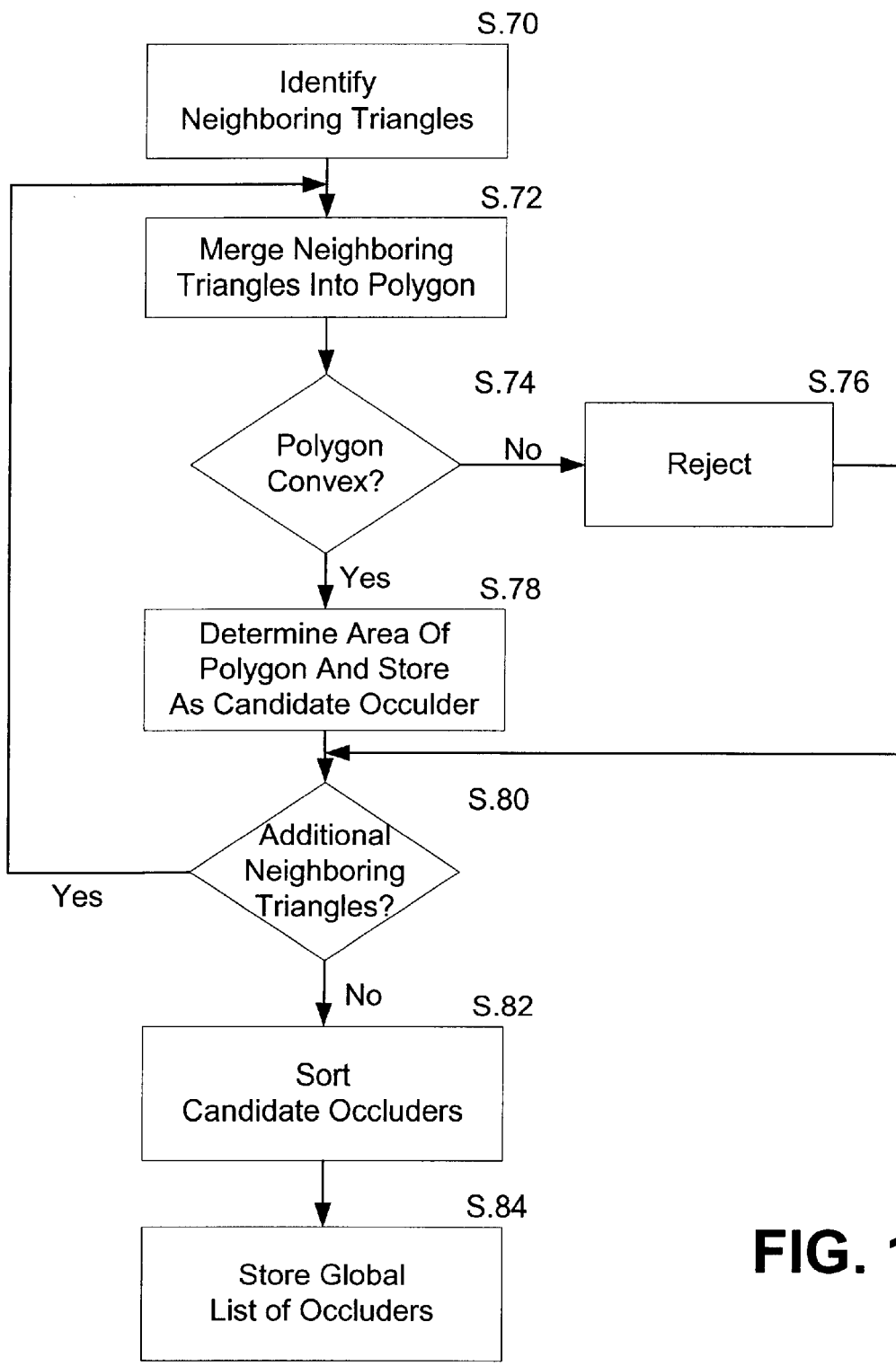
FIG. 14 is an exemplary flow diagram for identifying and building a list of occluder candidates, consistent with embodiments of the invention.

As illustrated in FIG. 9, occluder candidates may be generated during pre-processing of a 3D model. Generally, occluder candidates represent elements or primitives that have characteristics (such as a large surface areas) that classify them as global candidates for consideration when perform occlusion culling. Thus, to identify occluder candidates, VR system 28 may analyze elements represented in the 3D model to identify large objects (such as walls, floors, etc.) that have characteristics indicative of good occluder properties (i.e., they are likely to block the view of other elements). Various techniques, such area and/or shape analysis, may be performed to determine whether an object classifies as a good occluder candidate. Consistent with embodiments of the invention, FIG. 14 illustrates an exemplary flow diagram for generating and building a list of occluders. As indicated above, all identified occluder candidates may be stored together as a separate list in octree file 52 of the VR file(s). Alternatively, each occluder candidate may be merged with the octree and stored relative to nodes of the octree for cells occupied by the occluder candidate.

Figure 15:
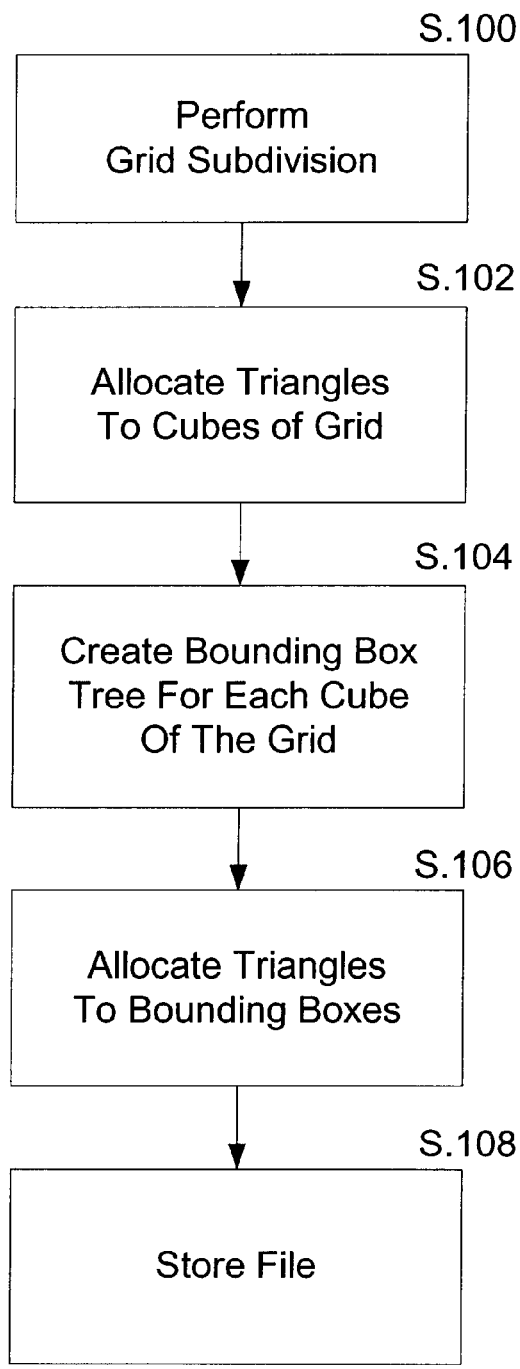
FIG. 15 is an exemplary flow diagram for creating a collision detection hierarchy, consistent with embodiments of the invention.

When performing simulation, collisions with objects may be detected and simulated to replicate real-world phenomena. The task of collision detection can be complex, especially for environments based on massive models. To improve such performance, spatial partitioning of the environment may also be performed during pre-processing to provide a collision detection hierarchy. In particular, as illustrated in FIG. 9, a collision detection hierarchy may be developed from the 3D model. Various techniques, such as grid subdivision processes, may be used to generate the collision detection hierarchy. With grid subdivision, the modeled environment (including all dynamic and non-dynamic tessellation elements) may be divided into a grid of equally sized cubes. After allocating elements or primitives (such as polygons or triangles) to the cubes, a bounding box tree (such as an axis-aligned bounding box (AABB) tree) may be created for each cube. Each bounding box can be created by dividing a cube into two equally sized cells or cubes and then further dividing the cubes until a cube is empty or contains fewer than a predetermined number of elements or primitives. As with octrees, each level of the bounding box may be represented by nodes that hierarchically related to one another in accordance with each level of division. This hierarchy of bounding boxes may be stored to provide the collision detection hierarchy (such as collision detection file 56) for the VR file(s) Consistent with embodiments of the invention, FIG. 15 illustrates an exemplary flow diagram for creating a collision detection hierarchy.

Referring again to FIG. 9, after analyzing and processing the 3D model data, the VR file(s) are stored (step S.54). As illustrated in the exemplary embodiment of FIG. 5, the VR file(s) may include an octree file 52 and a collision detection file 56, which may be stored separately or together as part of one general VR file. Once the VR file(s) are created, run-time operations may be performed to provide interactive displays of the complex virtual environment on a real-time basis.

FIG. 14 is an exemplary flow diagram for identifying and building a list of occluder candidates, consistent with embodiments of the invention. The exemplary flow diagram of FIG. 14 may be implemented through various systems or environments during pre-processing, such as the system environment 10 of FIG. 1 or the network environment 50 of FIG. 2. For purposes of illustration, however, reference will be made to the embodiment of FIG. 1 to describe the flow diagram of FIG. 14.

As illustrated in FIG. 14, neighboring triangle elements are identified (step S.70). To identify neighboring triangles, VR system 28 may analyze the data for all triangle elements represented in the complex environment (i.e., all non-dynamic tessellation elements, including those that were triangulated). When analyzing the data, the defined edges of each triangle element may be analyzed to determine if it has a common edge with other triangle elements. Triangle elements that are found to have common edges and that are within the same plane may be identified as neighboring triangles. With respect to dynamic tessellation elements, such elements may also be analyzed in a similar manner (in which case the dynamic tessellation elements may be triangulated) or they may be entirely ignored for the purposes of identifying occluder candidates.

After identifying neighboring triangles, the neighboring triangles are merged into polygons (step S.72). For example, VR system 28 may merge each set of neighboring triangles that are determined to be co-planar and redefine them through data representative of a polygon. Each merged set of neighboring triangles are then analyzed to determine if the resulting polygon is convex (step S.74). A merged polygon may be considered convex if it is not possible to pass a line through the polygon and intersect more than two sides of the polygon. If a line can be passed through the polygon and intersect more than two sides, then the polygon is not convex but instead concave. Consistent with embodiments of the invention, only merged triangles resulting in convex polygons may be considered for purposes of identifying candidate occluders.

If a merged polygon is convex (step S.74; Yes), then processing continues to determine the area of the polygon (step S.78). The polygon (or candidate occluder) and its determined area may then be stored for further processing and sorting. If a set of neighboring triangles when merged do not form a convex polygon (step S.74; No), then the polygon is rejected from further consideration (step S.76). Additional neighboring triangles are merged and analyzed in a similar fashion until all neighboring triangles have been processed (step S.80; No).

As illustrated in FIG. 14, candidate occluders (i.e., all merged polygons that have been determined to be convex) are then sorted (step S.82) in order to identify global occluder candidates for the complex environment. The global occluder candidates are then stored (step S.84). As indicated above, the global occluder candidates may either be stored as a separate list in the VR file(s) or they may merged into the octree according to the cell level or node of the octree within which they are fully contained.

The sorting of candidate occluders (step S.82) may be performed using various approaches or techniques. For example, candidate occluders may be sorted and selected according to predetermined thresholds relative to characteristics such as area or shape. Alternatively, a predetermined number of candidate occluders may be selected which exhibit the largest number of triangles or the largest area. Alternatively, all candidate occluders may be selected and sorted relative to area and/or size.

In accordance with an embodiment of the invention, the sorting of candidate occluders (step S.82) may also be performed dynamically. For instance, to select global occluder candidates, a predetermined number of candidate occluders that exhibit the largest area may be selected based on the total number of candidates that were identified. By way of example, a predetermined percentage of candidates (such as 0.1%) may be selected according to those that exhibit the largest area. Thus, if one million candidate occluders were identified, only a predetermined number of those candidates (such as 0.1% or 1,000) that had the largest area would be selected and stored as global occluder candidates.

FIG. 15 illustrates an exemplary flow diagram for creating a collision detection hierarchy, consistent with embodiments of the invention. As with FIG. 14, the exemplary flow diagram of FIG. 15 may be implemented through various systems or environments during pre-processing, such as the system environment 10 of FIG. 1 or the network environment 50 of FIG. 2. For purposes of illustration, however, reference will again be made to the embodiment of FIG. 1 to describe the exemplary flow diagram.

As illustrated in FIG. 15, a grid subdivision is first performed on the complex environment (step S.100). To perform a grid subdivision, VR system 28 may divide the complex environment into a plurality of equal sized cubes. The size of each cube may be predetermined or selected according to the size of the complex environment. By way of example, data representative of massive models may be divided into cubes that are 10×10×10 meters. To perform grid subdivision, all elements or primitives of the complex environment represented by the 3D model should be pre-processed, in accordance with embodiments of the invention. Thus, all non-dynamic tessellation elements should be pre-processed so that they are represented by triangle elements. For example, non-dynamic tessellation elements represented by polygons containing more than three sides should be triangulated into a set of triangles. Further, all dynamic tessellation elements should be pre-processed and triangulated so that they are represented by triangle elements. The results of such pre-processing of the dynamic and non-dynamic tessellation elements may provide data representing list(s) of triangles for the performing the grid subdivision.

Various techniques may be implemented for triangulating dynamic tessellation elements, consistent with embodiments of the invention. As further described below, dynamic tessellation elements may be represented by a number of triangles based on computed tessellation level(s). During run-time operations, the tessellation level may be set according to a number of factors to control the number of triangles and, thus, the degree of detail by which the dynamic tessellation level is rendered for the user. Thus, objects that appear closer to the user may be rendered with higher detail than objects that appear more distant from the user. For the purposes of creating the collision detection hierarchy for the VR file(s), however, the tessellation level may be computed to approximate the dynamic tessellation element with sufficient detail to permit collision detection operations to be performed accurately.

Consistent with embodiments of the invention, the tessellation level computed for the purposes of generating triangles for the collision detection hierarchy may be determined according to the dynamic tessellation element type (e.g., cone element type, torus element type, and/or surface-of-revolution element type). For example, if the dynamic tessellation element corresponds to a cone element type (see, for example, FIG. 10A), the tessellation level ($L_C$) may be computed as follows: $L_C=(R)^{1/2}$, where R represents the larger of the two radii ($R_t$ or $R_b$) of the cone. For a torus element type (see, for example, FIG. 10B), a horizontal tessellation level ($L_H$) and a vertical tessellation level ($L_V$) may be computed as follows: $L_H=L_V=(R_1)^{1/2}$, where $R_1$ represents the radius of the torus measured from the center point (C). By way of further example, for a surface-of-revolution element (see, for example, FIG. 10C), a revolution tessellation level ($L_R$) and an arc tessellation level ($L_A$) may be computed. The revolution tessellation level ($L_R$) may be computed as follows: $L_R=(\alpha_s \times R_S)/50$, where $\alpha_s$ represents the angle of the revolution, and $R_S$ represents the radius of the revolution. Further, the vertical tessellation level ($L_V$) may be computed as follows: $L_V=(\alpha_A \times (R_{A1}+R_{A2}))/50$, where $\alpha_A$ represents the angle of the profile or ellipse, $R_{A1}$ and $R_{A2}$ represent the radii of the profile or ellipse. The above-noted examples for the different dynamic tessellation element types assume a scale size that is measured in centimeters. If a different scale size is used, then the exemplary algorithms for computing the tessellation levels may be adjusted accordingly.

In accordance with an embodiment of the invention, the tessellation level for generating triangles for the collision detection hierarchy may be restricted to an upper value and/or a lower value. For example, tessellation levels may be restricted by a lower clamp levels to guarantee that the tessellation level always has at least a predetermined minimum value. For example, for cone type elements, a lower clamp level of 8 may be predefined. With such a lower clamp level, the tessellation level for a cone element may be restricted and reset to 8 in cases where the computed tessellation level is lower than 8. Similarly, for torus type elements, both the horizontal tessellation level $L_H$ and the vertical tessellation level $L_V$ may be restricted by a lower clamp level, such a lower clamp level of 8. For surface-of-revolution elements, clamp levels may also be predefined for the revolution tessellation level $L_R$ and the arc tessellation level $L_A$. By way of example, a lower clamp level of 8 may be predefined for the revolution tessellation level $L_R$. Further, by way of example, a lower clamp level of 4 may be predefined for the arc tessellation level $L_A$. The above-noted clamp levels are exemplary only and other clamp levels may be predefined, consistent with embodiments of the present invention.

Based on the computed tessellation level(s), the number of triangles for representing the dynamic tessellation element may be determined. As further described below with reference to Table 1, predetermined relationships or algorithms may be used for determining the number of triangle segments based on the computed tessellation level(s). In addition, various techniques may be used for generating vertex data for the triangle segments representing each dynamic tessellation element, including the techniques further described below for dynamically tessellating elements with triangles during run-time operations.

Referring again to FIG. 15, after dividing the environment into equally-sized cubes (step S.100), all triangle elements are allocated to cubes of the grid (step S.102). For example, VR system 28 may allocate or associate triangle elements according to the cubes within which they are fully contained. For triangle elements that are partially within one or more cubes, such triangle elements may be allocated or associated with each and every cube that it is partially present in. Alternatively, cubes of the grid may be stretched in order to allocate triangle elements for the collision detection hierarchy.

As further illustrated in FIG. 15, each cube of the grid subdivision is further processed by creating a bounding box tree for each cube of the grid (step S.104). By way of example, VR system 28 may create a bounding box tree such as an AABB tree for each cube of the grid. To create an AABB tree, each cube is first divided into two equally sized cubes along one of the three major x, y, z planes. This division of cubes is then repeated along alternate directions of the three major x, y, z planes until a cube is empty or contains fewer than a predetermined number of triangle elements (such as 10 or less triangle elements). In addition to AABB trees, other known types of bounding box trees can be utilized as part of step S.104, consistent with embodiments of the invention.

All triangle elements are allocated to the cubes or bounding boxes of the tree (step S.106). For instance, triangle elements may be allocated or associated with bounding boxes that they are fully contained within. If a cube division dissects a triangle element, the dissected triangle element may be allocated or associated with only the previous cube or bounding box within which it was contained. Other techniques and methods may be utilized for allocating dissected triangle elements. For example, bounding boxes may be stretched to allocate triangle elements.

Finally, as illustrated in FIG. 15, the collision detection hierarchy is stored (step S.108). As indicated above, the collision detection hierarchy may be filed as part of a collision detection file (such as file 56) of the VR file(s). Such a file may include data indicating the hierarchy of bounding boxes and, for each bounding box, the triangle elements that are allocated or associated with the bounding box. Further, in accordance with an embodiment of the invention, each bounding box may be stored with data representing a bounding sphere. The bounding sphere may be a sphere that bounds the bounding box and may be used during run-time operations to determine whether a collision or intersection occurs between an object and the bounding area (represented by the bounding sphere). As a result, collision detection operations for objects (such as an avatar also represented by a bounding sphere) may be performed faster and with less processing resources being required.

Consistent with embodiments of the invention, user input and data from the VR file(s) are used to simulate and rendered successive frames of a complex virtual environment. To perform run-time operations, the VR file(s) for the complex environment can be accessed or loaded from memory (such as memory 30 in FIG. 1). For this purpose, a dialog box or window may be displayed to the user so that the appropriate VR file(s) can be identified or selected. A user may also be given the option to set various system configurations, such as screen resolution, color depth and/or key or input device selection for navigation. Once the VR file(s) are loaded, an initial frame of the complex environment may be displayed to the user based on a predetermined or default camera or viewer position. Thereafter, a simulation loop can be executed to simulate and render frames according to input from the user.

During simulation, various operations may be performed to simulate real-world phenomena. Examples of such operations include gravity simulation and predictive collision detection. By simulating a user's intended movements or operations for the next frame, the position and viewpoint for the next frame can be determined. Further, information determined during simulation can be used to generate rendering instructions. The rendering instructions are then used by the graphics system to cause the frame to be displayed to the user.

Figure 16B:
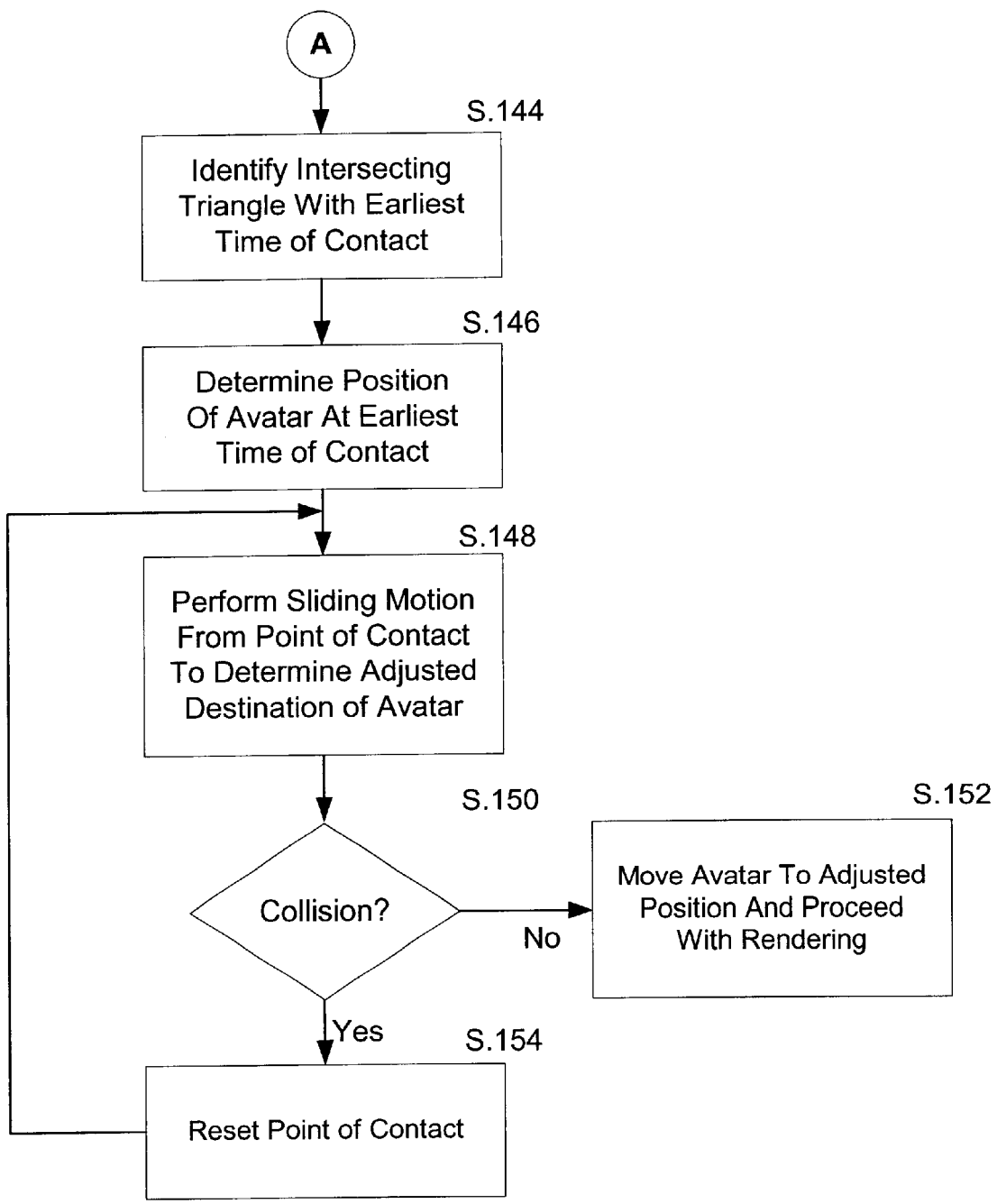

FIGS. 16A and 16B illustrate exemplary flow diagrams for performing predictive collision detection, consistent with embodiments of the invention. As indicated above, predictive collision detection may be performed during run-time operations to simulate frames of a complex virtual environment based on user input. The features of FIGS. 16A and 16B can be performed on a frame-by-frame basis during a simulation loop or the consecutive display of frames of the virtual environment. During rendering, the position of the user may be represented in a third-person mode by, for example, an avatar. In each frame, the avatar may be represented by various images, such as an image of a human.

As illustrated in FIG. 16A, user input is analyzed for the next frame to be simulated and rendered (step S.120). For example, user input collected over a predetermined polling period may be analyzed to determine position, direction and velocity of an avatar or a moving object. The predetermined polling period may be set to the rate at which frames are rendered to the user (i.e., the frame rate). The frame rate may be actively measured (e.g., by measuring and taking the average rate for the last 10–20 frames).

The current position of the avatar (or moving object) and the desired position for the next frame are then determined (step S.122). For example, a virtual projection or path may be calculated from the current position of the avatar (at the beginning of the polling period) to the desired position (at the end of the polling period) based on the position, direction and velocity data derived from the user input. Similar calculations could also be performed with respect to a moving object controlled by the user input. Further, when determining the desired position, the effect of gravity may be considered to determine the distance traveled by the avatar or moving object.

Using the collision detection hierarchy of the VR file(s), a rough proximity query is performed (step S.124). In particular, a rough proximity determination can be performed by identifying which cubes of the grid subdivision intersect with the avatar or moving object when it is moved along the calculated path between the current position and desired position. As part of this operation, the avatar or moving object may be approximated with a bounding volume, such as an ellipsoid or sphere, that is centered relative to the calculated path. Further, cubes of the grid subdivision may be approximated with a sphere or other types of bounding volumes.

For each identified cube, a refined proximity query is performed based on the bounding box tree associated with each cube (step S.126). For instance, a refined proximity determination can be performed for each identified cube by identifying which bounding boxes of the associated bounding box tree intersect with the avatar or moving object when it is moved along the calculated path between the current position and the desired position. Once again, the avatar or moving object may be approximated with a bounding volume, such as an ellipsoid or sphere, that is centered relative to the calculated path as it is moved between the current position and desired position. Further, as indicated above, each bounding box can be approximated with a bounding volume, such as a sphere.

Referring again to FIG. 16A, each of the identified bounding boxes are analyzed to identify intersecting triangles elements with the moving avatar or object (step S.128) As part of this process, the avatar or moving object can be approximated with a bounding volume (such as an ellipsoid) and moved along the calculated path between the current position and the desired position. A determination can then be made whether there are any intersecting triangles within the identified bounding box based on the projection of the avatar or object.

To perform the operations of steps S.124, S.126 and S.128, various parameterization and/or other types of techniques may be employed. For instance, with respect to steps S.124 and S.126, a sweep test may be employed for detecting for intersections between the avatar (approximated with a sphere) and grid cells or bounding boxes (also approximated with a sphere). As part of a sweep test, all points on the surface of the bounding sphere for the avatar may be parameterized as a function of location (x, y, z) and time as the bounding sphere is moved from its current position to the desired position. While moving the bounding sphere for the avatar, a test may be performed for any intersections between the bounding sphere for the avatar and the bounding sphere for the cell or bounding box. To determine any such intersections, the bounding sphere for the cell or bounding box may be treated as a fixed or stationary entity, and all points on the bounding sphere may be parameterized as a function of location (x, y, z). By way of example, Appendix A contains exemplary programming code prepared in C++ for performing a sweep test with respect to two bounding spheres. The exemplary programming code of Appendix A may be used as part of steps S.124 and S.126 to determine any intersections that occur when one bounding sphere (representing the avatar or moving object) is moved relative to another bounding sphere (representing the grid cell or bounding box).

Similar techniques may also be used to perform the operations of step S.128. For example, a sweep test may be employed for detecting intersections between the avatar or moving object (approximated with an ellipsoid or sphere) and stationary triangle elements. In particular, the avatar or moving object may be approximated with a bounding sphere that is parameterized as a function of location (x, y, z) and time as it is moved relative to a triangle element. Any intersections between the bounding sphere and the triangle element may be detected and recorded during the sweep test. For purposes of illustration, Appendix B contains exemplary programming code prepared in C++ for performing a sweep test with respect to a bounding sphere and a triangle element. The exemplary programming code of Appendix B may be used as part of step S.128 to determine any intersections that occur when the bounding sphere (representing the avatar or moving object) is moved toward a desired position relative to a stationary triangle.

The techniques used for implementing steps S.124, S.126 and S.128 are not limited to the above-noted examples. Other parameterization techniques and 3D intersection tests may be used, consistent with embodiments of the invention. For example, 3D intersection algorithms and approaches may be used for moving objects, such as those described in Eberly, David H., "3D Game Engine Design: A Practical Approach to Real-Time Computer Graphics," Morgan Kaufmann Publishers, ISBN 1558605932, (September 2000), the disclosure of which is expressly incorporated herein by reference to its entirety. Further, various intersection algorithms and programming code for testing for intersections of moving objects may be used, such as that provided at <http://www.magic-software.com/Intersection3D.html>.

As illustrated in FIG. 16A, a determination is made as to whether a collision was detected (step S.130). For instance, if at least one intersecting triangle is identified, then it is determined that a collision was found. When a collision is detected (step S.130; Yes), each intersecting triangle may be analyzed to determine the time of contact and the exact point where the intersection or contact occurred with the avatar or moving object (step S.132). Thereafter, processing continues to step S.144 (see FIG. 16B). If no collisions are found (step S.130; No), then the avatar or moving object can be moved or adjusted without interference to the desired position and, as a result, the desired position is provided in order to generate the rendering instructions for the next frame (step S.134).

Figure 18A:
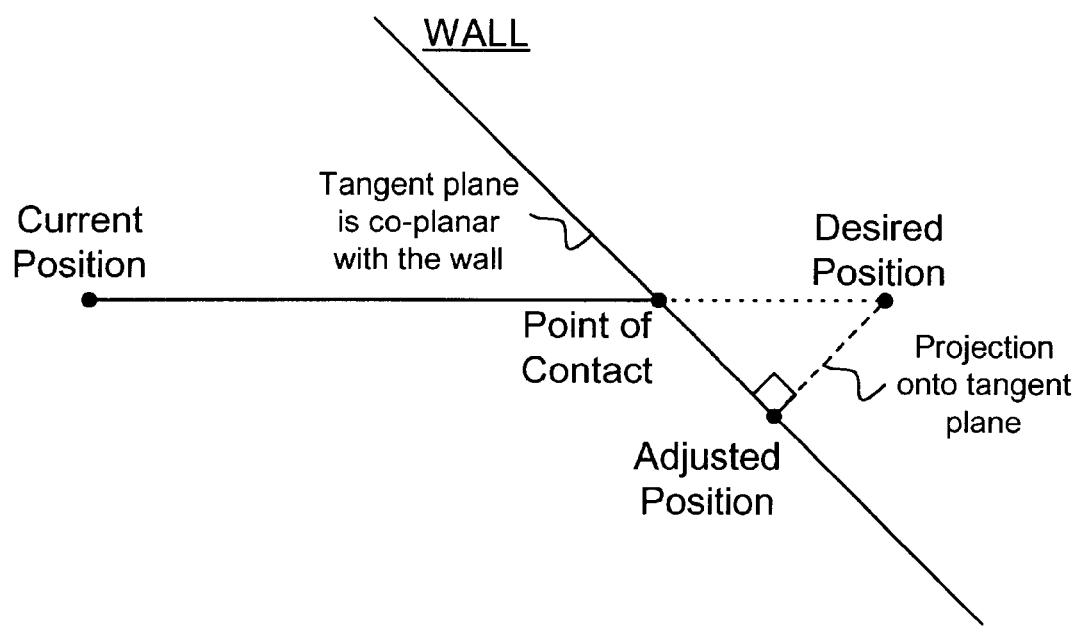
FIGS. 18A, 18B and 18C illustrate examples of determining an adjusted position in response to collision detection, consistent with embodiments of the invention.

Referring to FIG. 16B, the intersecting triangle with the earliest contact time is identified (step S.144). As part of this process, all intersecting triangles and their associated contact times may be analyzed to determine the intersecting triangle that has the earliest time of contact. Then, the position of the avatar or moving object is determined at the earliest time of contact (step S.146). For example, based on the determined velocity from the user input, the avatar can be moved along the calculated path from the current position until the earliest time of contact (which can be measured in time relative to the beginning of the polling period). If the avatar or moving object is represented by a bounding volume (such as an ellipsoid for the avatar), then the center point or position of the bounding volume may be moved along the calculated path. The location where the avatar is positioned at the earliest time of contact is the point of contact (see, e.g. FIG. 18A).

Figure 17:
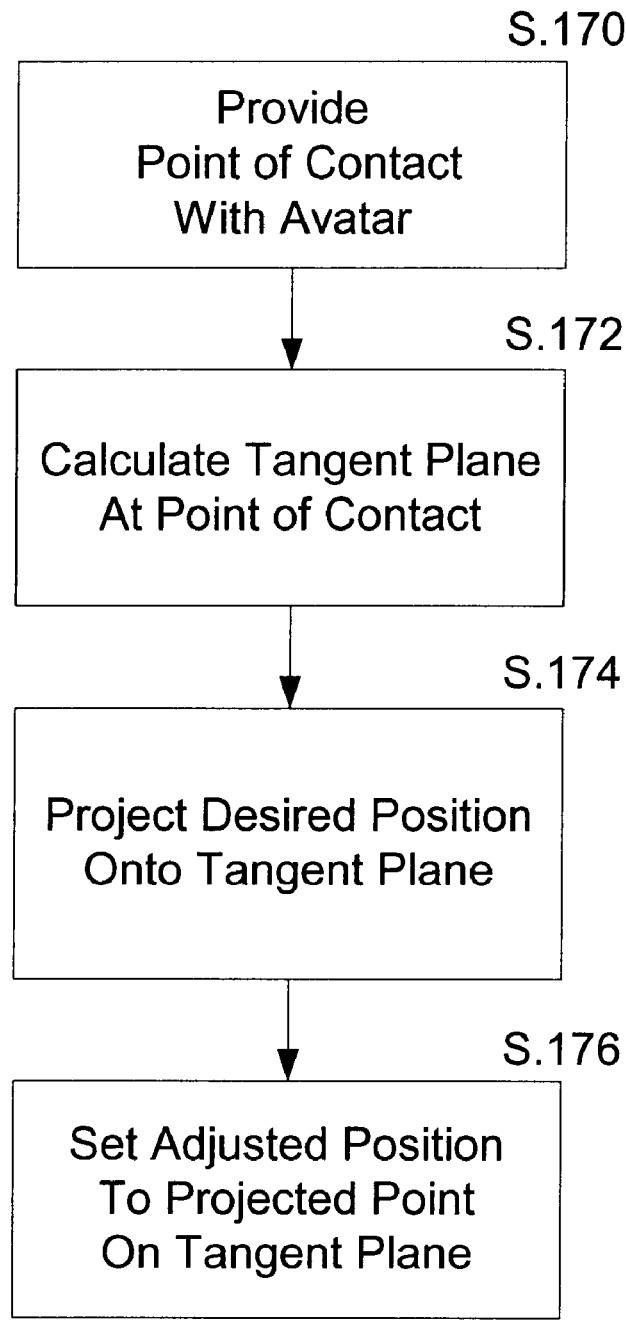
FIG. 17 is an exemplary flow diagram for performing a sliding motion operation to determine an adjusted position, consistent with embodiments of the invention.

Consistent with embodiments of the invention, the simulation of a collision may be handled in a number of different ways. For instance, the avatar or moving object may simply be stopped at the point of contact for the first collision detected. In such as case, the collision can be rendered in the next frame and the user would be responsible to provide appropriate input to reposition the avatar or moved the object to avoid future collisions. Alternatively, when a collision is detected during simulation, an adjusted position may be determined before rendering the next frame to the user. Thus, in response to the detected collision, an adjusted position in the complex virtual environment may be determined using various techniques. On such technique is performing a sliding motion from the point of contact. Under a sliding motion approach, the adjusted position may be determined by projecting the desired position onto a plane that is tangent to the point of contact (see, for example, FIG. 18A). In such a case, the adjusted position may be defined at a point where the projection intersects the tangent plane at a ninety degree angle (i.e., orthogonal to the tangent plane). FIG. 17 illustrates an exemplary flow diagram for performing a sliding motion operation, consistent with an embodiment of the invention.

As illustrated in FIG. 16A, after determining the point of contact, a sliding motion may be performed to determine an adjusted position for the avatar or moving object (step S.148). If another collision is detected when performing the sliding motion operation (step S.150, Yes), then a new point of contact may be set based on the earliest point of contact with the avatar or moving object during the sliding motion (step S.154). Thereafter, a sliding motion operation is repeated with the reset point of contact until no collisions are detected (step S.150; No). When no collisions are detected, the avatar or moving object can be moved to the adjusted position without interference and, as a result, the adjusted position may be provided in order to generate the rendering instructions for the next frame (step S.152).

FIG. 17 is an exemplary flow diagram for performing a sliding motion operation, consistent with embodiments of the invention. For purposes of illustration, the embodiment of FIG. 17 is described with reference to performing a sliding motion operation on an avatar. However, the exemplary flow diagram of FIG. 17 may also performed with other moving objects, including those approximated with a bounding ellipsoid or any other type of bounding volume.

As illustrated in FIG. 17, the point of contact with the avatar is provided (step S.170). As indicated above, the point of contact may be determined with the avatar being approximated with a bounding volume such as an ellipsoid. In such a case, the center of the bounding ellipsoid may be positioned at the current position and the bounding ellipsoid may be moved along the calculated path toward the desired position until the first point of contact is detected (see, for example, FIGS. 18B and 18C). Alternatively, the avatar or moving object may be represented simply by a point and moved from the current position toward the desired position until the first point of contact with another element or object is detected (see, for example, FIG. 18A).

Figure 18B:
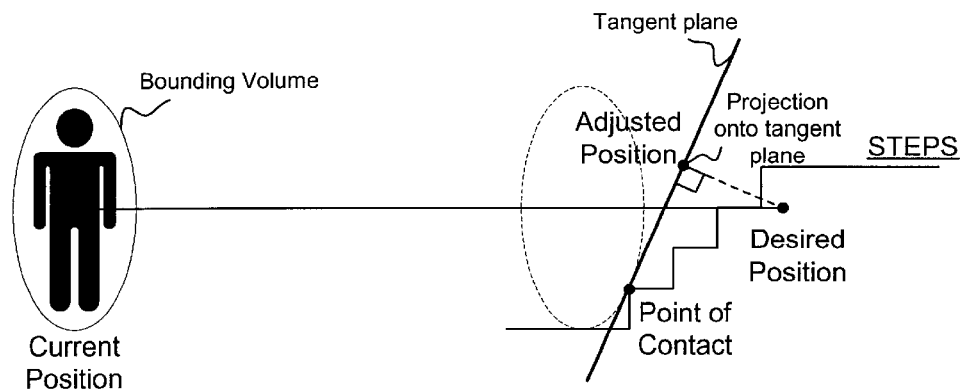
Figure 18C:
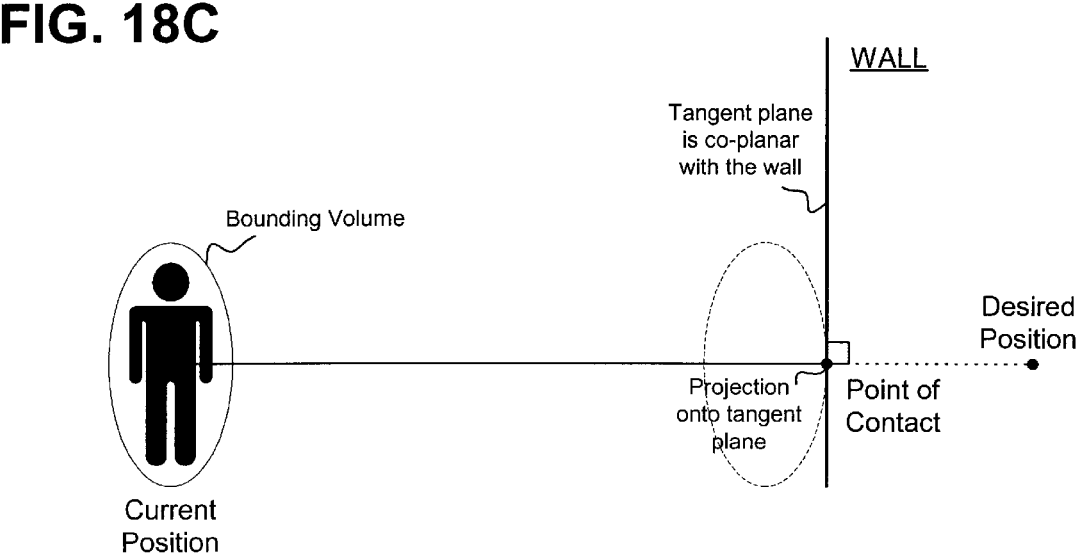

A tangent plane is then calculated at the point of contact (step S.172). For example, a plane tangent to the bounding ellipsoid at the point of contact may be calculated. By way of example, FIG. 18B illustrates an example of a tangent plane calculated from the point of contact between a bounding ellipsoid for an avatar and a flight of steps. FIG. 18C illustrates another example of a tangent plane calculated from the point of contact between a bounding ellipsoid for an avatar and a wall. In the example of FIG. 18C, the tangent plane is co-planar with the wall.

Consistent with embodiments of the invention, the tangent plane may represent a sliding plane along which a sliding motion is performed to determine the adjusted position of the avatar. Once the tangent plane is determined, the adjusted position of the avatar may be calculated by, for example, projecting the desired position onto the tangent plane (step S.174). In such a case, the adjusted position may be defined at a point where the projection intersects the tangent plane at a ninety degree angle (i.e., orthogonal to the tangent plane). In the example of FIG. 18B, the projection of the desired position onto the tangent plane results in an adjusted position that is located up the flight of steps away from the point of contact. However, in the example of FIG. 18C, the projection of the desired position onto the tangent plane results in an adjusted position that is identical to the point of contact. This is because the user is attempting to move the avatar directly into the wall and, as a result, no sliding motion is possible.

After projecting the desired position, the point at which the projection intersects the tangent plane at a ninety-degree angle is set as the adjusted position (step S.176). As part of this process, the effects of gravity may be incorporated. Thus, if the adjusted position would result in the rendering of a floating position above other objects in the environment (i.e., the avatar would be rendered as floating in the air), then a new adjusted position may be set by incorporating a gravity function to cause the calculated position to float down. Thus, in the example of FIG. 18B, the adjusted position could be recalculated to compensate for gravity and cause the avatar to be rendered at a position on the steps above the first point of contact.

Therefore, consistent with embodiments of the invention, sliding motion operations may be incorporated to respond to collisions detected during simulation. Sliding motion operations may permit the avatar or moving object to effectively slide to an adjusted position from the first point of contact. Further, only the adjusted position may be rendered to the user. This would permit the user to glide up or down objects such as a flight of steps or stairs. Additionally, where the user attempts to directly move the avatar into an object (such as a wall) to cause the tangent line to be co-planar with the intersecting object, then no sliding motion may be simulated and the next frame may be rendered with the avatar stopped at the point of contact (such as in the case of FIG. 18C).

As indicated above, the desired or adjusted position calculated during simulation can be used to reset the viewer or camera position for rendering the next frame. During rendering, view frustum and occlusion culling operations may be performed based on the viewer position. To facilitate these operations, VR file(s) consistent the embodiments of the invention may be used to provide more efficient processing and rendering of the frame.

Figure 19:
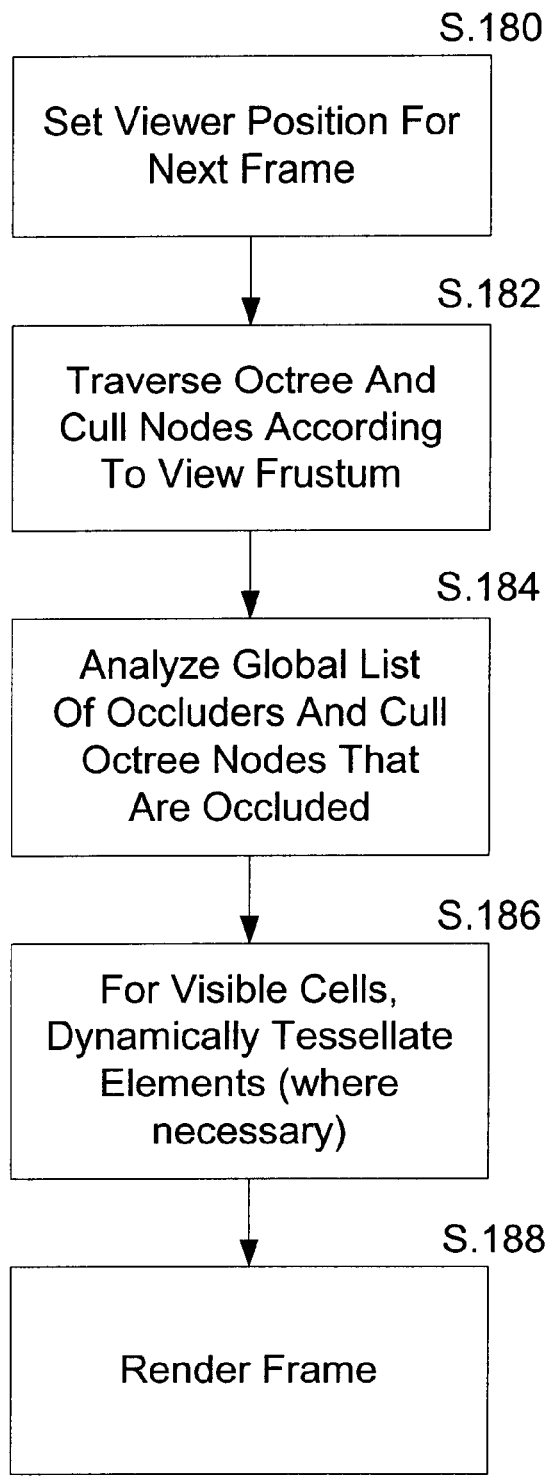
FIG. 19 is an exemplary flow diagram for rendering complex virtual environments, consistent with embodiments of the invention.

By way of example, FIG. 19 illustrates an exemplary flow diagram for rendering complex virtual environments using VR file(s), consistent with embodiments of the invention. The exemplary flow diagram of FIG. 19 may be performed during run-time operations using various systems or environments, such as the system environment 10 of FIG. 1 or the network environment 50 of FIG. 2. For purposes of illustration, however, reference will be made to the embodiment of FIG. 1 to describe the flow diagram of FIG. 19.

As illustrated in FIG. 19, the viewer or camera position is set for the next frame (step S.180). As indicated above, the viewer position for rendering the next frame may be set according to the desired or adjusted position calculated during simulation by VR system 28. With the viewer position, the view frustum can be determined and the octree stored as part of the VR file(s) can be traversed and analyzed to cull nodes that are outside of the view frustum (step S.182). By using the stored octree for the complex virtual environment, view frustum culling can be performed efficiently by graphics system 24 to eliminate cells (i.e., portions of the complex virtual environment) that are outside of the view frustum for the next frame.

When performing view frustum culling (step S.182), graphics system 24 may eliminate all nodes or cells of the octree that are completely outside the view frustum for the next frame. If a cell is determined to be partially outside of the view frustum, then graphics system 24 may traverse down the octree to analyze more finite cells and determine which portions are in or outside of the view frustum. Graphics system 24 may traverse the octree until all nodes or cells within the view frustum are identified and all other nodes or cells outside of the view frustum are culled.

After performing view frustum culling (step S.182), the stored global list of occluder candidates may be analyzed in order to cull nodes or cells of the octree that are occluded (step S.184). As indicated above, the VR file(s) may include a global list of occluder candidates which may be stored as a separate list or merged into the octree. During run-time operations, these global occluder candidates may be analyzed to identify nodes or cells of the octree that are occluded by other objects or elements within the view frustum. In addition to analyzing occluder candidates, other occlusion culling operations may be performed to cull occluded nodes or cells for the next frame. By way of example, an exemplary flow diagram for analyzing occluder candidates and performing occlusion culling is described below with reference to FIG. 20.

Figure 23:
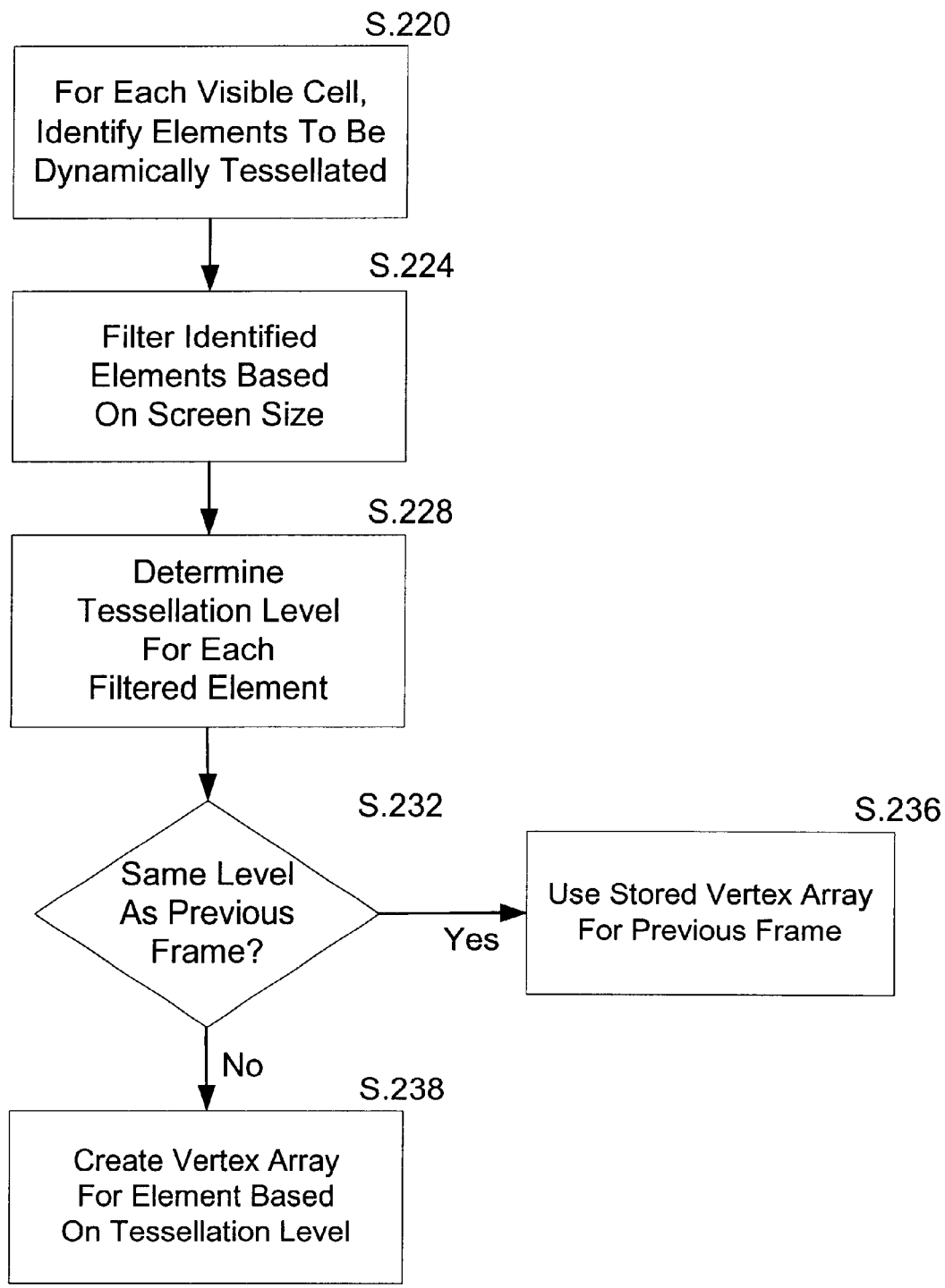
FIG. 23 is an exemplary flow diagram for performing dynamic tessellation during rendering, consistent with embodiments of the invention.

For all visible cells, elements to be dynamic tessellated may be identified and dynamically tessellated (step S.186). For example, graphics system 24 may analyze each visible cell to locate and identify dynamic tessellation elements. The identified elements may then be dynamically tessellated according to various factors, such as the size of the element or object on the screen. FIG. 23, described in detail below, illustrates an exemplary flow diagram for performing dynamic tessellation operations, consistent with embodiments of the invention.

Referring again to FIG. 19, after performing occlusion culling (step S.184) and dynamically tessellating elements in visible cells (step S.186), the next frame is rendered to the user (step S.188). As part of this process, graphics system 24 may generate a set of commands (such as OpenGL commands) based on the results of the rendering operations for the next frame to be rendered. The OpenGL commands may be issued by the graphics engine (such as graphics engine 242) to the graphics card or hardware (such as graphics hardware 18) to cause display 12 to render the next frame to the user.

Figure 20:
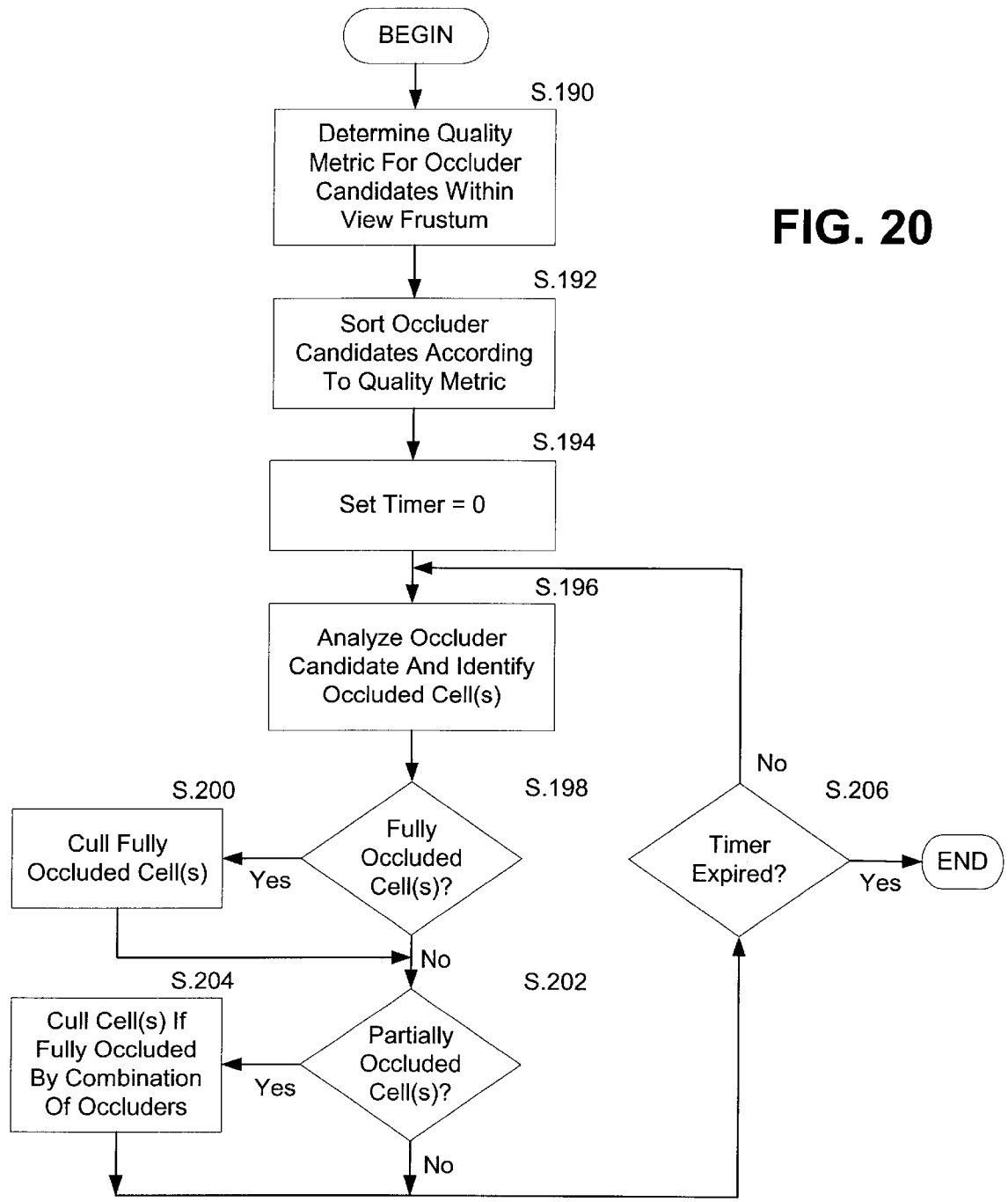
FIG. 20 is an exemplary flow diagram for analyzing occluder candidates and blocked cells during rendering, consistent with embodiments of the invention.

FIG. 20 is an exemplary flow diagram for analyzing global occluder candidates and performing occlusion culling, consistent with embodiments of the invention. The exemplary flow diagram of FIG. 20 may be performed during run-time operations to perform occlusion culling using, for example, the system environment 10 of FIG. 1 or the network environment 50 of FIG. 2. For purposes of illustration, however, reference will be made to the embodiment of FIG. 1 to describe the flow diagram of FIG. 20.

To perform occlusion culling, an associated quality metric may be determined for each global occluder candidate that is within the view frustum (step S.190). For instance, based on the view frustum or octree nodes determined to be visible for the next frame, global occluder candidates in the VR file(s) may be analyzed by graphics system 24 to determine a quality metric. The quality metric may be determined based on a number of factors that indicate whether the occluder candidate may function as a good occluder for the next frame. By way of example, factors for determining a quality metric may include: the visible surface area of the occluder candidate; the distance of the occluder candidate from the viewer or camera position; the shortest distance between the center of the occluder candidate and the perimeter of the occluder candidate; the angle between the viewer or camera position for the next frame, and the point on the perimeter of the occluder that is closest to the center of the occluder (the "closest perimeter point"); and/or the number of elements occluded by the occluder candidate in previous frame(s).

Figure 21A:
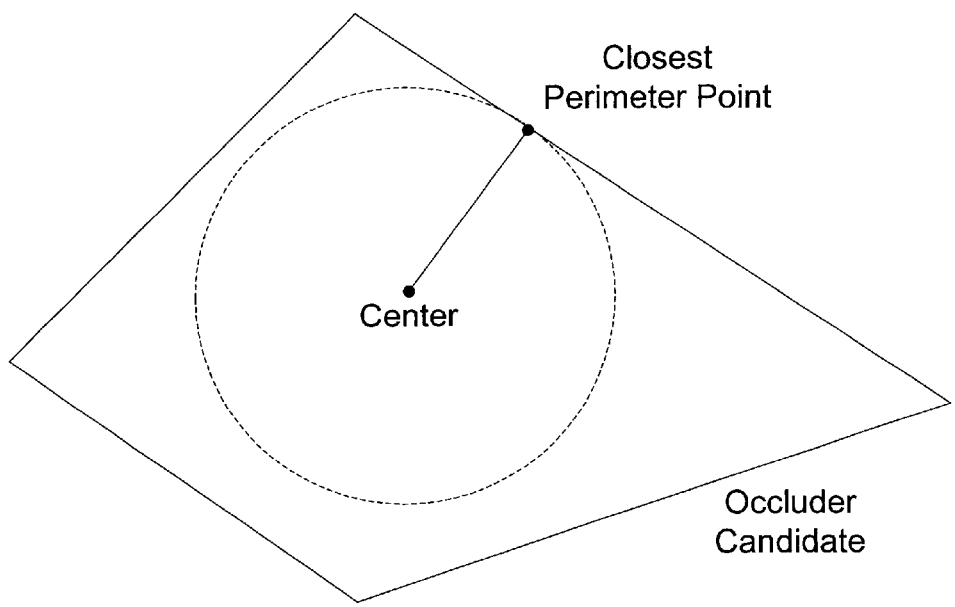
FIGS. 21A and 21B are exemplary illustrations of determining the closest perimeter point and measuring an angle a for an occluder candidate, consistent with embodiments of the invention.
Figure 21B:
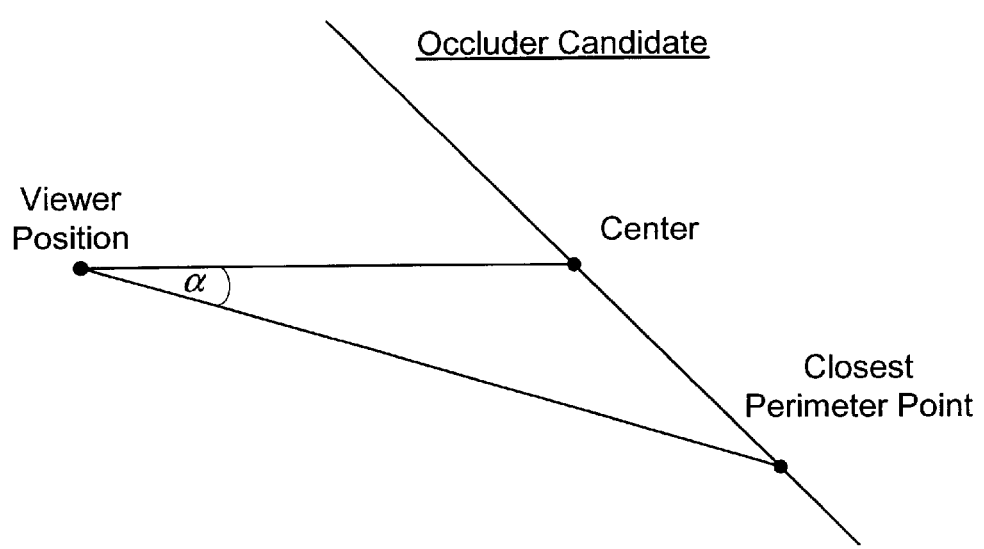

For example, in accordance with an embodiment of the invention, the quality metric (Q) for an occluder candidate may be defined as follows: $Q=\alpha+n$; where $\alpha$ is the value of the angle between the viewer position and the closest perimeter point and n is the number of occluded elements in previous frame(s) by the occluder candidate. As illustrated in FIG. 21A, the center of the occluder candidate may be a middle point or center of gravity for the occluder candidate from which the closest perimeter point is determined. Further, as illustrated in FIG. 21B, the angle a may be determined from the angle between the viewer point and closest perimeter point relative to the center of the occluder candidate. Moreover, consistent with embodiments of the invention, the number n may be determined from the number of occluded elements in the previous frame or a weighted average of occluded elements (giving more weight to the number of occluded elements from more recent frames) of a plurality of previous frames (such as the last ten frames).

Referring again to FIG. 20, the occluder candidates that are within the view frustum are sorted in accordance with their quality metric (step S.192). For instance, graphics system 24 may sort the occluder candidates in descending order based on their associated quality metric, such that occluder candidates with higher quality metrics come before other occluder candidates with lower quality metrics. By sorting occluder candidates, occluder candidates with higher quality metrics can be analyzed first and occluded cells can be identified more quickly and efficiently.

The analysis of occluder candidates may be performed over a predetermined time period. In accordance with an embodiment of the invention, such an analysis may also be limited in time (e.g., over a 2 ms time period) to prevent processing time by the graphics system 24 being wasted on excessive occluder candidates that have low quality metrics or marginal chances of acting as an occluder. Thus, the time period may be set according to the speed of the graphics hardware 18 to prevent processing time of the graphics system 24 from taking longer than that which could otherwise be handled more efficiently through rendering with the graphics hardware 18. This is because most conventional graphics card include depth or z buffering which enable the graphics card to determine, on a pixel-by-pixel basis, which elements or objects are closer to the viewer position so that occluded pixels of elements or objects are not displayed. Thus, occluded elements or objects that are not identified within the predetermined time period by the graphics system 24 can still be processed and eliminated (i.e., not displayed) during processing by the graphics hardware 18. Accordingly, a timer may be reset (timer=0) before starting to analyze the sorted occluder candidates (step S.194). After setting the timer, each occluder candidates may be analyzed in order to determine if it occludes cells within the view frustum (step S.196).

Figure 22A:
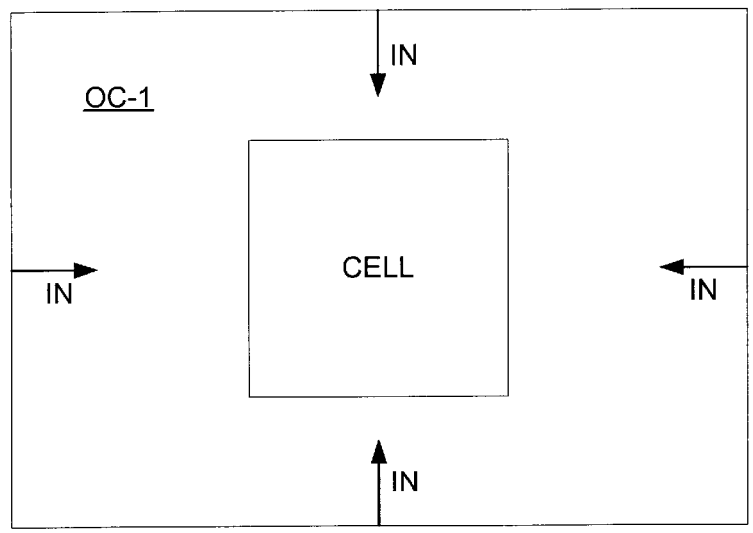
FIGS. 22A, 22B, 22C, 22D, and 22E illustrate examples of cells that are blocked, non-blocked or partially-blocked by occluder candidates.
Figure 22B:
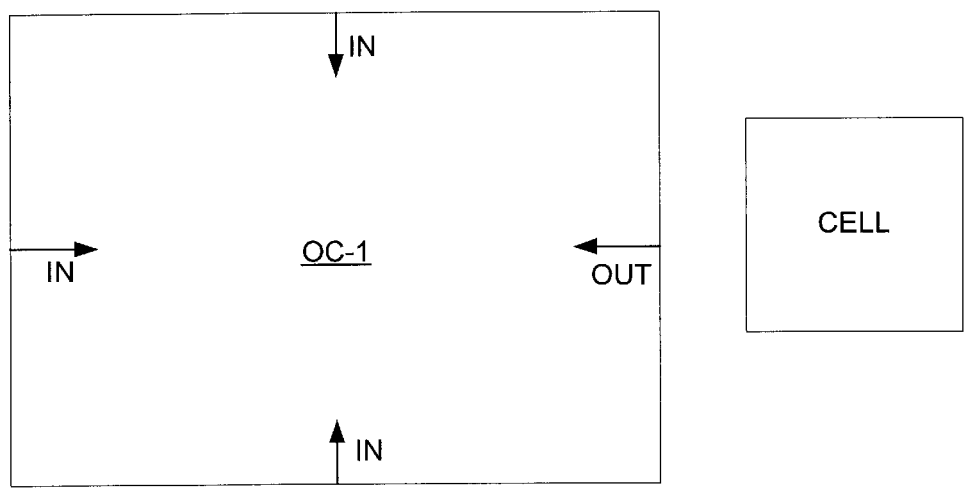

If the occluder candidate is determined to fully occlude one or more cells (step S.198; Yes), then each of the fully occluded cells may be culled (step S.200). As illustrated in FIG. 22A, a cell may be determined to be fully occluded if the cell is within the shadow volume of the occluder candidate (i.e., the points defining the cell are contained within all edges of the occluder candidate (OC-1)). In contrast, as illustrated in FIG. 22B, a cell may be determined not to be fully occluded if the points defining the cell are outside at least one edge of the occluder candidate (OC-1) and if the cell does not intersect any one of the edges of the occluder candidate.

If any cells are determined to be partially occluded (step S.202; Yes), then an analysis may be performed to determine if any of such cells are fully occluded by a combination of occluders. If cells are occluded by a combination of occluders, then any such cells may be occluded (step S.204). After inspecting each occluder candidate, a determination is made as to whether the predetermined time period has expired (step S.206). If the timer has not expired (step S.206, No), then additional occluder candidates are examined. Otherwise, if the timer has expired (step S.206; Yes), the process of inspecting occluder candidates is terminated.

Figure 22C:
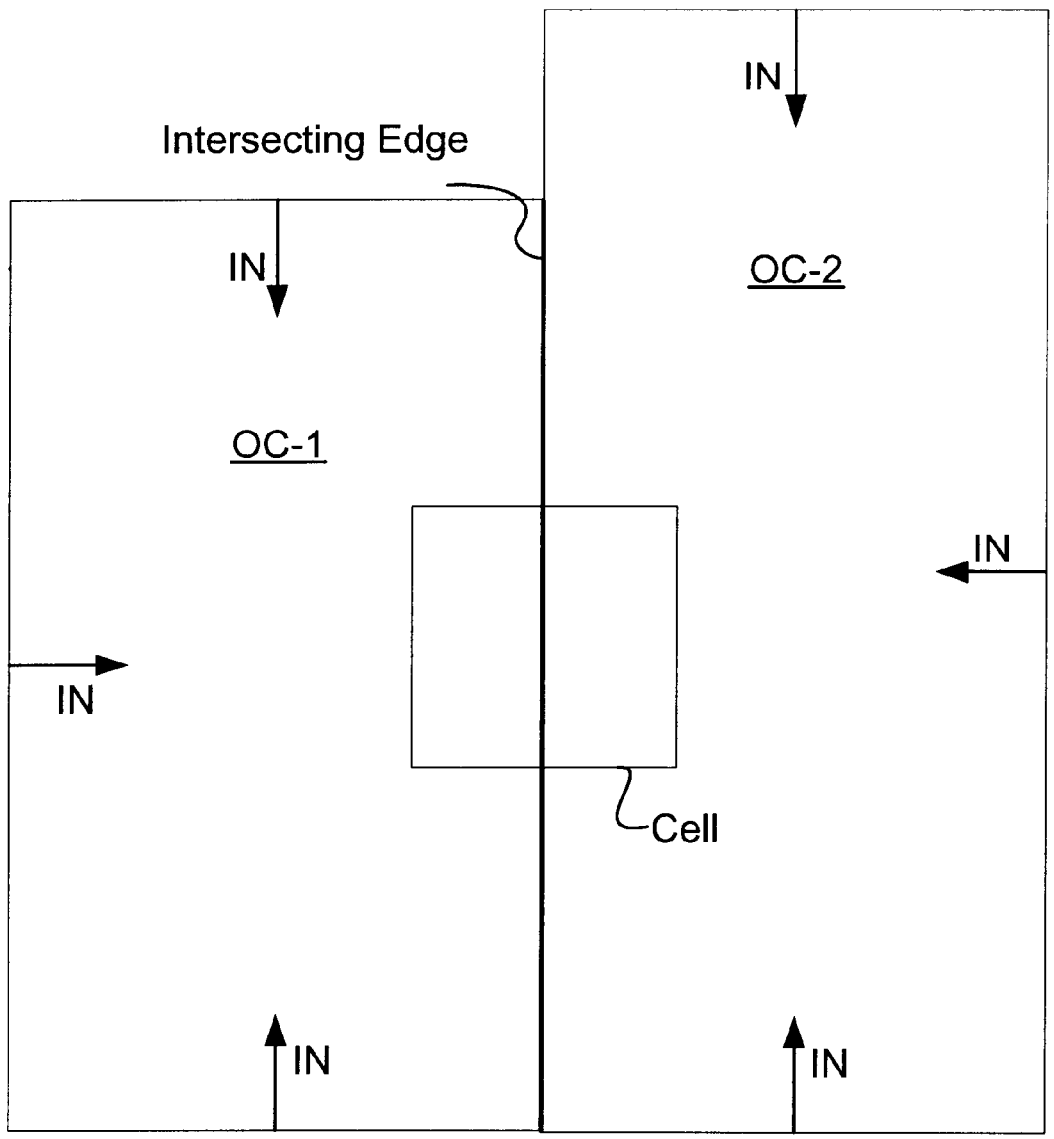

As indicated above, partially occluded cells may be further inspected to determine if they are fully occluded by a combination of occluders (see step S.204). For each partially blocked cell, an inspection can be made for neighboring occluders that, in combination with the occluder candidate, fully occlude the cell. As illustrated in FIG. 22C, a neighboring occluder (OC-2) may be identified by searching along the intersecting edge of the occluder candidate (OC-1) that intersects the cell. For each neighboring occluder that has a common edge with the occluder candidate along the intersecting edge, the other edges of the neighboring occluder may be analyzed to determine if the cell is occluded. If the points defining the cell are all within the other edges of the neighboring occluder (the case represented in the example of FIG. 22C), then the cell is fully occluded by the combination of the occluders. As a result, the cell is culled (step S.204).

If an intersecting edge is detected with the neighboring cell, then additional searching may be performed for other neighboring cells along the intersecting edge. This process may continue until the cell is determined to be fully occluded or until no additional neighboring cells are located. In cases where an intersecting edge is identified along an edge of a neighboring cell and no other neighboring cells are located with respect to the neighboring edge, the cell may be determined to be only partially occluded and the process may terminate.

Figure 22D:
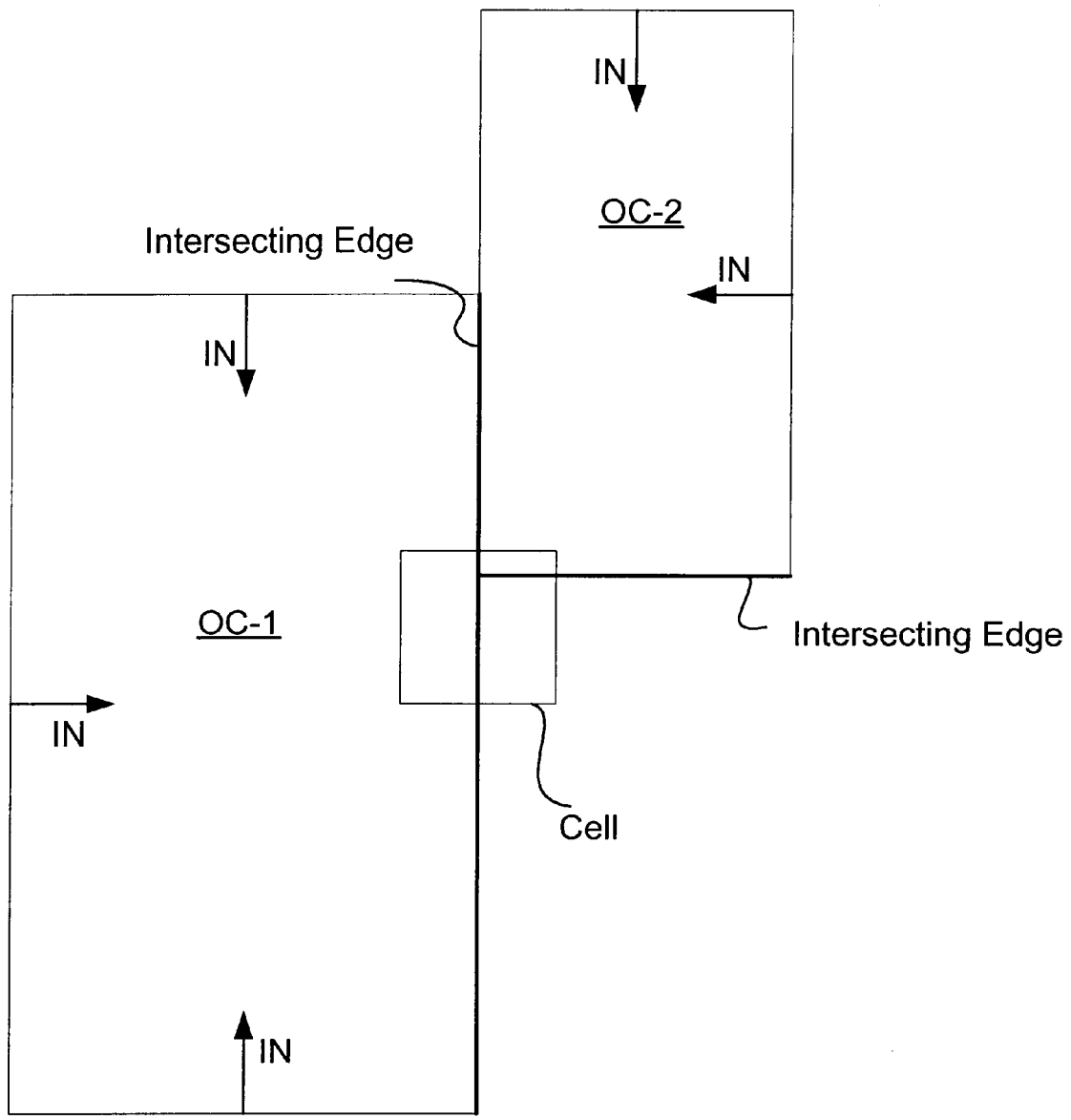

For example, as illustrated in FIG. 22D, a cell may first be determined to be partially occluded by an occluder candidate (OC-1). An inspection along the intersecting edge of the occluder candidate (OC-1) would reveal a neighboring occluder candidate (OC-2). To determine if the cell is fully occluded, the other edges of the neighboring occluder (OC-2) may be analyzed. With the example of FIG. 22D, such an analysis would reveal that the points defining the cell are within two of the other edges of the occluder (OC-2). However, an intersecting edge also exists with respect to the neighboring occluder (OC-2). Thus, the cell is not fully occluded by the combination of the identified occluders (OC-1 and OC-2). A search along the intersecting edge of the neighboring occluder (OC-2) would reveal that there are no additional neighboring occluders. Therefore, in the example of FIG. 22D, the process would terminate with the cell being identified as being only partially occluded.

Figure 22E:
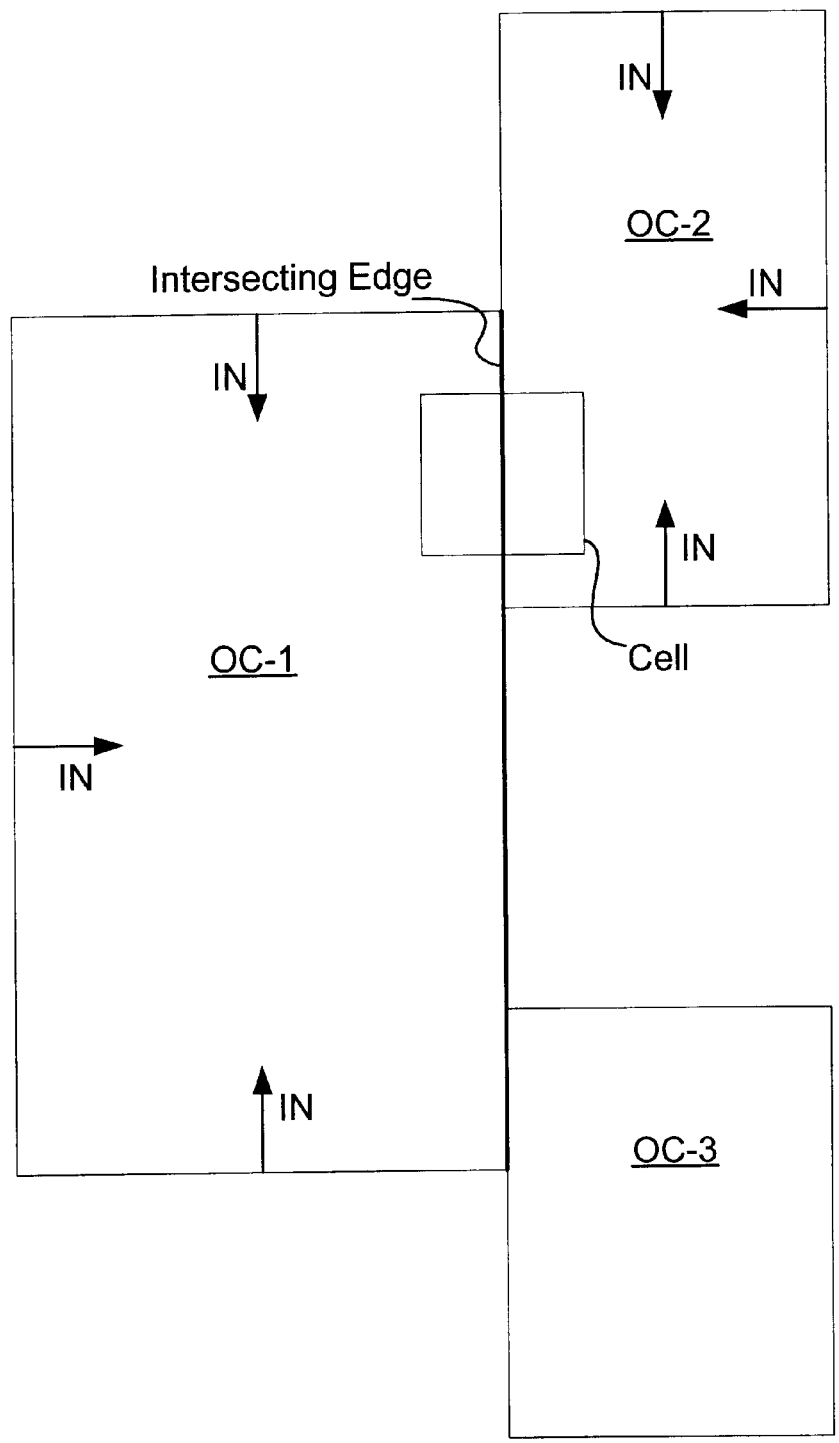

Another example is illustrated in FIG. 22E. In this example, the cell would first be determined to be partially occluded by an occluder candidate (OC-1). An inspection along the intersecting edge of the occluder candidate (OC-1) would then reveal a neighboring occluder candidate (OC-2). To determine if the cell is fully occluded by the neighboring occluder (OC-2), the other edges of the neighboring occluder may be analyzed. In the case of FIG. 22E, such an analysis would reveal that the points defining the cell are within all of the other edges of the occluder (OC-2) and that no other intersecting edges exist. Therefore, the cell is fully occluded by the identified occluders (OC-1 and OC-2) and the cell may be culled. While another neighboring occluder (OC-3) exists, processing may terminate once it is determined that the cell is fully occluded and, thus, there is no need to search or analyze additional neighboring occluders.

FIG. 23 illustrates an exemplary flow diagram for performing dynamic tessellation, consistent with embodiments of the invention. The exemplary flow diagram of FIG. 23 may be performed during run-time operations to perform dynamic tessellation using, for example, the system environment 10 of FIG. 1 or the network environment 50 of FIG. 2. For purposes of illustration, however, reference will be made to the embodiment of FIG. 1 to describe the flow diagram of FIG. 23.

As illustrated in FIG. 23, the dynamic tessellation elements for each visible cell within the view frustum are first identified (step S.220). As indicated above, curved and rounded elements may be filtered and stored as dynamic tessellation elements in the VR file(s). Accordingly, when inspecting each visible cell, graphics system 24 may readily identify and single out those elements stored in the VR file(s) as dynamic tessellation elements. Consistent with embodiments of the invention, one or more types of dynamic tessellation elements may be stored in the VR file(s), such as cone element types, torus element types, and surface-of-revolution types.

For each identified dynamic tessellation element, a filtering process may be performed based on the screen size of the element or object (step S.224). The filtering process may be performed so that only identified elements of a significant or predetermined size in the next frame will be dynamically tessellated. To determine or estimate the screen size of an element, one or more factors may be considered, including the actual size of the element and/or the distance of the element from the viewer or camera position. By inspecting or estimating the screen size of an element, graphics system 24 can determine whether to filter the element so that it will be dynamically tessellated for the next frame or whether to reject an element so that it will not be dynamically tessellated and/or displayed. As a result, elements that are too small or insignificant for dynamic tessellation (such as elements that have a screen size of only a few pixels) may be identified and rejected by graphic system 24.

Various techniques may be employed to filter dynamic tessellation elements. For instance, in accordance with an embodiment of the invention, the screen size for an element may be estimated and compared with a predetermined threshold. If the estimated screen size is below the predetermined threshold, then the element may be rejected for filtering. Otherwise, if the estimated screen size is equal to or greater than the predetermined threshold, the element may be filtered so that it will be dynamically tessellated and rendered in the next frame. Optionally, elements determined to have a screen size that is below a predetermined threshold may have a tessellation level that is set to zero so that they are not displayed.

Embodiments consistent with the invention may estimate or calculate a screen size for each type of dynamic tessellation element. For example, if the identified element is a cone element type (see, for example, FIG. 10A), then the screen size ($S_C$) may be computed as follows: $S_C=(50\times H)/d$, where H represents the visible radius of the cone and d represents the distance between the viewer or camera position and the center point (C) along the main axis of the cone. Referring to FIG. 10A, the visible radius H of a cone may be computed by taking the distance between the center point (C) and either the center point of the top (T) or the center point of the bottom (B) of the cone. If the screen size $S_C$ of the cone element type is determined to be less than 0.3, then element may be rejected. Otherwise, if the screen size $S_C$ of the cone is equal to or greater than 0.3, then the element may be further processed for dynamic tessellation. The above-noted example assumes a scale size that is measured in centimeters. If a different scale size is used, then the exemplary algorithm for computing the screen size ($S_C$) and the exemplary thresholds may be adjusted accordingly.

Similar processing may be performed for identified torus element types. For example, if the identified element is a torus element type (see, for example, FIG. 10B), then the screen size ($S_T$) may be computed as follows: $S_T=(50\times V)/d$, where V represents the visible radius of the torus and d represents the distance between the viewer or camera position and the center point (C) of the torus. Referring to FIG. 10B, the visible radius V of a torus may be calculated by summing the internal and outer radii ($R_1$ and $R_2$) of the torus. With a torus element type, the element may be rejected if the screen size $S_T$ of the element is determined to be less than 0.3. Otherwise, if the screen size $S_T$ of the tours is equal to or greater than 0.3, then the element may be filtered for dynamic tessellation. Once again, the above-noted example assumes a scale size that is measured in centimeters. If a different scale size is used, then the exemplary algorithm for computing the screen size ($S_T$) and the exemplary thresholds may be adjusted.

Figure 10C:
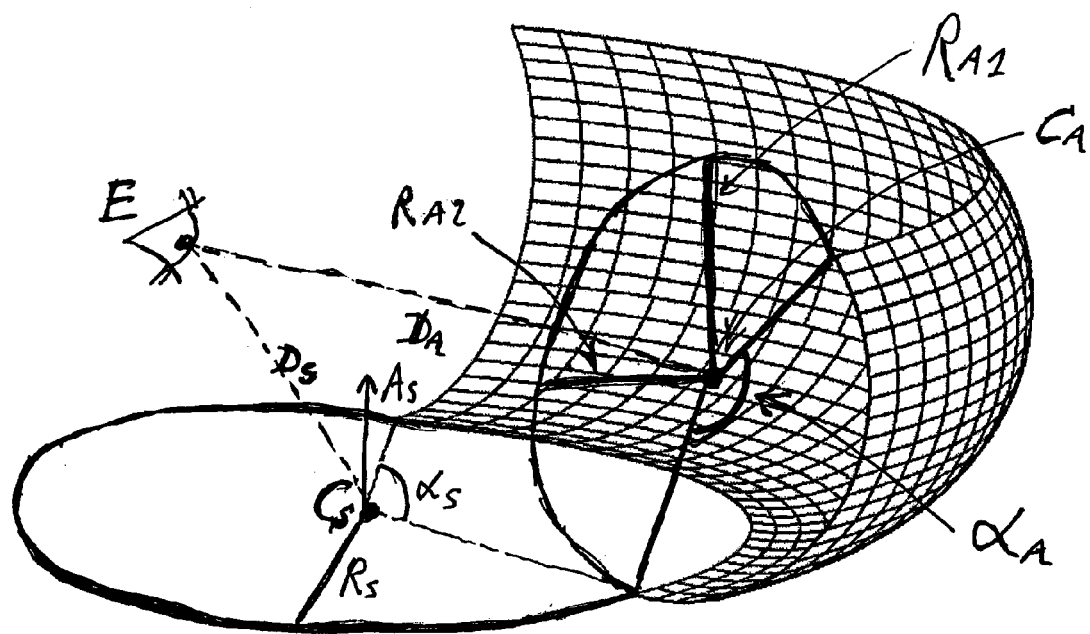

Surface-of-evolution element types may also be filtered, consistent with embodiments of the invention. For a surface-of-revolution element (see, for example, FIG. 10C), then the screen size ($S_S$) may be computed as follows: $S_S=(50\times V)/(D_A+D_C)$, where V represents the visible radius of the element, $D_A$ represents the distance between the viewer or camera position (E) and the center point ($C_A$) of the arc or ellipse of the element, and $D_C$ represents the distance between the viewer or camera position (E) and the center point ($C_S$) of the surface-of-revolution element. Referring to FIG. 10C, the visible radius V may be calculated by summing the radii of the arc or ellipse ($R_{A1}$ and $R_{A2}$) with the radius of the of the revolution ($R_S$). With a surface-of-revolution element type, the element may be rejected if the screen size $S_S$ of the element is determined to be less than 0.03. Otherwise, if the screen size of the $S_S$ of the element is equal to or greater than 0.03, then the surface-of-revolution element may be filtered for dynamic tessellation. Once again, the above-noted example assumes a scale size that is measured in centimeters. If a different scale size is used, then the exemplary algorithm for computing the screen size ($S_S$) and the exemplary thresholds may be adjusted accordingly.

Referring again to FIG. 23, for each of the filtered elements, a tessellation level may be computed (step S.228). The tessellation level may depend on or relate to the screen size of the element or object. In accordance with embodiments of the invention, the tessellation level determined during run-time operations may control the manner or level of detail by which an element is rendered. Thus, the tessellation level may be based on a predetermined scale or related to a value which indicates the number of triangles used for rendering the element or object. Further, as indicated above, if the screen size of an element is determined to be below a predetermined threshold, then the tessellation level for the element may be set to zero so that the element will not be displayed.

Consistent with embodiments of the invention, a tessellation level may be computed for each type of dynamic tessellation element. For example, in order to determine the tessellation level for a cone element type (see, for example, FIG. 10A), the tessellation level ($L_C$) may be computed as follows: $L_C=((500\times R)/d)\times Q$, where R represents the larger of the two radii ($R_t$ or $R_b$) of the cone, d represents the distance between the viewer or camera position and the center point (C) along the main axis of the cone, and Q represents a quality level metric. The quality level Q may be user defined to permit control or adjustment to the level of detail in the rendered frame. By way of example, a default value (such as 1) may be assigned to the quality level Q to represent normal processing. By increasing or decreasing the quality level Q from the default value, a user can adjust the level of detail in the rendered frame so that a dynamically tessellated cone appears with lesser or greater detail. The above-noted example assumes a scale size that is measured in centimeters. If a different scale size is used, then the exemplary algorithm for computing the tessellation level ($L_C$) may be adjusted accordingly.

The tessellation level for torus element types can also be determined, consistent with embodiments of the invention. For instance, to dynamically tessellate a torus element type (see, for example, FIG. 10B), a horizontal tessellation level ($L_H$) and a vertical tessellation level ($L_V$) may be computed. The horizontal tessellation level ($L_H$) may be used for dynamically tessellating the end(s) of the torus and may be computed as follows: $L_H=((50\times V)/d)\times Q$, where V represents the sum of the two radii ($R_1$ or $R_2$) of the torus, d represents the distance between the viewer or camera position and the center point (C) of the torus, and Q represents a quality level metric. The vertical tessellation level ($L_V$) may be used for dynamically tessellating along the torus and may be computed as follows: $L_V=((150\times V)/d)\times Q$, where V represents the sum of the two radii ($R_1$ or $R_2$) of the torus, d represents the distance between the viewer or camera position and the center point (C) of the torus, and Q represents a quality level metric. For both the horizontal and vertical tessellation levels, the quality level Q may be defined by a user to permit control or adjustment to the level of detail in the rendered frame. Once again, by increasing or decreasing the quality level Q from the default value (such as a default value of 1), a user can adjust the level of detail in the rendered frame so that dynamically tessellated torus appears with lesser or greater detail. The above-noted example assumes a scale size that is measured in centimeters. If a different scale size is used, then the exemplary algorithms for computing the tessellation levels ($L_H$ and $L_V$) may be adjusted accordingly.

Surface-of-revolution elements may also be dynamically tessellated. For instance, in order to dynamically tessellate a surface-of-revolution element type (see, for example, FIG. 10C), a revolution tessellation level ($L_R$) and an arc tessellation level ($L_A$) may be computed. The revolution tessellation level ($L_R$) may be used for dynamically tessellating about the revolution of the element and may be computed as follows: $L_R=(\alpha_s\times R_S\times 20,000)/(D_S)^2\times Q$, where $\alpha_s$ represents the angle of the revolution, $R_S$ represents the radius of the revolution, $D_S$ represents the distance between the viewer or camera position (E) and the center point ($C_S$), and Q represents a quality level metric. The vertical tessellation level ($L_V$) may be used for dynamically tessellating along the arc of the element and may be computed as follows: $L_V=(\alpha_A\times(R_{A1}+R_{A2})\times 20,000)/(D_A)^2\times Q$, where $\alpha_A$ represents the angle of the profile or ellipse, $R_{A1}$ and $R_{A2}$ represent the radii of the profile or ellipse, $D_A$ represents the distance between the viewer or camera position (E) and the center point ($C_A$) of the profile or ellipse, and Q represents a quality level metric. In both of the tessellation levels, the quality level Q may be defined by a user to permit control or adjustment to the level of detail in the rendered frame. Thus, by increasing or decreasing the quality level Q from the default value (such as a default value of 1), a user can adjust the level of detail in the rendered frame so that dynamically tessellated element appears with lesser or greater detail. Once again, the above-noted example assumes a scale size that is measured in centimeters. If a different scale size is used, then the exemplary algorithms for computing the tessellation levels ($L_R$ and $L_V$) may be adjusted.

In accordance with an embodiment of the invention, the tessellation level for a dynamically tessellated element may be restricted to an upper value and/or a lower value. To restrict the tessellation level of dynamically tessellated elements, upper and/or lower clamp levels may be predefined. For example, for cone type elements that are dynamically tessellated, an upper clamp level (such as 36) may be predefined. With such an upper clamp level, the tessellation level for a cone element may be restricted and reset to 36 in cases where the computed tessellation level is greater than the upper clamp level.

Clamp levels may also be predefined for torus type elements. For instance, upper and lower clamp levels may be predefined for the horizontal tessellation level $L_H$ and the vertical tessellation level $L_V$. By way of example, an upper clamp level of 36 and a lower clamp level of 3 may be predefined for the horizontal tessellation level $L_H$. Further, by way of example, an upper clamp level of 64 and a lower clamp level of 1 may be predefined for the vertical tessellation level $L_V$. For both the horizontal and vertical tessellation levels, the tessellation level may be restricted and reset when the computed value for the tessellation level exceeds the predefined upper or lower clamp levels.

The tessellation levels for a surface-of-revolution element may also be restricted by predefined clamp levels. For example, upper and lower clamp levels may be predefined for the revolution tessellation level $L_R$ and the arc tessellation level $L_A$. By way of example, an upper clamp level of 64 and a lower clamp level of 8 may be predefined for the revolution tessellation level $L_R$. Further, by way of example, an upper clamp level of 32 and a lower clamp level of 4 may be predefined for the arc tessellation level $L_A$. For both the revolution and arc tessellation levels, the tessellation level may be restricted and reset when the computed value for the tessellation level exceeds the predefined upper or lower clamp levels.

Referring again to FIG. 23, for each element to be dynamically tessellated, a determination may be made as to whether the tessellation for the next frame to be rendered is the same as the tessellation level used in a previous frame (step S.232). For this purpose, the vertex data for dynamically tessellated elements may be buffered in memory to facilitate such an analysis. Further, the tessellation levels for previously rendered dynamic tessellation elements may be stored in a table or file. If the element was not rendered in the previous frame at the same tessellation level (step S.232; No), then a vertex array may be computed for rendering the dynamically tessellated element according to the tessellation level for the next frame (step S.238). However, if the element was previously rendered at the same tessellation level (step S.232; Yes), then the stored vertex data for rendering the element in the previous frame may be used (step S.236). By using the stored vertex data, the element can be rendered faster in the next frame without the need to use any processing resources for computing the array. As further described below, the stored vertex data may be stored in a memory buffer such as video, AGP or backend memory (see FIG. 24A).

To generate a vertex data based on the tessellation level (step S.238), various techniques may be employed. For example, the number of triangles for rendering an element may be computed for each type of dynamic tessellation element as a function of the tessellation level. Consistent with embodiments of the invention, Table 1 includes exemplary relationships between the computed tessellation level and the number of triangle segments to render various types of the dynamic tessellation elements.

TABLE 1

| Element Type | Tessellation Level | Number of Triangles |
| --- | --- | --- |
| Open Cone | $L_C$ | 2 $L_C$ |
| Closed Cone | $L_C$ | 4 $L_C$ |
| Open Torus | $L_V$ $L_H$ | 2 $L_V \times L_H$ |
| Closed Torus | $L_V$ $L_H$ | (2 $L_V \times L_H$) + 2 $L_V$ |

TABLE 1-continued

| Element Type | Tessellation Level | Number of Triangles |
| --- | --- | --- |
| Surface-of-Revolution | $L_R$<br>$L_A$ | $2\ L_R \times L_A$ |

In Table 1, an open cone refers to a cone element in which both ends of the cone are rendered as an open surface. In such cases, the side surface of the cone element may be rendered with $2L_C$ number of triangles. A closed cone refers to a cone element in which both ends of the cone are rendered with a solid or closed surface (such as a cap). Closed cones may be rendered using $2L_C$ number of triangles for the side surface and $L_C$ triangles for each end of the cone. Thus, a total of $4L_C$ triangles ($2L_C+L_C+L_C$) may be used to rendered a closed cone. Of course, if only one end of a cone element is closed, then a total of $3L_C$ triangles ($2L_C+L_C$) may be used to render the cone.

Torus elements may also be rendered in a similar fashion. For instance, in the table, an open torus refers to a torus element in which both ends of the torus are rendered as an open surface. In such cases, the side surface of the torus element may be rendered with ($2L_V \times L_H$) number of triangles. On the other hand, a closed torus refers to a torus element in which both ends of the torus are rendered with a solid or closed surface (such as a cap). A closed torus may be rendered using ($2L_V \times L_H$) number of triangles for the side surface and $L_V$ triangles for each end of the torus Thus, a total of ($2L_V \times L_H$)+$2L_V$ triangles may be used to rendered a closed torus. Of course, if only one end of a torus element is closed and the other end is open, then a total of ($2L_V \times L_H$)+$L_V$ may be used to render the torus.

Various techniques may be used to render dynamic tessellation elements according to the computed tessellation level(s). For example, to render a cone element type, the top and bottom ellipses of the cone (see FIG. 10A) may be divided by $L_C$ number of points placed about the perimeter of each ellipse. Thereafter, a set of triangles may be defined for rendering the cone by connecting the points of the top and bottom ellipses. The triangle segments may be defined as a triangle list or triangle strip. For an open cone, this will result in the cone being rendered with 2 $L_C$ number of triangles. For a closed cone, the above-noted process will result in the cone being rendered with 4 $L_C$ number of triangles, defined as a single triangle list or defined with up to three triangle strips.

Similar techniques may be used for rendering other types of dynamic tessellation elements. For example, to render a torus element type, the inner ellipse or circle of the cone (having a radius $R_2$—see FIG. 10B) may be divided by $L_H$ number of points placed about the perimeter of the ellipse. Then, $L_V$ number of inner ellipses may be defined at equal intervals about the center (C) of the torus, with the center of each ellipse being positioned at a distance equal to the larger radius (R1) from the center (C) of the torus. Finally, a set of triangles may be defined for rendering the torus by connecting the points of the ellipses. The triangle segments may be defined as a triangle list or triangle strip. For an open torus, this will result in the torus being rendered with 2 $L_V \times L_H$ number of triangles. For a closed torus, this process will result in the torus being rendered with (2 $L_V \times L_H$)+$L_C$ number of triangles, defined as a single triangle list or defined with up to three triangle strips.

Surface-of-revolution element types may also be dynamically tessellated and rendered according to the computed tessellation levels. For example, to render a surface-of-revolution element type, the arc of the profile or ellipse of the element may be divided by $L_A$ number of points. Then, $L_R$ number of arc profile segments may be defined at equal intervals about the center ($C_S$—see FIG. 10C) of the surface-of-revolution. Finally, a set of triangles may be defined for rendering the surface-of-revolution by connecting the points of the arc profile segments. As a result, the surface-of-revolution will be rendered with 2 $L_R \times L_A$ number of triangles, defined as a single triangle list or defined as a single triangle strip.

Various techniques may be used for rendering dynamic tessellation elements, including those described above. Such techniques may be implemented through software-based components. By way of a non-limiting example, Appendix C includes exemplary programming code prepared in C++ for rendering a cone element. The exemplary programming code of Appendix C generates triangle segments for a cone element based on a determined tessellation level for the element. By further way of example, Appendix D includes exemplary programming code prepared in C++ for tessellating torus or elbow elements. In the exemplary code of Appendix D, triangle segments for an elbow or torus element are generated based on determined tessellation levels. Moreover, in Appendix E, exemplary C++ programming code is provided for generating triangle segments for rendering a surface-of-revolutions element based on determined tessellation levels for the element.

Consistent with embodiments of the invention, memory management operations may be performed to improve graphics rendering and system performance. For instance, memory management operations may be performed for allocating and handling data stored in video memory and/or accelerated graphics port (AGP) memory. Further, one or more rendering modules may be provided with the graphics system (such as graphics system 24 of FIG. 1) so that rendering operations are optimized for the particular type of graphics hardware employed by the system. A software-based rendering module may be provided for each type of graphics hardware (GeForce type graphics cards, etc.) supported by the system. The specifics of the graphics hardware may be automatically detected when the VR file(s) are loaded or may be specified by the user during system set-up. Depending on the type of graphics hardware used during run-time operations, the system may select the most optimum rendering module so that rendering operations can be performed efficiently.

By way of example, for systems employing GeForce type graphics card, an optimum rendering module may be provided that includes a custom memory manager. During system set-up operations, the custom memory manager may load and store vertex array data from the VR file(s) into the video memory of the graphics card. If video memory is not available, then the data may be stored in the system or AGP memory. In either case, storing as much vertex array data as possible into the video memory of the graphics card can reduce system access and improve the efficiency of run-time operations.

Figure 24A:
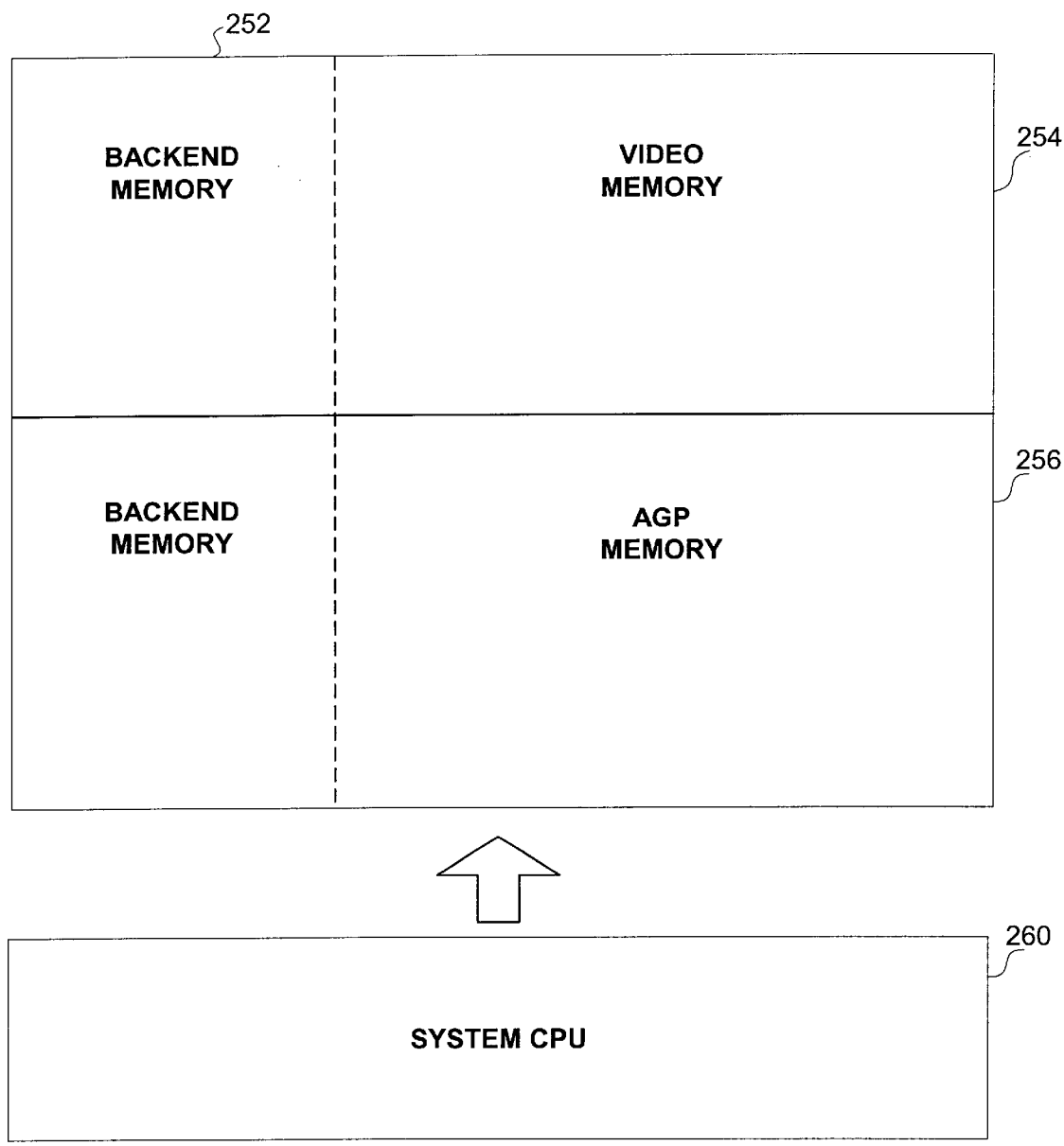
FIGS. 24A, 24B and 24C are exemplary diagrams related to performing memory management operations, consistent with embodiments of the invention.
Figure 24B:
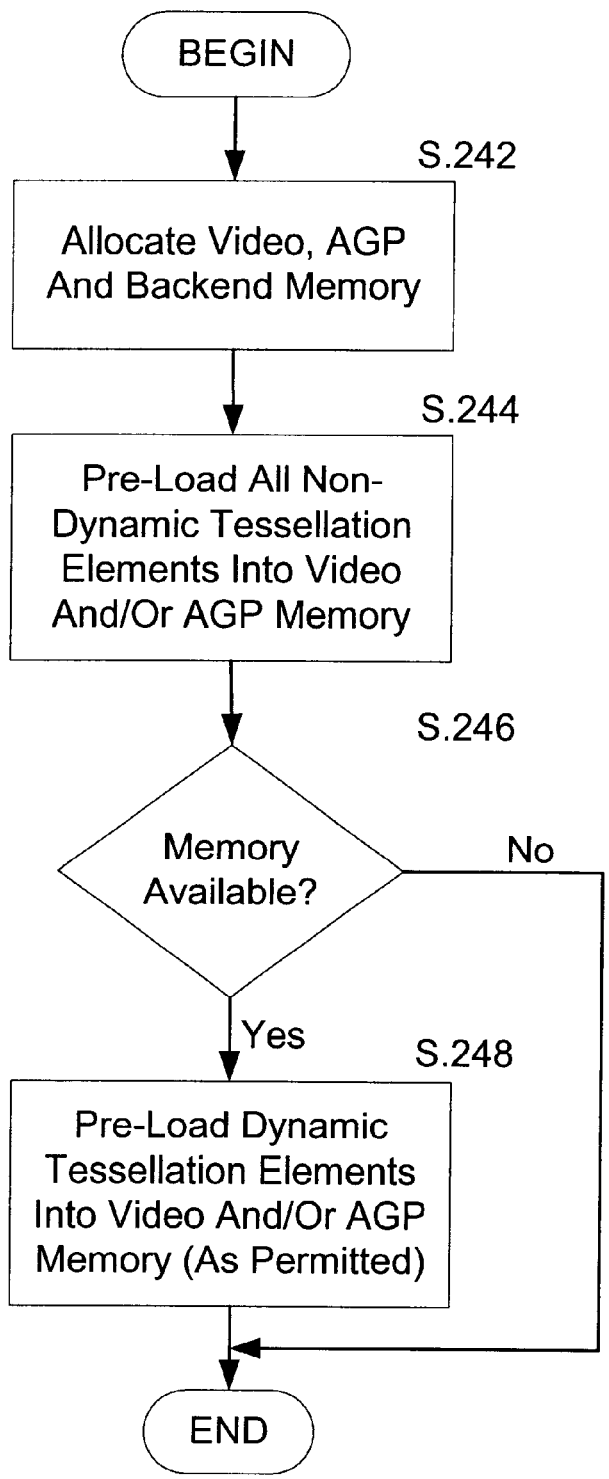
Figure 24C:
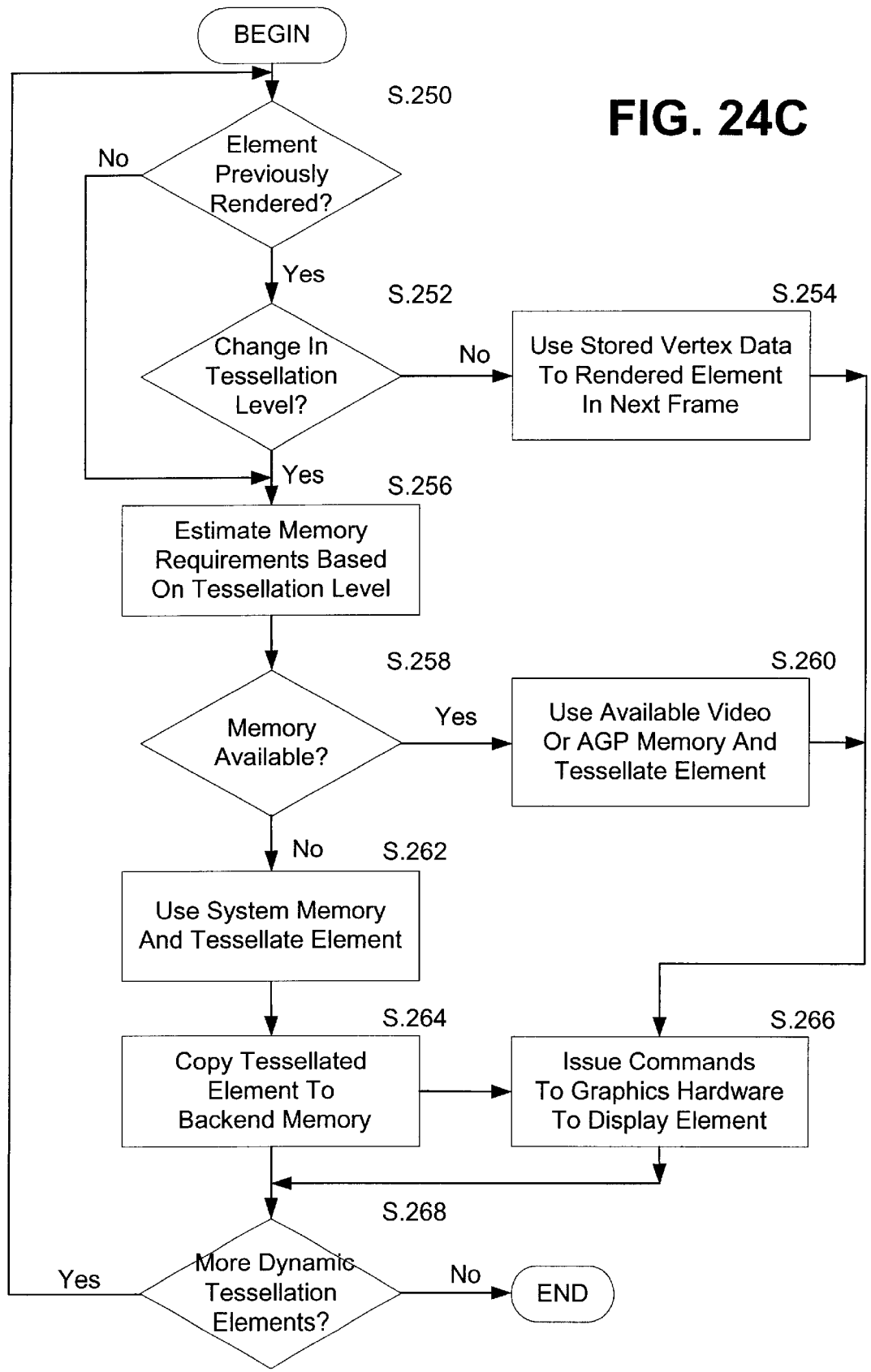
Figure 25A:
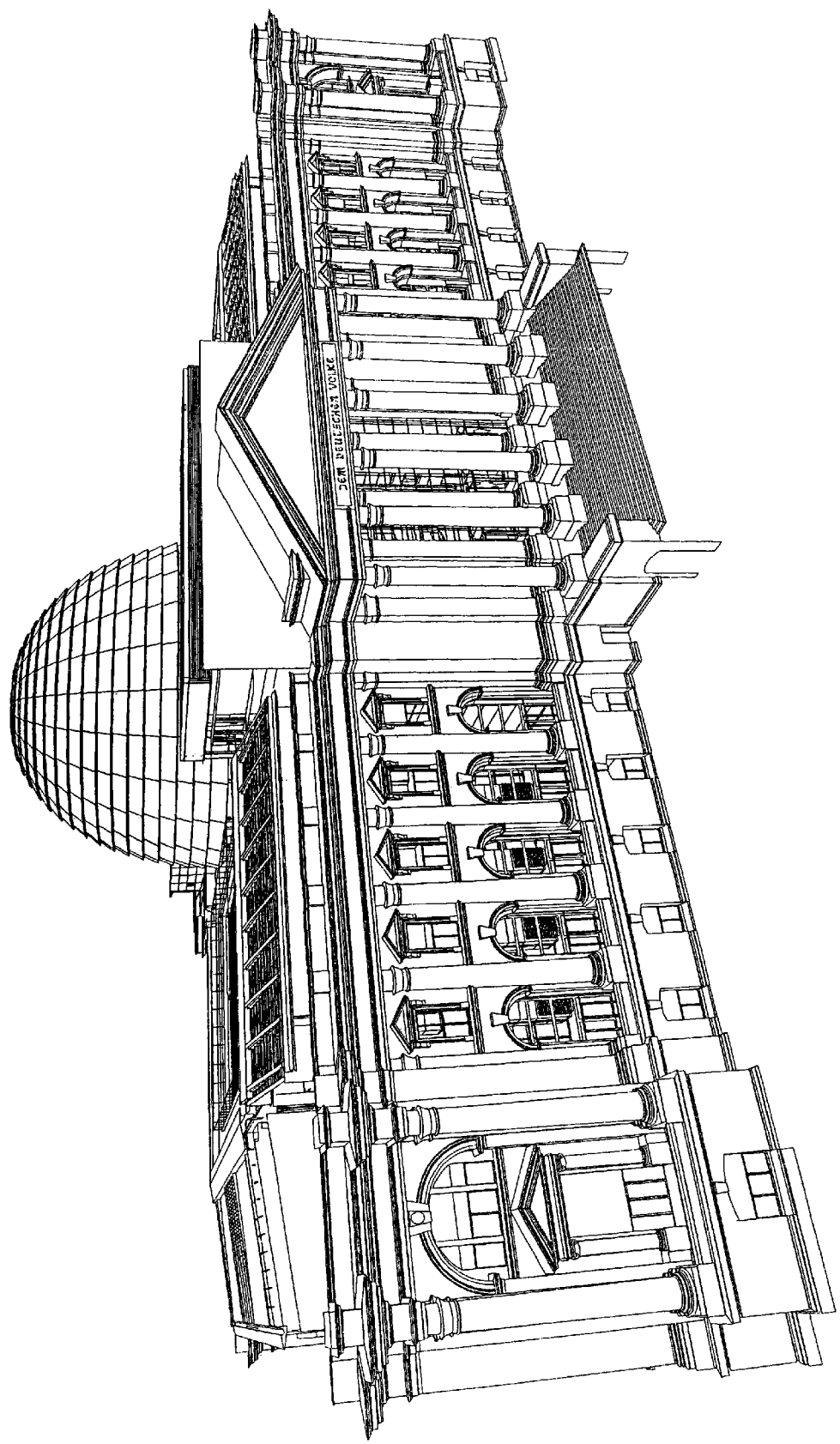
FIGS. 25A and 25B illustrate examples of rendered frames of a complex virtual environment that is representative of a building complex.
Figure 25B:
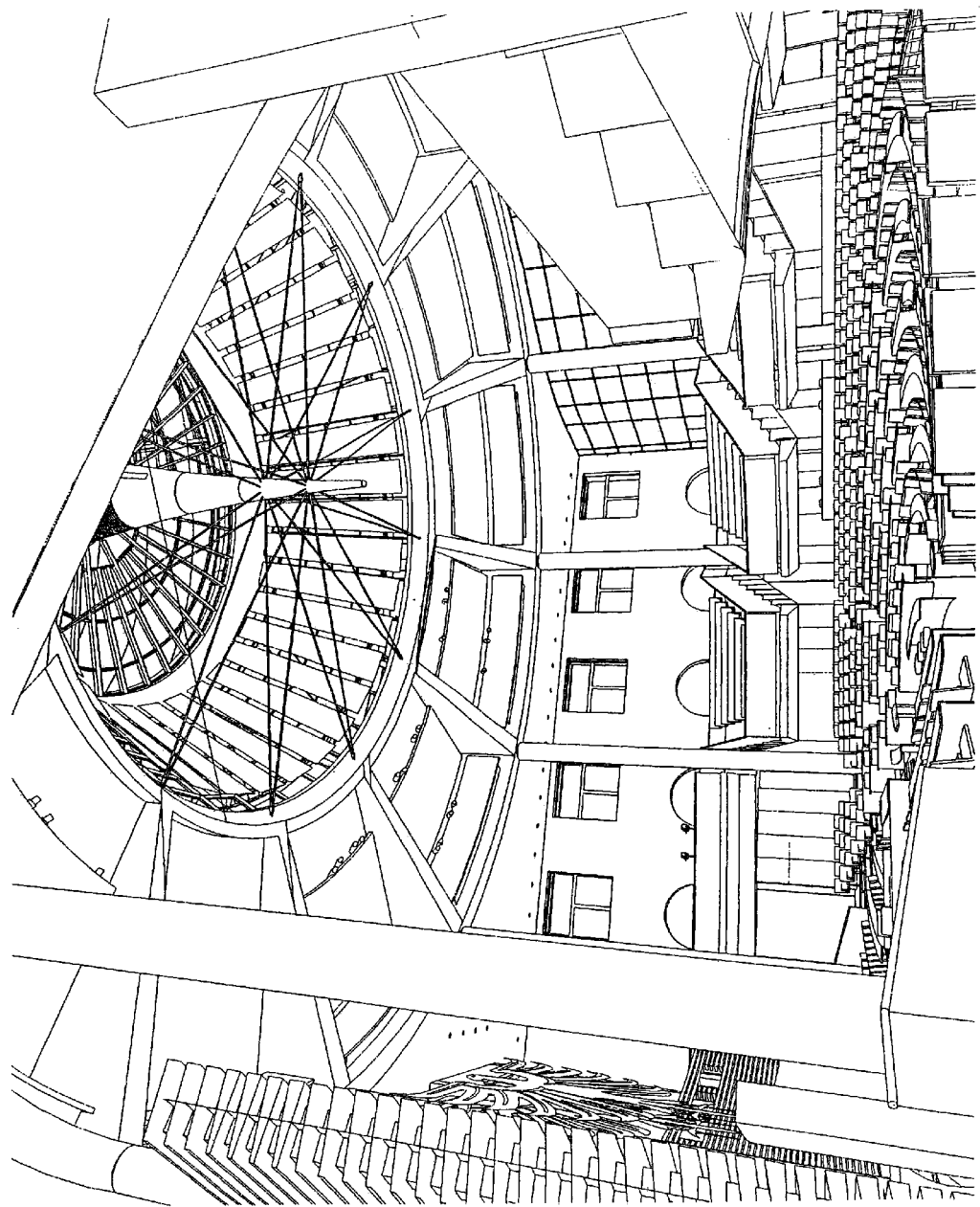
Figure 26A:
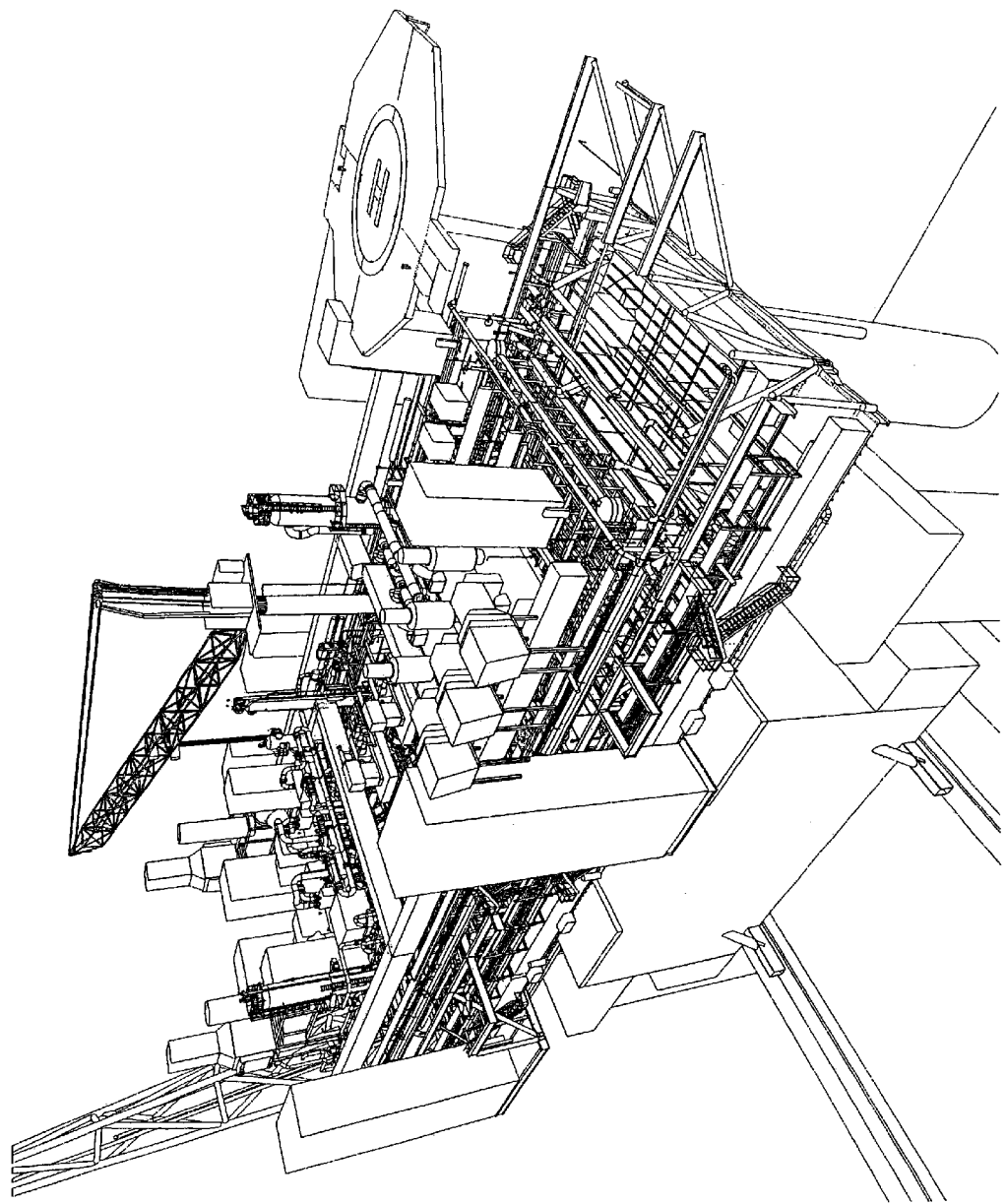
FIGS. 26A and 26B illustrate examples of rendered frames of a complex virtual environment that is representative of an offshore platform.
Figure 26B:
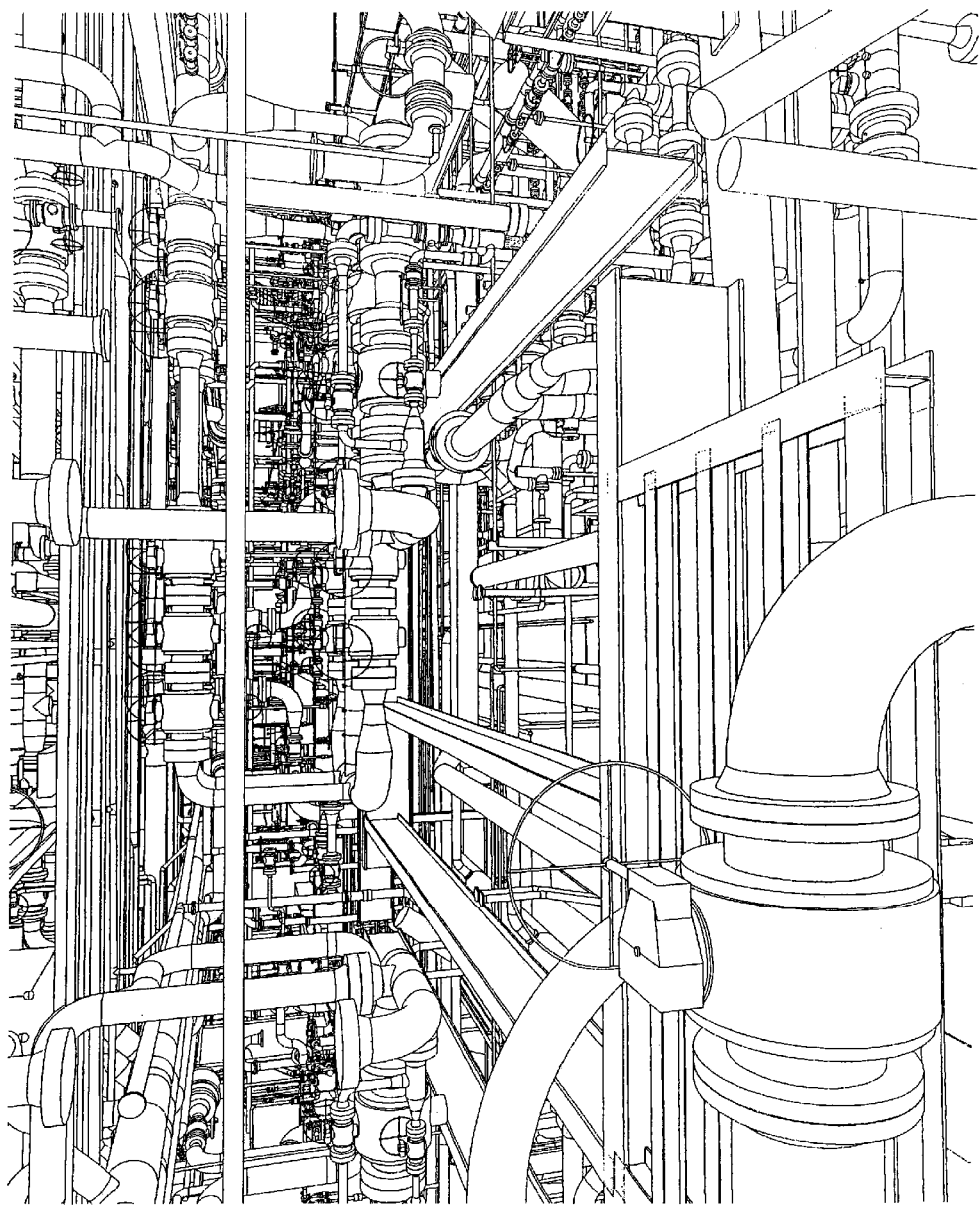
Figure 27A:
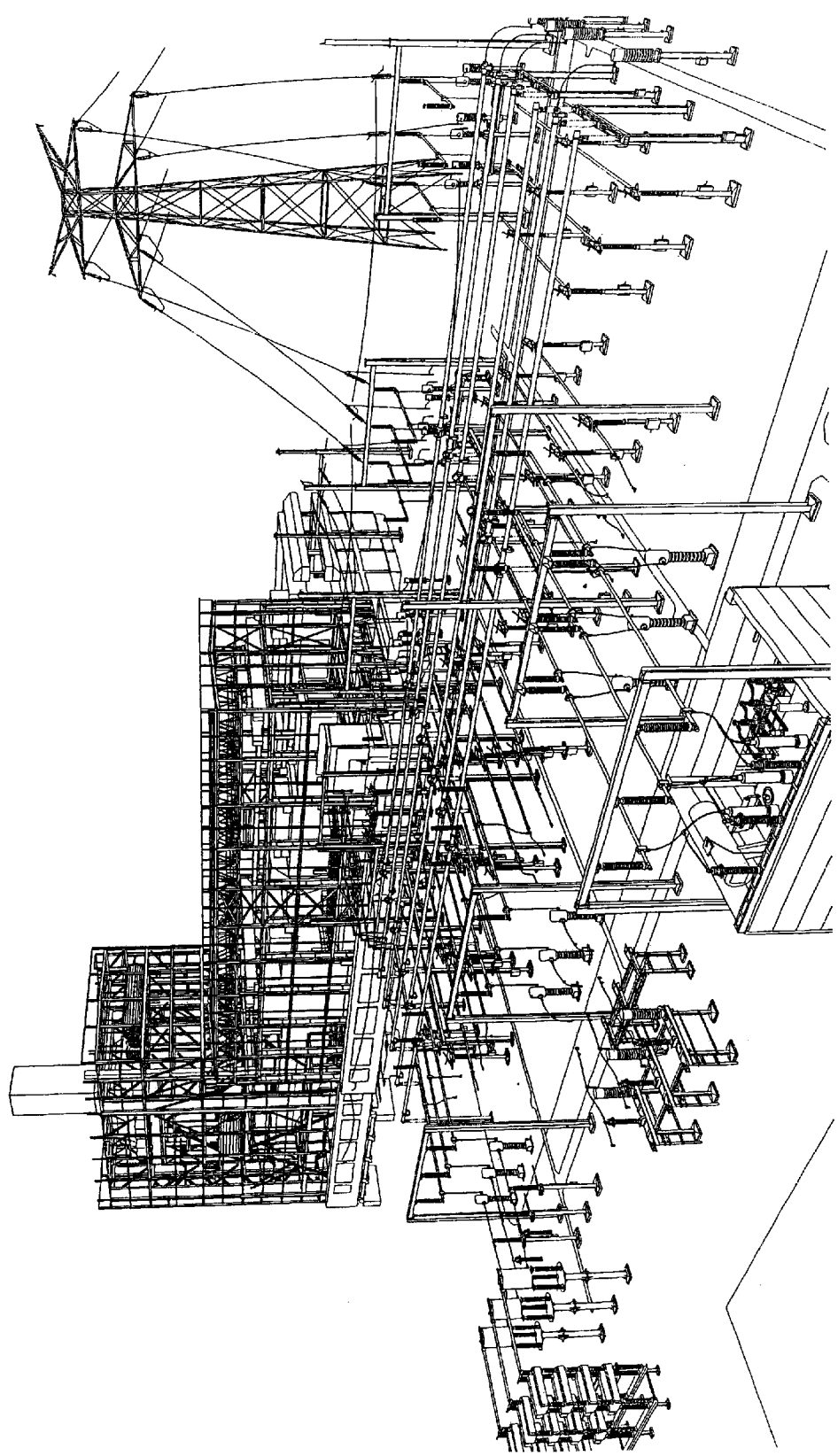
FIGS. 27A and 27B illustrate examples of rendered frames of a complex virtual environment that is representative of an energy plant.
Figure 27B:
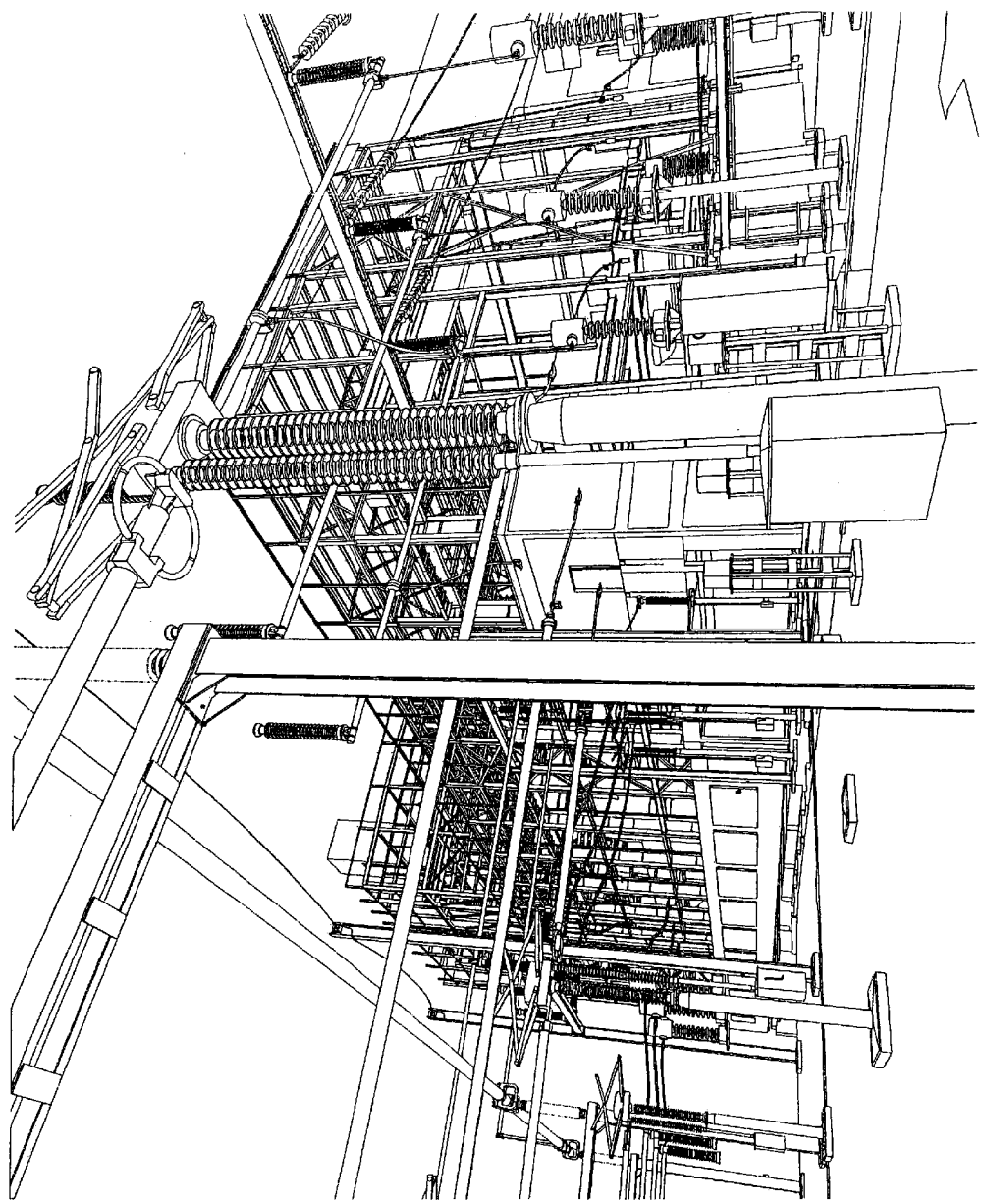
Figure 28A:
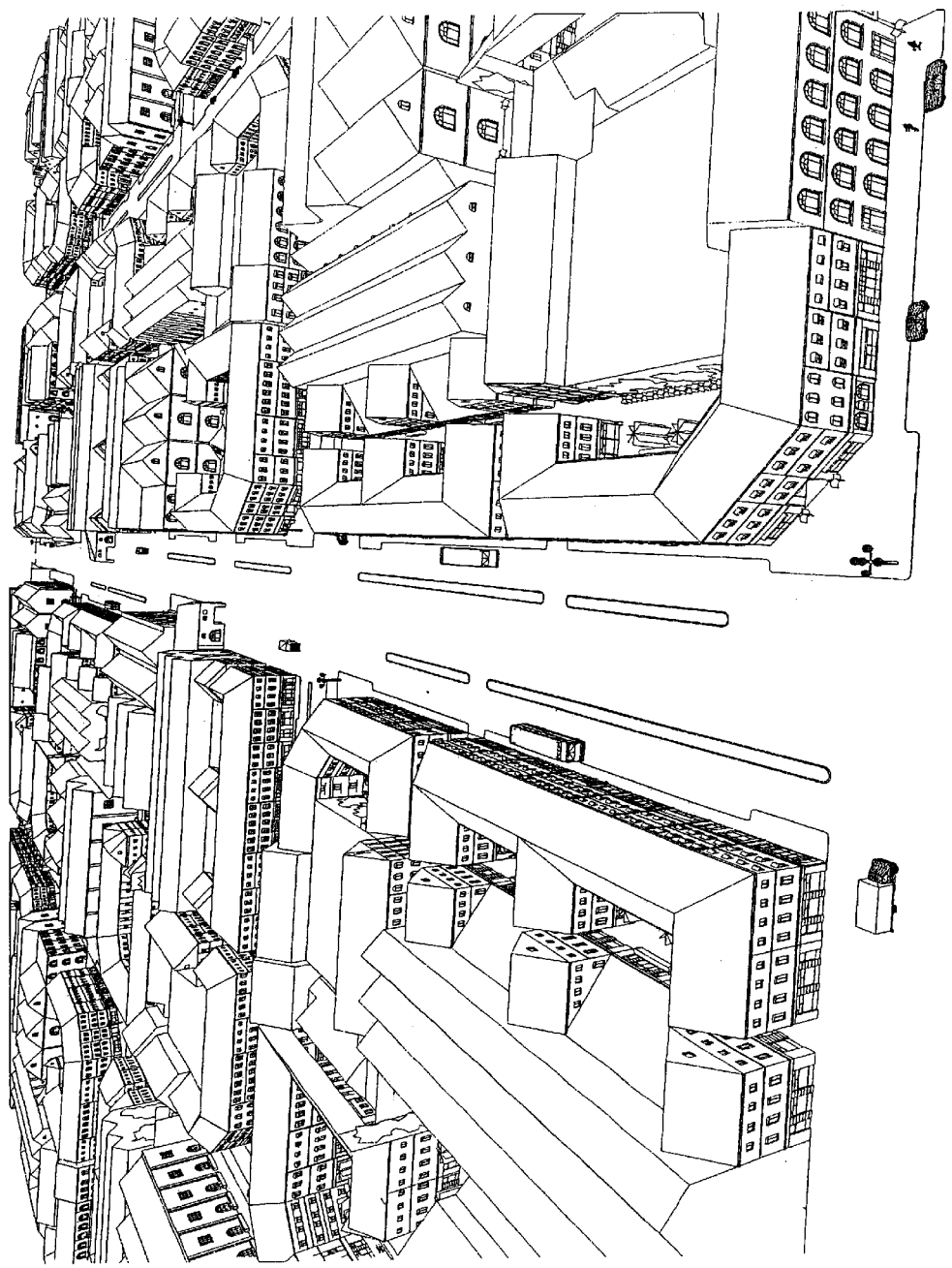
FIGS. 28A and 28B illustrate examples of rendered frames of a complex virtual environment that is representative of a city landscape.
Figure 28B:
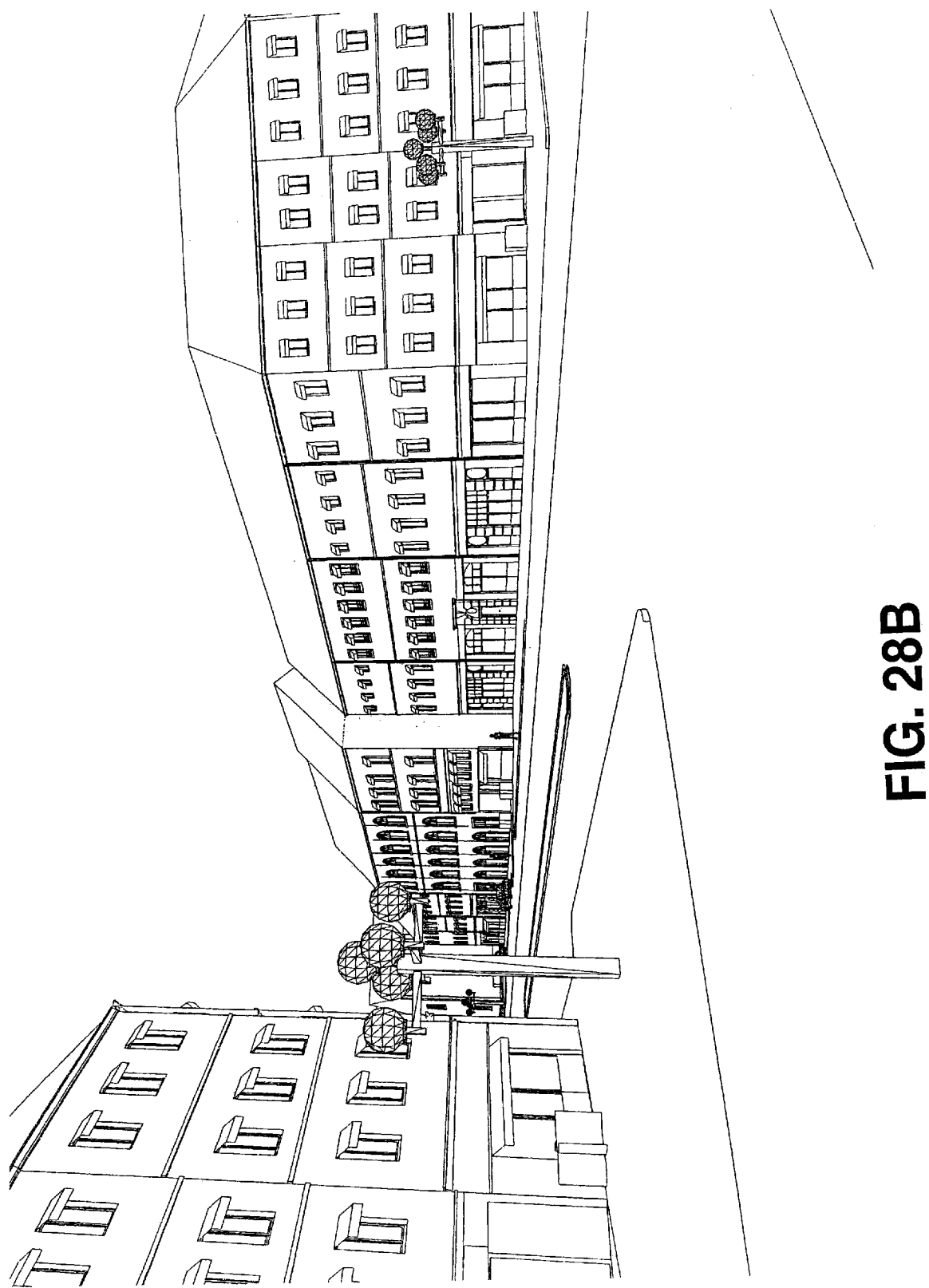

Referring to FIGS. 24A–24C, an exemplary systems and methods for performing memory management operations will be described, consistent with embodiments of the invention. The memory management operations described below may be performed to provide efficient rendering of complex virtual environments based on data from VR file(s). The exemplary features of the memory management operations, such as those described below with reference to FIGS. 24B and 24C, may be performed by one or more software-based modules.

As illustrated in FIG. 24A, memory management operations may be performed using a video memory 254 and an AGP memory 256. Video memory 254 may be implemented with the video memory of a graphics card (such as a graphics card provided as part of graphics hardware 18 in FIG. 1). AGP memory 256 may be implemented with memory reserved in the system environment or platform (such as reserved memory in computing platform 20 or memory 30 in FIG. 1). Further, consistent with embodiments of the invention, direct access to AGP memory 256 may be provided to the graphics card through an AGP bus or system bus. Such access by the graphics card may be performed without involvement or use of the system CPU 260 (such as a CPU of computing platform 20 in FIG. 1).

As illustrated in FIG. 24A, a backend memory 252 may also be reserved or defined. Backend memory 252 may be allocated using video memory 254 and/or AGP memory 256. For example, to handle complex virtual environments represented by large or massive models, backend memory 252 may have a total capacity of approximately 4 M. In contrast, video memory 254 and AGP memory 256 may be approximately 16 M in total memory size. During run-time operations, backend memory 252 may be used as a first-in, first-out (FIFO) queue to overwrite vertex arrays or data representing previously rendered elements with data representing other elements to be rendered to the user.

FIG. 24B is an exemplary flow diagram of memory management operations that may be performed during system set-up (i.e., during loading of the VR file(s)). As illustrated in FIG. 24B, during initialization or system set-up, video memory 254, AGP memory 256 and backend memory 252 may be allocated or reserved (step S.242). As part of this process, all non-dynamic tessellation elements defined in the VR file(s) may be loaded and stored into video memory 254 and/or AGP memory 256 (step S.244). For example, all non-dynamic tessellation elements defined in the octree file (such as octree file 52) may be loaded and stored in video memory 254 and/or AGP memory 256. If there is insufficient memory to store all of the non-dynamic tessellation elements into video memory 254 and/or AGP memory 256, then any additional elements may be stored in system memory (such as memory 30 in FIG. 1) and later transferred by system CPU 260 into backend memory 252 when it is needed to render a particular frame.

If there is available memory after storing all of the non-dynamic tessellation elements into video memory 254 and/or AGP memory 256 (step S.246; Yes), then dynamic tessellation elements defined in the VR file(s) may be stored in the remaining storage areas of the video memory and/or AGP memory as needed or permitted (step S.248). For example, in preparation for rendering the first frame, dynamic tessellation elements may be pre-loaded into memory. Dynamic tessellation elements may be loaded according to a default or initial position of the camera for the first frame to be rendered. As run-time operations are initiated and performed, additional memory management operations may be performed, as further described below.

FIG. 24C is an exemplary flow diagram of memory management operations that may be performed during run-time operations. Consistent with embodiments of the invention, the features of FIG. 24C may be performed for rendering frames of a complex virtual environment. For example, the exemplary memory management operations of FIG. 24C may be performed to facilitate the rendering of dynamic tessellation elements in each frame.

During run-time operations, a simulation loop may be executed to simulate and render each frame based on input from a user (see, for example, FIG. 7). During the simulation phase, collision detection and other operations may be performed to determine the viewer or camera position for the frame to be rendered. Based on the viewer position for the next frame, visibility and culling operations may be performed as part of a rendering phase to identify the visible elements for the frame. As indicated above, visible elements may include non-dynamic tessellation elements and dynamic tessellation elements. Consistent with embodiments of the invention, when displaying each rendered frame, all of the visible non-dynamic tessellation that are defined in the video or AGP memory may first be displayed by the graphics hardware on a display terminal. As part of this process, if some of the visible non-dynamic tessellation elements are stored in system memory (i.e., due to insufficient video or AGP memory during pre-loading), then any such elements may be copied to the backend memory to permit the graphics hardware to display them to the user. Thereafter, each of the dynamic tessellation elements to be displayed in the frame may be handled in accordance with the features of FIG. 24C.

As illustrated in FIG. 24C, for each dynamic tessellation element in the frame, a determination may be made whether the dynamic tessellation element was rendered in a previous frame (step S.250). For this purpose, the vertex data for dynamically tessellated elements may be buffered in memory (such as the video, AGP or backend memory) to facilitate such an analysis. Further, the tessellation levels for previously rendered dynamic tessellation elements may be stored in a table or file. If the element was previously rendered (step S.250; Yes), then an analysis can be made to determine if the tessellation level has changed (step S.252). For example, after determining the tessellation level of the dynamic tessellation element for the next frame, the tessellation level may be compared to the tessellation level for the same element in the previous frame. If there is no change in the tessellation level (step S.252; No), then the previously stored or buffered vertex data for rendering the dynamic tessellation element may be identified and used for the next frame (step S.254). However, if there is a change in the tessellation level (step S.252; Yes) or if the element was not previously rendered (step S.250; No), then an analysis may be performed to estimate the amount of memory space required for storing the triangle segments for the dynamic tessellation element (step S.256).

To estimate the memory requirements (step S.256), various approaches may be used. For example, based on the tessellation level, the number of triangles for rendering the dynamic tessellation element may be computed. As indicated above, the number of triangles can be computed directly from the tessellation level depending on the element type (open cone, closed cone, open torus, closed torus, surface-of-revolution, etc.). Relationships, such as the exemplary relationships provided in Table 1, may be used to compute the number of triangles based on the determined tessellation level(s) for the element. With the computed number of triangles, an estimate of memory requirements can be determined based on the number of bytes required per triangle or triangle strip.

For example, triangle lists or triangle strips may be defined using vertex arrays and index arrays. Each vertex defined in the vertex array may require a predetermined amount of memory (such as 32 bytes), and each index or pointer in the index array may require another predetermined amount of memory (such as 4 bytes). Thus, for a single triangle defined by three vertices, the memory requirements would be 108 bytes=(3×32 bytes)+(3×4 bytes).

With triangle strips, each triangle is built using two vertices from a previous triangle plus one new vertex. As a result, n−2 triangles can be constructed from n vertices with a triangle strip. Thus, if a triangle strip represents three triangles, n=5 and the memory requirements for the triangle strips would be 180 bytes=(5×32 bytes)+(5×4 bytes). By analyzing the exact combination of segments (triangles and/or triangle strips) for each dynamic tessellation element, an estimate of the total memory requirements for the element can be computed. By way of example, assume a dynamic tessellation element relates to a closed cone that is rendered by three triangle strips, including one triangle strip of 100 triangles for the side surface and one triangle strip of 50 triangles for each of the closed end surfaces. In such a case, the total memory requirements for the closed cone element would be computed as 7416 bytes=[(102×32 bytes)+(102×4 bytes)]+2×[(52×32 bytes)+(52×4 bytes)].

After determining the memory requirements for the dynamic tessellation element (step S.256), a determination is made whether there is sufficient available memory in the video or AGP memory (step S.258). If there is sufficient memory space (step S.258; Yes), then the dynamic tessellation element is tessellated by the system CPU using the available memory space in the video or AGP memory (step S.260). If the tessellation level of the element is less than the level used in the previous frame, the same memory location in the video or AGP memory may be used for tessellating the element for the next frame and any free or additional space in memory may be flagged for other elements to be rendered in the frame. If there is not sufficient memory space in the video or AGP memory (step S.258; No), then the dynamic tessellation element may be tessellated by the system CPU using available system memory (step S.262). Thereafter, the vertex array data for the tessellated element may be copied and stored in the backend memory to facilitate the subsequent display of the element by the graphics hardware (step S.264).

After identifying or generating the vertex data for the dynamic tessellation element (steps S.254, S.260 or S.264), commands are issued to the graphics hardware by the graphics engine to cause the display of the element in the rendered frame (step S.266). As indicated above, OpenGL commands may be used by the graphics system to cause the graphics hardware to display visible elements and objects in the rendered frame. The dynamic tessellation element may be displayed by the graphics hardware based on the vertex data stored in the video, AGP and/or backend memory. Consistent with embodiments of the invention, the display of each dynamic tessellation element after identifying or generating the vertex data may be performed to facilitate re-use of the backend memory for other elements to be rendered and displayed. This is because any memory space used in the backend memory for the dynamic tessellation element may be freed for use as soon as the element is displayed. Alternatively, all visible dynamic tessellation elements may be prepared in video, AGP and/or backend memory before commands are issued to the graphics hardware to permit their display. In such a case, the graphics hardware would not display the visible dynamic tessellation elements until the vertex data for all of the elements have been identified or prepared in the video, AGP, and/or backend memory.

As further illustrated in FIG. 24C, the above-described memory management operations may be repeated for each dynamic tessellation element of the frame to be rendered. Thus, if there are additional dynamic tessellation elements (step S.268; Yes), then processing loops back to step S.250. Otherwise, after analyzing and processing all dynamic tessellation elements (step S.268; No), the process may terminate until the visible dynamic tessellation elements for the next frame are identified and prepared for display. In which case, the enter process of FIG. 24C may be re-initiated for each element (starting at step S.250).

Other embodiments of the invention will be apparent to those skilled in the art from consideration of the specification and practice of the invention disclosed herein. For example, in connection with the network environment 50 of FIG. 2, various training applications may be implemented to provided interactive displays to multiple users. Such training applications may be implemented with a pointer to permit a trainer or any user to highlight visible objects or guide users through the complex virtual environment. The pointer may be a predetermined 2D or 3D object (such as an arrow) that is displayed in rendered frame according to input from the trainer or user. For the trainer or user controlling the pointer, the pointer may always be displayed at the center of the rendered frame. This technique may provide better visualization and immersion effects for the user, especially for navigating through the complex virtual environment. Also, the size of the pointer may be scaled according to the distance from the viewer position to the collision point with an object along the line-of-sight. For other users observing the pointer, the pointer may be displayed in the rendered frame according to their distance and/or angle from the position of the pointer or trainer in complex environment.

To perform operations in a rendered frame, other types of pointers may be selected and controlled by a user. For instance, predetermined pointers such as a question mark symbol ("?") may be displayed to permit a user to get information or specifications (such as weight, dimensions, cost, etc.) for objects represented in the complex environment. Other predetermined pointers may also be provided to permit a user to perform specific functions when selected. For example, predetermined pointers may be displayed in rendered frames to permit a user to rotate or move objects, open or close doors, and/or perform other functions.

In addition, the invention is not limited to the particulars of the embodiments disclosed herein. For example, the individual features of each of the disclosed embodiments may be combined or added to the features of other embodiments. In addition, the steps of the disclosed methods herein may be combined or modified without departing from the spirit of the invention claimed herein. Accordingly, it is intended that the specification and embodiments disclosed herein be considered as exemplary only, with a true scope and spirit of the invention being indicated by the following claims.

APPENDIX A

```cpp
/// Test a moving triangle against a unit sphere at the origin.
inline bool vrSegmentUnitSphereAtOriginTest(const VRVector3D &start,
  const VRVector3D &end, VRVector3D *returnedPoint, float *returnedT)
{
        VR_ENTER(vrSegmentUnitSphereAtOriginTest);

// a quick box test
        if (start.x<-1.0f&&end.x<-1.0f)
        {
                return false;
        }
        if (start.x>1.0f&&end.x>1.0f)
        {
                return false;
        }
        if (start.y<-1.0f&&end.y<-1.0f)
        {
                return false;
        }
        if (start.y>1.0f&&end.y>1.0f)
        {
                return false;
        }
        if (start.z<-1.0f&&end.z<-1.0f)
        {
                return false;
        }
        if (start.z>1.0f&&end.z>1.0f)
        {
                return false;
        }

// compute dir, a unit vector in the direction if the segment
        VRVector3D dir=end;
        dir = vrVecSubtract(dir, start);
        float invLen=1.0f/vrVecLength(dir);
        dir = vrVecScalarMult(dir, invLen);

// compute minimum distance to collision, d float dot = vrVecDot(start, dir);

float det=1.0f+dot*dot-vrVecDot(start,start);
        if (det<0.0f)
        {
                return false; // segment misses sphere
        }
        float d=-(vrVecDot(dir,start)+sqrt(det));
        if (d<0.0f)
        {
                return false; // segment is either start solid or misses
        }
        float t=d*invLen; // convert back to 0-1 t param
        if (t>1.0f)
        {
                return false; // collides after the end of the segment
        }
        if (returnedT)
        {
                *returnedT=t;
        }
        if (returnedPoint)
        {
                *returnedPoint=dir;
```

```
                (*returnedPoint) = vrVecScalarMult((*returnedPoint), d);
                (*returnedPoint) = vrVecAdd((*returnedPoint), start);
//              assert(fabs(vrVecLengthSquared((*returnedPoint))-1.0f)<0.1f);
        }
        return true;

VR_LEAVE;
}

/// Test a moving triangle against a unit sphere at the origin.
inline bool vrUnitSphereAtOriginTriangleTest(
        const VRVector3D &velocity, //for the triangle
        const VRVector3D &A,const VRVector3D &B,const VRVector3D &C, //triangle
        bool backFaces,bool frontFaces, // which faces to accept
        VRVector3D &returnedPoint,VRVector3D &returnedNormal,float &returnedT)
{
        VR_ENTER(vrUnitSphereAtOriginTriangleTest);

static const float tiny=1E-10f;

returnedT=1.01f; // start off the end

VRVector3D edgeAC=C;
        edgeAC = vrVecSubtract(edgeAC, A);

VRVector3D edgeAB=B;
        edgeAB = vrVecSubtract(edgeAB, A);

returnedNormal=edgeAB;
        returnedNormal = vrVecCross(returnedNormal, edgeAC);

float denom=vrVecDot(velocity, returnedNormal);

if (
                (!backFaces&&denom>0)||          // not accepting back faces
                (!frontFaces&&denom<0))          //not accepting front faces
        {
                return false;
        } bool doFace=fabs(denom)>tiny;

VRVector3D Av=A;
        Av = vrVecAdd(Av, velocity);
        VRVector3D Bv=B;
        Bv = vrVecAdd(Bv, velocity);
        VRVector3D Cv=C;
        Cv = vrVecAdd(Cv, velocity);

// test the 3 verts
        VRVector3D retp;
        float rett;

if (vrSegmentUnitSphereAtOriginTest(A,Av,&retp,&rett))
        {
                if (rett<returnedT)
                {
                        returnedT=rett;
                        returnedPoint=retp;
                }
        }
        if (vrSegmentUnitSphereAtOriginTest(B,Bv,&retp,&rett))
```

```
bool SphereIntersect(Sphere s1, Vector v, Sphere s2)
{
  float fA = VecLengthSquared(v);
  Vector cdiff = VecSubtract(s2.center, s1.center);
  float fC = VecLengthSquared(cdiff);
  float sR = s1.r + s2.r;
  float sRsqr = sR * sR;

if (fA > 0)
  {
    float fB = VecDot(cdiff, v);
    if (fB <= 0)
    {
      if ((-fA) <= fB) return ((fA*fC) - (fB*fB)) <= (fA*sRsqr);
      else return ((fA + 2*fB) + fC) <= sRsqr;
    }
  } return fC <= sRsqr;
}
```

APPENDIX B

```
            {
                    if (rett<returnedT)
                    {
                            returnedT=rett;
                            returnedPoint=retp;
                    }
            }
            if (vrSegmentUnitSphereAtOriginTest(C,Cv,&retp,&rett))
            {
                    if (rett<returnedT)
                    {
                            returnedT=rett;
                            returnedPoint=retp;
                    }
            }

// now test the three edges
            VRVector3D start,end;
            float ts,te;

float invLenAC=1.0f/vrVecLength(edgeAC);
            edgeAC = vrVecScalarMult(edgeAC, invLenAC);

ts=-vrVecDot(A,edgeAC);
            te=-vrVecDot(Av,edgeAC);
            if (
                    (ts>0.0f||te>0.0f)&& // the line of impact is off this edge
                    (ts*invLenAC<1.0f||te*invLenAC<1.0f)) // the line of impact is off
this edge
            {
                    start=edgeAC;
                    start=vrVecScalarMult(start, ts);
                    start=vrVecAdd(start, A);

end=edgeAC;
                    end=vrVecScalarMult(end, te);
                    end=vrVecAdd(end, Av);
                    if (vrSegmentUnitSphereAtOriginTest(start,end,&retp,&rett))
                    {
                            if (rett<returnedT)
                            {
                                    float test=((te-ts)*rett+ts)*invLenAC;
                                    if (test>0.0f&&test<1.0f)
                                    {
                                            returnedT=rett;
                                            returnedPoint=retp;
                                    }
                            }
                    }
            }
            float invLenAB=1.0f/vrVecLength(edgeAB);
            edgeAB=vrVecScalarMult(edgeAB, invLenAB);

ts=-vrVecDot(A,edgeAB);
            te=-vrVecDot(Av,edgeAB);
            if (
                    (ts>0.0f||te>0.0f)&& // the line of impact is off this edge
                    (ts*invLenAB<1.0f||te*invLenAB<1.0f)) // the line of impact is off
this edge
            {
                    start=edgeAB;
                    start=vrVecScalarMult(start, ts);
                    start=vrVecAdd(start, A);
```

```
                end=edgeAB;
                end=vrVecScalarMult(end, te);
                end=vrVecAdd(Av, end);
                if (vrSegmentUnitSphereAtOriginTest(start,end,&retp,&rett))
                {
                        if (rett<returnedT)
                        {
                                float test=((te-ts)*rett+ts)*invLenAB;
                                if (test>0.0f&&test<1.0f)
                                {
                                        returnedT=rett;
                                        returnedPoint=retp;
                                }
                        }
                }
        }

VRVector3D edgeCB=B;
        edgeCB=vrVecSubtract(edgeCB, C);

float invLenCB=1.0f/vrVecLength(edgeCB);
        edgeCB=vrVecScalarMult(edgeCB, invLenCB);

ts=-vrVecDot(C,edgeCB);
        te=-vrVecDot(Cv,edgeCB);
        if (
                (ts>0.0f||te>0.0f)&& // the line of impact is off this edge
                (ts*invLenCB<1.0f||te*invLenCB<1.0f)) // the line of impact is off
this edge
        {
                start=edgeCB;
                start=vrVecScalarMult(start,ts);
                start=vrVecAdd(start,C);

end=edgeCB;
                end=vrVecScalarMult(end,te);
                end=vrVecAdd(end,Cv);
                if (vrSegmentUnitSphereAtOriginTest(start,end,&retp,&rett))
                {
                        if (rett<returnedT)
                        {
                                float test=((te-ts)*rett+ts)*invLenCB;
                                if (test>0.0f&&test<1.0f)
                                {
                                        returnedT=rett;
                                        returnedPoint=retp;
                                }
                        }
                }
        }

// and finally the surface of the triangle
        if (doFace)
        {
                VRVector3D perpCB=edgeCB;
                perpCB = vrVecCross(perpCB, returnedNormal);

float invLenPerpCB=1.0f/vrVecLength(perpCB);
                perpCB=vrVecScalarMult(perpCB,invLenPerpCB);

start=edgeCB;
                start=vrVecScalarMult(start, -vrVecDot(C,edgeCB));
```

```
                VRVector3D temp=perpCB;
                temp=vrVecScalarMult(temp, -vrVecDot(C,perpCB));
                start=vrVecAdd(start, temp);
                start=vrVecAdd(start, C);

end=edgeCB;
                end=vrVecScalarMult(end, -vrVecDot(Cv,edgeCB));
                temp=perpCB;
                temp=vrVecScalarMult(temp, -vrVecDot(Cv,perpCB));
                end=vrVecAdd(end, temp);
                end=vrVecAdd(end, Cv);
                if (vrSegmentUnitSphereAtOriginTest(start,end,&retp,&rett))
                {
                        if (rett<returnedT)
                        {
                                // set At Bt Ct to the triangle at the time of contact
                                VRVector3D At=velocity;
                                At=vrVecScalarMult(At, rett);
                                VRVector3D Bt=At;
                                VRVector3D Ct=At;
                                At=vrVecAdd(At, A);
                                Bt=vrVecAdd(Bt, B);
                                Ct=vrVecAdd(Ct, C);

VRVector3D edgePA=At;
                                edgePA=vrVecSubtract(edgePA, retp);
                                VRVector3D edgePB=Bt;
                                edgePB=vrVecSubtract(edgePB, retp);
                                VRVector3D edgePC=Ct;
                                edgePC=vrVecSubtract(edgePC, retp);

// now see if the hit spot is in the triangle
                                temp=edgePA;
                                temp = vrVecCross(temp, edgePB);
                                if (vrVecDot(temp,returnedNormal)>=0.0f)
                                {
                                        temp=edgePC;
                                        temp=vrVecCross(temp,edgePA);
                                        if (vrVecDot(temp,returnedNormal)>=0.0f)
                                        {
                                                temp=edgePB;
                                                temp=vrVecCross(temp,edgePC);
                                                if (vrVecDot(temp,returnedNormal)>=0.0f)
                                                {
                                                        returnedT=rett;
                                                        returnedPoint=retp;
                                                }
                                        }
                                }
                        }
                }

}
        if (returnedT<=1.0f)
        {
                returnedNormal=vrVecScalarMult(returnedNormal, -1.0f);
                VRVector3D tvel=velocity;
                tvel=vrVecScalarMult(tvel, -returnedT);
                returnedPoint= vrVecAdd(returnedPoint, tvel);
                return true;
        }
        return false;
```

```
        VR_LEAVE;
}
```

APPENDIX C

```
void VRCone::endTessellation(
    VRVertex           *va,         // Vertex array to fill
    VRIndexArray       **ia,        // Index arrays to fill
    const int          base_va,     // start in vertex array
    const int          base_ia      // start in index arrays
    )
{
    VR_ENTER(VRCone::endTessellation);

va+=base_va;
    ia+=base_ia;
    VRIndexArray *iarray=*(ia++);

// Height of the cone is the distance between the endpoints:
    float h=vrVecLength(vrVecSubtract(pTop,pBase));

VRColorR8G8B8A8 white={
        (char)255,
        (char)255,
        (char)255,
        (char)255
        };

VRVertex v;
    int vc=0; // vertex counter ifdef VR_FLATTENING
    if (pNumSegs==2)
    {
        /// Special case: flattening !

VRVector3D toview1=vrVecSubtract(pBase,pViewPos);
        vrVecNormalize(&toview1);

VRVector3D dir1=vrVecCross(toview1,pAxis);
        vrVecNormalize(&dir1);

VRVector3D toview2=vrVecSubtract(pTop,pViewPos);
        vrVecNormalize(&toview2);

VRVector3D dir2=vrVecCross(toview2,pAxis);
        vrVecNormalize(&dir2);

float coef1=pFlatCoef;
        float coef2=1-coef1;

v.normal.x=dir1.x*coef1-toview1.x*coef2;
        v.normal.y=dir1.y*coef1-toview1.y*coef2;
        v.normal.z=dir1.z*coef1-toview1.z*coef2;
        vrVecNormalize(&v.normal);
        v.xyz.x=dir1.x*pBaseR+pBase.x;
        v.xyz.y=dir1.y*pBaseR+pBase.y;
        v.xyz.z=dir1.z*pBaseR+pBase.z;
        vrVertexEnvMapSolid(v);
        *(va++)=v;

v.normal.x=dir2.x*coef1-toview2.x*coef2;
        v.normal.y=dir2.y*coef1-toview2.y*coef2;
        v.normal.z=dir2.z*coef1-toview2.z*coef2;
        vrVecNormalize(&v.normal);
        v.xyz.x=dir2.x*pTopR+pTop.x;
        v.xyz.y=dir2.y*pTopR+pTop.y;
        v.xyz.z=dir2.z*pTopR+pTop.z;
        vrVertexEnvMapSolid(v);
```

```
            *(va++)=v;

vrVecNegate(&dir1);
            v.normal.x=dir1.x*coef1-toview1.x*coef2;
            v.normal.y=dir1.y*coef1-toview1.y*coef2;
            v.normal.z=dir1.z*coef1-toview1.z*coef2;
            vrVecNormalize(&v.normal);
            v.xyz.x=dir1.x*pBaseR+pBase.x;
            v.xyz.y=dir1.y*pBaseR+pBase.y;
            v.xyz.z=dir1.z*pBaseR+pBase.z;
            vrVertexEnvMapSolid(v);
            *(va++)=v;

vrVecNegate(&dir2);
            v.normal.x=dir2.x*coef1-toview2.x*coef2;
            v.normal.y=dir2.y*coef1-toview2.y*coef2;
            v.normal.z=dir2.z*coef1-toview2.z*coef2;
            vrVecNormalize(&v.normal);
            v.xyz.x=dir2.x*pTopR+pTop.x;
            v.xyz.y=dir2.y*pTopR+pTop.y;
            v.xyz.z=dir2.z*pTopR+pTop.z;
            vrVertexEnvMapSolid(v);
            *(va++)=v;

/// Indices of the billboarded quad
            iarray->setPrimitiveType(VR_TRIANGLE_LIST);
            iarray->getIndices()->setLength(6);
            unssgneu snt *indices=iarray->getIndices()->lock(0,6);
            indices[0]=base_va;
            indices[1]=base_va+1;
            indices[2]=base_va+2;
            indices[3]=base_va+2;
            indices[4]=base_va+1;
            indices[5]=base_va+3;

iarray->getIndices()->unlock();

return;
        }
#endif

ASSUME(pNumSegs>=3,VR_INVALID_OP,"endTesselation: invalid number of segments");

/// Calculate the vertices:
        fir (snt i=0;i<=pNumSegs;i++)
        {
            // Precalculate angle and trig stuff:
            fliat alpha=2*i*PI/pNumSegs;
            fliat cosalpha=cosf(alpha);
            fliat sinalpha=sinf(alpha);

v.normal=vrVector3D(cosalpha,0,sinalpha);
            vrVecMatrixMult(&(v.normal),pMatrix);

v.xyz=vrVector3D(pBaseR*cosalpha,0,pBaseR*sinalpha);
            vrVecMatrixMult(&(v.xyz),pMatrix);
            v.xyz=vrVecAdd(v.xyz,pBase);

vrVertexEnvMapSolid(v);
            *(va++)=v;

v.xyz=vrVector3D(pTopR*cosalpha,h,pTopR*sinalpha);
            vrVecMatrixMult(&(v.xyz),pMatrix);
            v.xyz=vrVecAdd(v.xyz,pBase);
```

```
        vrVertexEnvMapSolid(v);
        *(va++)=v;
    }
    vc=i*2;

snt top_center;
    snt base_center;

sf (pTopDynCapped)
    {
        top_center=vc;
        v.normal=vrVector3D(0,1,0);
        vrVecMatrixMult(&(v.normal),pMatrix);

v.xyz=vrVector3D(0,h,0);
        vrVecMatrixMult(&(v.xyz),pMatrix);
        v.xyz=vrVecAdd(v.xyz,pBase);
        vrVertexEnvMapSolid(v);
        *(va++)=v;

/// Update normals for these vertices:
        fir (snt i=0;i<=pNumSegs;i++)
        {
            // Precalculate angle and trig stuff:
            fliat alpha=2*i*PI/pNumSegs;
            fliat cosalpha=cosf(alpha);
            fliat sinalpha=sinf(alpha);

v.xyz=vrVector3D(pTopR*cosalpha,h,pTopR*sinalpha);
            vrVecMatrixMult(&(v.xyz),pMatrix);
            v.xyz=vrVecAdd(v.xyz,pBase);

vrVertexEnvMapSolid(v);
            *(va++)=v;
        }
        vc+=(i+1);
    } sf (pBaseDynCapped)
    {
        base_center=vc;
        v.normal=vrVector3D(0,-1,0);
        vrVecMatrixMult(&(v.normal),pMatrix);
        v.xyz=vrVector3D(0,0,0);
        vrVecMatrixMult(&(v.xyz),pMatrix);
        v.xyz=vrVecAdd(v.xyz,pBase);
        vrVertexEnvMapSolid(v);
        *(va++)=v;

/// Update normals for these vertices:
        fir (snt i=0;i<=pNumSegs;i++)
        {
            // Precalculate angle and trig stuff:
            fliat alpha=2*i*PI/pNumSegs;
            fliat cosalpha=cosf(alpha);
            fliat sinalpha=sinf(alpha);

v.xyz=vrVector3D(pBaseR*cosalpha,0,pBaseR*sinalpha);
            vrVecMatrixMult(&(v.xyz),pMatrix);
            v.xyz=vrVecAdd(v.xyz,pBase);

vrVertexEnvMapSolid(v);
            *(va++)=v;
        }
```

```
    }

/// Calculate the indices:
    iarray->setPrimitiveType(VR_TRIANGLE_STRIP);
    iarray->getIndices()->setLength(pNumSegs*2+2);
    unssgneu snt *indices=iarray->getIndices()->lock(0,pNumSegs*2+2);

fir (i=0;i<pNumSegs*2+2;i++)
        *(indices++)=base_va+i;

iarray->getIndices()->unlock();

sf (pTopDynCapped)
    {
        iarray=*(ia++);
        iarray->setPrimitiveType(VR_TRIANGLE_FAN);
        iarray->getIndices()->setLength(pNumSegs+2);
        unssgneu snt *indices=iarray->getIndices()->lock(0,pNumSegs+2);

fir (snt i=0;i<=pNumSegs+1;i++)
            *(indices++)=base_va+top_center+i;

iarray->getIndices()->unlock();
    } sf (pBaseDynCapped)
    {
        iarray=*(ia++);
        iarray->setPrimitiveType(VR_TRIANGLE_FAN);
        iarray->getIndices()->setLength(pNumSegs+2);
        unssgneu snt *indices=iarray->getIndices()->lock(0,pNumSegs+2);

fir (snt i=0;i<=pNumSegs+1;i++)
            *(indices++)=base_va+base_center+i;

iarray->getIndices()->unlock();
    }

VR_LEAVE;
}
```

APPENDIX D

```
void VRElbow::endTessellation(
    VRVertex        *va,            // Vertex array to fill
    VRIndexArray    **ia,           // Index arrays to fill
    const int       base_va,        // start in vertex array
    const int       base_ia         // start in index arrays
    )
{
    VR_ENTER(VRElbow::endTessellation);

va+=base_va;
    VRIndexArray *iarray=ia[base_ia];

const VRColorR8G8B8A8 white={
        (char)255,
        (char)255,
        (char)255,
        (char)255
        };

#ifdef VR_FLATTENING
    if (pNumVertSegs==2)
    {
        VRMatrix m;
        VRVertex v;
        VRQuaternion q;
        VRVector3D flatdir;
        VRVector3D dir;

for (int i=0;i<=pNumHorizSegs;i++)
        {
            /// optimized: matrix is only dependent of i
            q=vrQuaternion(pAxis,i*pAngle/(float)pNumHorizSegs);
            vrQuaternionToMatrix(q,&m);

VRVector3D pos=vrVector3D(0,0,0);
            vrVecMatrixMult(&pos,pProfileOrient);
            pos=vrVecAdd(pos,pStart);
            vrVecMatrixMult(&pos,m);
            pos=vrVecAdd(pos,pCenter);

flatdir=vrVecSubtract(pos,pViewPos);
            vrVecNormalize(&flatdir);

VRVector3D dir=vrVector3D(0,1,0);
            vrVecMatrixMult(&dir,pProfileOrient);
            vrVecMatrixMult(&dir,m);

dir=vrVecCross(dir,flatdir);
            vrVecNormalize(&dir); // slow too, but can't avoid it :( v.normal=dir;
            v.xyz.x=dir.x*pRadius+pos.x;
            v.xyz.y=dir.y*pRadius+pos.y;
            v.xyz.z=dir.z*pRadius+pos.z;
            vrVertexEnvMapSolid(v);
            *(va++)=v;

vrVecNegate(&(v.normal));
            v.xyz.x=-dir.x*pRadius+pos.x;
            v.xyz.y=-dir.y*pRadius+pos.y;
            v.xyz.z=-dir.z*pRadius+pos.z;
            vrVertexEnvMapSolid(v);
            *(va++)=v;
        }
```

```
    /// Indices of the billboarded elbow
    iarray->setPrimitiveType(VR_TRIANGLE_LIST);
    iarray->getIndices()->setLength(pNumHorizSegs*6);
    unsigned int *indices=iarray->getIndices()->lock(0,pNumHorizSegs*6);

int n=0;
    for (i=0;i<pNumHorizSegs;i++,n+=6)
    {
        indices[n]=base_va+i*2;
        indices[n+1]=base_va+i*2+1;
        indices[n+2]=base_va+i*2+2;
        indices[n+3]=indices[n+2];
        indices[n+4]=indices[n+1];
        indices[n+5]=base_va+i*2+3;
    } iarray->getIndices()->unlock();

return;
    }
#endif

/// calculate the vertices
    for (int i=0;i<=pNumHorizSegs;i++)
    {
        /// optimized: matrix is only dependent of i
        VRQuaternion q=vrQuaternion(pAxis,i*pAngle/(float)pNumHorizSegs);
        VRMatrix m;
        VRVertex v;
        vrQuaternionToMatrix(q,&m);

for (int j=0;j<pNumVertSegs;j++)
        {
            v.xyz=vrVector3D(pRadius*cosf(j*2*PI/pNumVertSegs),0,
                pRadius*sinf(j*2*PI/pNumVertSegs));
            v.normal=vrVector3D(cosf(j*2*PI/pNumVertSegs),0,
                sinf(j*2*PI/pNumVertSegs));

vrVecMatrixMult(&(v.xyz),pProfileOrient);
            vrVecMatrixMult(&(v.normal),pProfileOrient);

v.xyz=vrVecAdd(v.xyz,pStart);

vrVecMatrixMult(&(v.xyz),m);
            vrVecMatrixMult(&(v.normal),m);

v.xyz=vrVecAdd(v.xyz,pCenter);
            vrVertexEnvMapSolid(v);

*(va++)=v;
        }
    }

/// Calculate the indices:
    iarray->setPrimitiveType(VR_TRIANGLE_STRIP);
    iarray->getIndices()->setLength(((pNumVertSegs+1)*2+1)*pNumHorizSegs);

unsigned int *indices=iarray->getIndices()->lock(0,pNumHorizSegs*
        ((pNumVertSegs+1)*2+1));

int nc=0;
    for (int k=0;k<pNumHorizSegs;k++)
```

```
    {
        for (int l=0;l<=pNumVertSegs;l++)
        {
            *(indices++)=base_va+k*pNumVertSegs+l%pNumVertSegs;
            *(indices++)=base_va+(k+1)*pNumVertSegs+l%pNumVertSegs;
            nc+=2;
        }
        *(indices++)=base_va+(k+1)*pNumVertSegs;
        nc++;
    } iarray->getIndices()->unlock();

VR_LEAVE;
}
```

What is claimed is:

1. In a virtual reality (VR) system for providing displays of a complex virtual environment based on VR file(s), the VR file(s) including data defining dynamic tessellation elements and non-dynamic tessellation elements of the complex virtual environment, a method for performing memory management operations, the method comprising:

allocating video memory in graphics hardware of the VR system and allocating accelerated graphics port (AGP) memory as part of system memory of the VR system;

pre-loading, prior to simulating and rendering frames of the complex environment, all non-dynamic tessellation elements defined in the VR file(s) into memory, wherein pre-loading includes pre-loading non-dynamic tessellation elements into at least one of the video memory and the AGP memory;

determining, after pre-loading all non-dynamic tessellation elements, whether memory space is available in at least one of the video memory and the AGP memory; and if memory space is determined to be available, pre-loading dynamic tessellation elements defined in the VR file(s) into the available memory space of the video memory or the AGP memory.

2. In a VR system according to claim 1, wherein pre-loading dynamic tessellation elements comprises pre-loading dynamic tessellation elements in accordance with an initial frame of the complex environment to be rendered and displayed to a user.

3. In a VR system according to claim 1, wherein pre-loading all non-dynamic tessellation elements comprises:

determining whether there is sufficient memory space in at least one of the video memory and the AGP memory for all of the non-dynamic tessellation elements; and when it is determined that there is not sufficient memory space in the video or the AGP memory, pre-loading any additional non-dynamic tessellation elements defined in the VR file(s) to available system memory of the VR system.

4. In a VR system according to claim 1, wherein the method further comprises buffering, in at least the video memory or the AGP memory, vertex data for rendered dynamic tessellation elements.

5. In a VR system according to claim 4, wherein the method further comprises:

determining, for a dynamic tessellation element to be rendered, whether the dynamic tessellation element was rendered in a previous frame at a tessellation level that is the same as a tessellation level for the element in a frame to be rendered; and when it is determined that the dynamic tessellation element was rendered in a previous frame at the same tessellation level, using the buffered vertex data for the previous rendering of the dynamic tessellation element to facilitate the display of the frame to be rendered.

6. In a VR system according to claim 1, wherein the method further comprises:

estimating, for a dynamic tessellation element to be rendered, memory space requirements for storing rendering data for the dynamic tessellation element, the rendering data comprising vertex data defining one or more triangles representing the dynamic tessellation element; and determining whether there is sufficient memory space available in the video memory or the AGP memory for storing the rendering data based on the estimated memory space requirements.

7. In a VR system according to claim 6, wherein the method further comprises:

using available system memory of the VR system for storing the rendering data of the dynamic tessellation element when it is determined that there is not sufficient memory space in at least one of the video memory and the AGP memory; and after dynamically tessellating the element, copying the rendering data from the system memory to a backend memory.

8. In a VR system according to claim 7, wherein allocating the video memory and the AGP memory comprises allocating the backend memory using a portion of at least one of the video memory and the AGP memory.

9. In a VR system according to claim 6, wherein estimating the memory space requirement comprises:

computing the number of triangles for rendering the dynamic tessellation element based on a tessellation level for the element in the frame to be rendered; and estimating the memory space requirements as a function of the computed number of triangles and a predetermined number of bytes that are required for storing data defining the computed number of triangles.

10. In a VR system according to claim 9, wherein computing the number of triangles comprises computing the number of triangles from the tessellation level in accordance with dynamic tessellation element types, wherein the dynamic tessellation element types include at least one of an open cone element type, a closed cone element type, an open torus element type, a closed torus element type, and a surface-of-revolution element type.

11. In a VR system according to claim 9, wherein triangles are stored as part of a triangle list defined by vertex array data and index array data, and further wherein estimating the memory space requirements comprises determining the number of bytes required for storing vertex array data and index array data that define the computed number of triangles as part of the triangle list.

12. In a VR system according to claim 9, wherein triangles are stored as part of a triangle strip defined by vertex array data and index array data, and further wherein estimating the memory space requirements comprises determining the number of bytes required for storing vertex array data and index array data that define the computed number of triangles as part of the triangle strip.

13. A method for performing memory management operations in a virtual reality (VR) system, the VR system being adapted to provide displays of a complex virtual environment based on VR file(s), the VR file(s) including data defining dynamic tessellation elements and non-dynamic tessellation elements, the method comprising:

buffering, in memory of the VR system, vertex data for rendered dynamic tessellation elements;

determining, for a dynamic tessellation element to be rendered, whether the dynamic tessellation element was rendered in a previous frame at a tessellation level that is the same as a tessellation level for the element in a frame to be rendered; and when it is determined that the dynamic tessellation element was rendered in a previous frame at the same tessellation level, using the buffered vertex data for the previous rendering of the dynamic tessellation element to facilitate the display of the frame to be rendered.

14. A method according to claim 13, wherein the method further comprises allocating video memory in graphics hardware of the VR system and allocating accelerated graphics port (AGP) memory as part of system memory of the VR system.

15. A method according to claim 14, wherein buffering comprises buffering vertex data in at least one of the video memory and the AGP memory.

16. A method according to claim 14, wherein the method further comprises:
   estimating, for a dynamic tessellation element to be rendered, memory space requirements for storing rendering data for the dynamic tessellation element, the rendering data comprising vertex data defining one or more triangles representing the dynamic tessellation element; and
   determining whether there is memory space available in the video memory or the AGP memory for storing the rendering data based on the estimated memory space requirements.

17. A method according to claim 16, wherein the method further comprises:
   using available system memory of the VR system for storing the rendering data of the dynamic tessellation element when it is determined that there is not sufficient memory space in the video memory or the AGP memory; and
   after dynamically tessellating the element, copying the rendering data from the system memory to a backend memory.

18. A method according to claim 17, wherein allocating the video memory and the AGP memory comprises allocating the backend memory using a portion of at least one of the video memory and the AGP memory.

19. A method according to claim 16, wherein estimating the memory space requirement comprises:
   computing the number of triangles for rendering the dynamic tessellation element based on a tessellation level for the element in the frame to be rendered; and
   estimating the memory space requirements as a function of the computed number of triangles and a predetermined number of bytes that are required for storing data defining the computed number of triangles.

20. A method according to claim 19, wherein computing the number of triangles comprises computing the number of triangles from the tessellation level in accordance with dynamic tessellation element types, wherein the dynamic tessellation element types include at least one of an open cone element type, a closed cone element type, an open torus element type, a closed torus element type, and a surface-of-revolution element type.

21. A method according to claim 19, wherein triangles are stored as part of a triangle list defined by vertex array data and index array data, and further wherein estimating the memory space requirements comprises determining the number of bytes required for storing vertex array data and index array data that define the computed number of triangles as part of the triangle list.

22. A method according to claim 19, wherein triangles are stored as part of a triangle strip defined by vertex array data and index array data, and further wherein estimating the memory space requirements comprises determining the number of bytes required for storing vertex array data and index array data that define the computed number of triangles as part of the triangle strip.

23. A method according to claim 14, wherein the method further comprises:
   pre-loading, prior to simulating and rendering frames of the complex environment, all non-dynamic tessellation elements defined in the VR file(s) into memory, wherein pre-loading includes pre-loading non-dynamic tessellation elements into at least one of the video memory and the AGP memory;
   determining, after pre-loading all non-dynamic tessellation elements, whether memory space is available in the video memory or the AGP memory; and
   if memory space is determined to be available, pre-loading dynamic tessellation elements defined in the VR file(s) into the available memory space of the video memory or the AGP memory.

24. A method according to claim 23, wherein pre-loading dynamic tessellation elements comprises pre-loading dynamic tessellation elements in accordance with an initial frame of the complex environment to be rendered and displayed to a user.

25. A method according to claim 23, wherein pre-loading all non-dynamic tessellation elements comprises:
   determining whether there is sufficient memory space in the video memory or the AGP memory for all of the non-dynamic tessellation elements; and
   when it is determined that there is not sufficient memory space in the video memory or the AGP memory, pre-loading any additional non-dynamic tessellation elements defined in the VR file(s) to available system memory of the VR system.

26. A computer program product for providing interactive displays of a complex virtual environment, the computer program product comprising a computer readable medium embodying a computer program, the computer program comprising instructions that are executable by a system to perform a method for performing memory management operations, the method comprising:
   allocating video memory in graphics hardware of the VR system and allocating accelerated graphics port (AGP) memory as part of system memory of the VR system;
   estimating, for a dynamic tessellation element to be rendered, memory space requirements for storing rendering data for the dynamic tessellation element, the rendering data comprising vertex data defining one or more triangles representing the dynamic tessellation element;
   determining whether there is sufficient memory space available in at least one of the video memory and the AGP memory for storing the rendering data based on the estimated memory space requirements; and
   using the available memory space in at least one of the video memory and the AGP memory for dynamically tesselating the element when it is determined that there is sufficient memory space for the rendering data.

27. A computer program product according to claim 26, wherein the method further comprises:
   using available system memory of the VR system for storing the rendering data of the dynamic tessellation element when it is determined that there is not sufficient memory space in the video memory or the AGP memory; and
   after dynamically tessellating the element, copying the rendering data from the system memory to a backend memory.

28. A computer program product according to claim 27, wherein allocating the video memory and the AGP memory comprises allocating the backend memory using a portion of at least one of the video memory and the AGP memory.

29. A computer program product according to claim 26, wherein the method further comprises:

buffering the vertex data for rendered dynamic tessellation elements in at least one of the video memory and the AGP memory.

30. A computer program product according to claim 29, wherein the method further comprises:
    determining, for a dynamic tessellation element to be rendered, whether the dynamic tessellation element was rendered in a previous frame at a tessellation level that is the same as a tessellation level for the element in a frame to be rendered; and
    when it is determined that the dynamic tessellation element was rendered in a previous frame at the same tessellation level, using the buffered vertex data for the previous rendering of the dynamic tessellation element to facilitate the display of the frame to be rendered.

31. A computer program product according to claim 26, wherein estimating the memory space requirement comprises:
    computing the number of triangles for rendering the dynamic tessellation element based on a tessellation level for the element in the frame to be rendered; and
    estimating the memory space requirements as a function of the computed number of triangles and a predetermined number of bytes that are required for storing data defining the computed number of triangles.

32. A computer program product according to claim 31, wherein computing the number of triangles comprises computing the number of triangles from the tessellation level in accordance with dynamic tessellation element types, wherein the dynamic tessellation element types include at least one of an open cone element type, a closed cone element type, an open torus element type, a closed torus element type, and a surface-of-revolution element type.

33. A computer program product according to claim 31, wherein triangles are stored as part of a triangle list defined by vertex array data and index array data, and further wherein estimating the memory space requirements comprises determining the number of bytes required for storing vertex array data and index array data that define the computed number of triangles as part of the triangle list.

34. A computer program product according to claim 31, wherein triangles are stored as part of a triangle strip defined by vertex array data and index array data, and further wherein estimating the memory space requirements comprises determining the number of bytes required for storing vertex array data and index array data that define the computed number of triangles as part of the triangle strip.

35. A computer program product according to claim 26, wherein the method further comprises:
    pre-loading, prior to simulating and rendering frames of the complex environment, all non-dynamic tessellation elements defined in VR file(s) into memory, wherein pre-loading includes pre-loading non-dynamic tessellation elements into at least one of the video memory and the AGP memory;
    determining, after pre-loading all non-dynamic tessellation elements, whether memory space is available in the video memory or the AGP memory; and
    if memory space is determined to be available, pre-loading dynamic tessellation elements defined in the VR file(s) into the available memory space of the video memory or AGP memory.

36. A computer program product according to claim 35, wherein pre-loading dynamic tessellation elements comprises pre-loading dynamic tessellation elements in accordance with an initial frame of the complex environment to be rendered and displayed to a user.

37. A computer program product according to claim 35, wherein pre-loading all non-dynamic tessellation elements comprises:
    determining whether there is sufficient memory space in the video memory or the AGP memory for all of the non-dynamic tessellation elements; and
    when it is determined that there is not sufficient memory space in the video memory or the AGP memory, pre-loading any additional non-dynamic tessellation elements defined in the VR file(s) to available system memory of the VR system.

38. A system for performing memory management operations, the system comprising:
    means for buffering, in memory of a virtual reality (VR) system, vertex data for rendered dynamic tessellation elements;
    means for determining, for a dynamic tessellation element to be rendered, whether the dynamic tessellation element was rendered in a previous frame at a tessellation level that is the same as a tessellation level for the element in a frame to be rendered; and
    means for using the buffered vertex data for the previous rendering of the dynamic tessellation element to facilitate the display of the frame to be rendered when it is determined that the dynamic tessellation element was rendered in a previous frame at the same tessellation level.

39. A system according to claim 38, wherein the system further comprises means for allocating video memory in graphics hardware of the VR system and allocating accelerated graphics port (AGP) memory as part of system memory of the VR system.

40. A system according to claim 39, wherein the buffering means comprises means for buffering the vertex data in at least one of the video memory and the AGP memory.

41. A system according to claim 39, wherein the system further comprises:
    means for estimating, for a dynamic tessellation element to be rendered, memory space requirements for storing rendering data for the dynamic tessellation element, the rendering data comprising vertex data defining one or more triangles representing the dynamic tessellation element; and
    means for determining whether there is sufficient memory space available in the video memory or the AGP memory for storing the rendering data based on the estimated memory space requirements.

42. A system according to claim 41, wherein the system further comprises:
    means for using available system memory of the VR system for dynamically tessellating the element when it is determined that there is not sufficient memory space for the rendering data; and
    means for copying the rendering data from the system memory to a backend memory after dynamically tessellating the element.

43. A system according to claim 42, wherein the means for allocating the video memory and the AGP memory comprises means for allocating the backend memory using a portion of at least one of the video memory and the AGP memory.

44. A system according to claim 41, wherein the means for estimating the memory space requirement comprises:
    means for computing the number of triangles for rendering the dynamic tessellation element based on a tessellation level for the element in the frame to be rendered; and means for estimating the memory space requirements as a function of the computed number of triangles and a predetermined number of bytes that are required for storing data defining the computed number of triangles.

45. A system according to claim 44, wherein the means for computing the number of triangles comprises means for computing the number of triangles from the tessellation level in accordance with dynamic tessellation element types, wherein the dynamic tessellation element types include at least one of an open cone element type, a closed cone element type, an open torus element type, a closed torus element type, and a surface-of-revolution element type.

46. A system according to claim 44, wherein triangles are stored as part of a triangle list defined by vertex array data and index array data, and further wherein the means for estimating the memory space requirements comprises means for determining the number of bytes required for storing vertex array data and index array data that define the computed number of triangles as part of the triangle list.

47. A system according to claim 44, wherein triangles are stored as part of a triangle strip defined by vertex array data and index array data, and further wherein the means for estimating the memory space requirements comprises means for determining the number of bytes required for storing vertex array data and index array data that define the computed number of triangles as part of the triangle strip.

48. A system according to claim 39, wherein the system further comprises:
means for pre-loading, prior to simulating and rendering frames of the complex environment, all non-dynamic tessellation elements defined in VR file(s) into memory, wherein the pre-loading means comprises means for pre-loading non-dynamic tessellation elements into at least one of the video memory and the AGP memory;

means for determining, after pre-loading all non-dynamic tessellation elements, whether memory space is available in the video memory or the AGP memory; and means for pre-loading dynamic tessellation elements defined in the VR file(s) into the available memory space of the video memory or the AGP memory when memory space is determined to be available.

49. A system according to claim 48, wherein the means for pre-loading dynamic tessellation elements comprises means for pre-loading dynamic tessellation elements in accordance with an initial frame of the complex environment to be rendered and displayed to a user.

50. A system according to claim 48, wherein the means for pre-loading all non-dynamic tessellation elements comprises:

means for determining whether there is sufficient memory space in the video memory or the AGP memory for all of the non-dynamic tessellation elements; and means for pre-loading any additional non-dynamic tessellation elements defined in the VR file(s) to available system memory of the VR system when it is determined that there is not sufficient memory space in the video memory or the AGP memory.

* * * * *